(12) United States Patent
Smith et al.

(10) Patent No.: US 6,192,282 B1
(45) Date of Patent: Feb. 20, 2001

(54) METHOD AND APPARATUS FOR IMPROVED BUILDING AUTOMATION

(75) Inventors: Marjorie L. Smith; Mark E. Smith, both of Garland; Richard R. Gelling, Rowlett; Michael L. Cogbill, Dallas, all of TX (US)

(73) Assignee: Intelihome, Inc., Dallas, TX (US)

( * ) Notice: Under 35 U.S.C. 154(b), the term of this patent shall be extended for 0 days.

(21) Appl. No.: 08/941,794

(22) Filed: Sep. 30, 1997

Related U.S. Application Data

(60) Provisional application No. 60/028,234, filed on Oct. 1, 1996, and provisional application No. 60/028,168, filed on Oct. 11, 1996.

(51) Int. Cl.$^7$ .................................................. G05B 11/01
(52) U.S. Cl. ................................. 700/19; 700/20; 700/17; 700/286; 700/287; 340/825.06; 340/825.52; 340/825.69; 340/825.72
(58) Field of Search ....................... 700/2, 3, 9, 10–20, 700/17, 83, 86–87, 296–300, 280, 267; 340/825.06, 825.52, 825.69, 825.72, 310.01

(56) References Cited

U.S. PATENT DOCUMENTS

| | | | |
|---|---|---|---|
| 5,086,385 | * | 2/1992 | Launey et al. .......................... 700/83 |
| 5,128,855 | * | 7/1992 | Hilber et al. ............................ 700/3 |
| 5,289,365 | * | 2/1994 | Caldwell et al. ........................ 700/9 |
| 5,557,545 | * | 9/1996 | Loffel et al. ............................ 700/9 |
| 5,706,191 | * | 1/1998 | Bassett et al. .......................... 700/9 |
| 5,761,083 | * | 6/1998 | Brown et al. .......................... 700/16 |
| 5,801,940 | * | 9/1998 | Russ et al. .............................. 700/9 |
| 5,815,086 | * | 9/1998 | Ivie et al. ....................... 340/825.75 |
| 5,924,486 | * | 7/1999 | Ehlers et al. ......................... 165/238 |

\* cited by examiner

Primary Examiner—Paul P. Gordon
Assistant Examiner—Ramesh Patel
(74) Attorney, Agent, or Firm—Melvin A. Hunn

(57) ABSTRACT

An improved building automation system is provided which is modular in design thus minimizing the amount of instruction necessary to affect control of a particular building system. A relatively small set of interprocess control commands define an interprocess control protocol which is utilized in relatively high level scripts and control applications. The improved building automation system operates to translate control instructions in one particular control protocol to control instructions in a second control protocol. A text parsing program routes interprocess communication commands between modular communication programs to affect control over the automated building systems. The text parsing program includes executable instructions which allow for conditional communication of interprocess control commands depending upon system events.

75 Claims, 54 Drawing Sheets

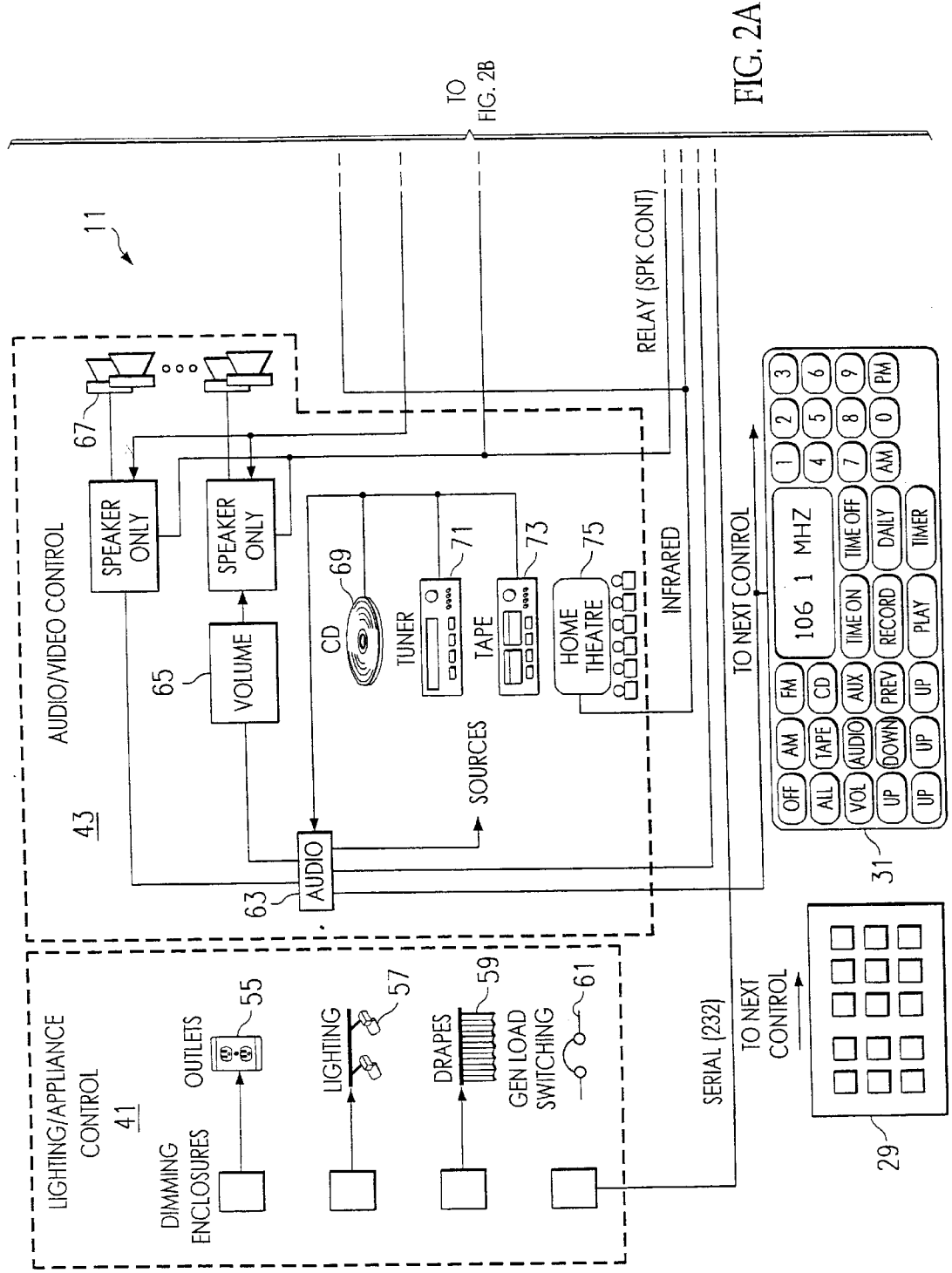

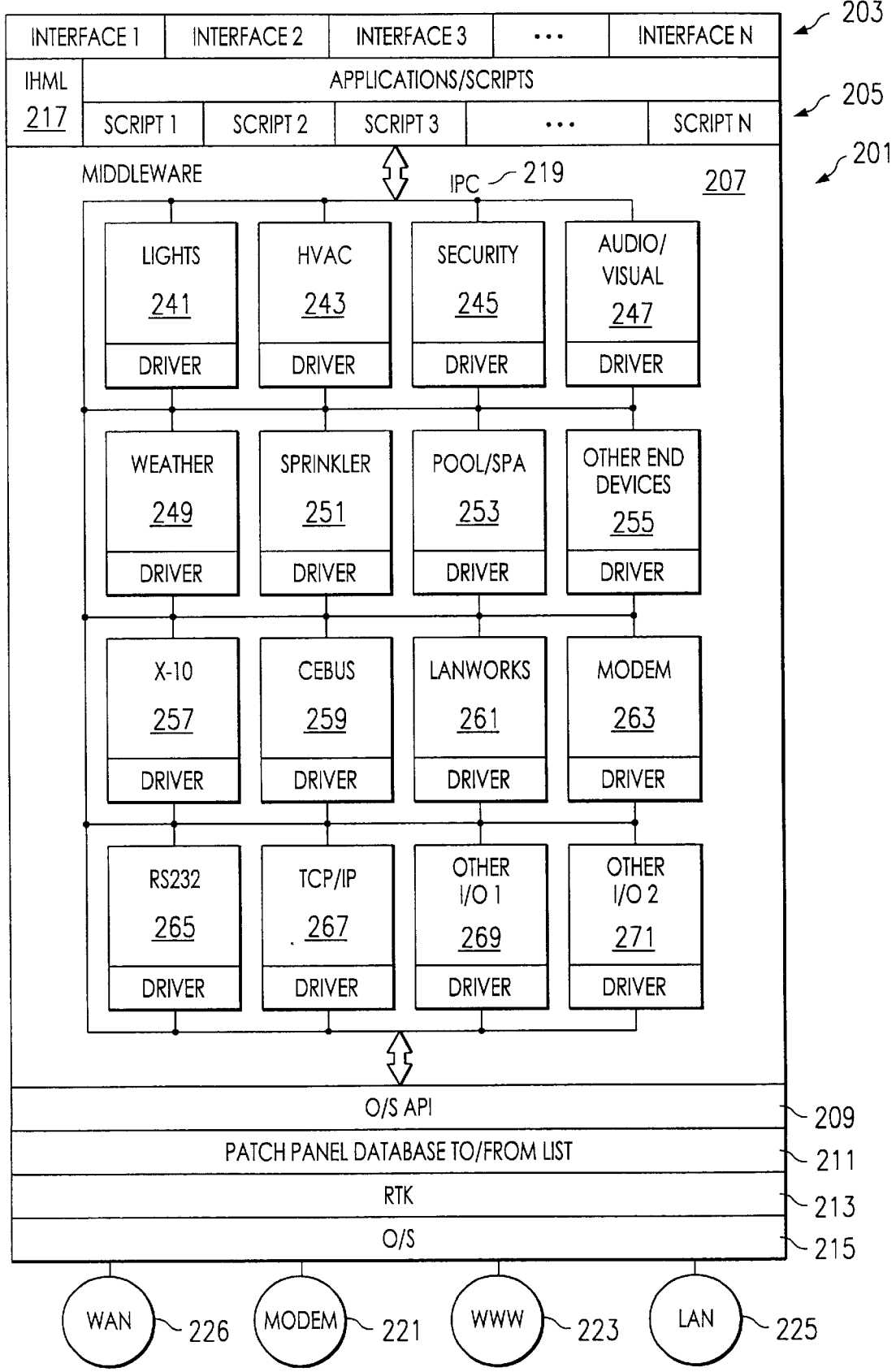

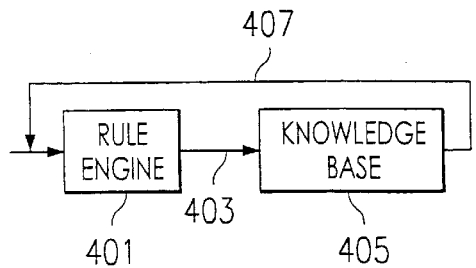
FIG. 9
(PRIOR ART)
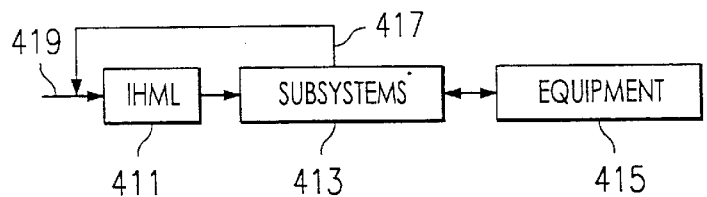
FIG. 10
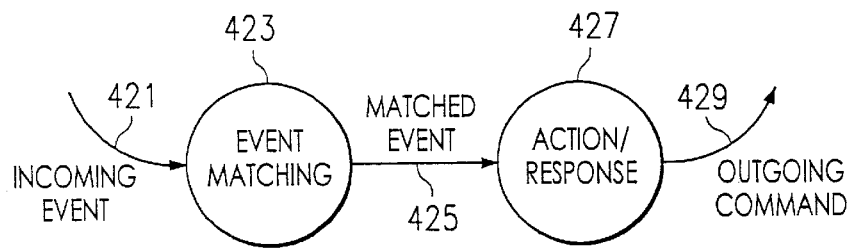
FIG. 11
FIG. 12
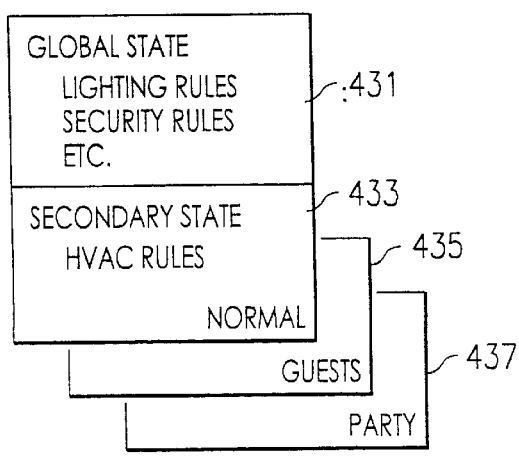
FIG. 13
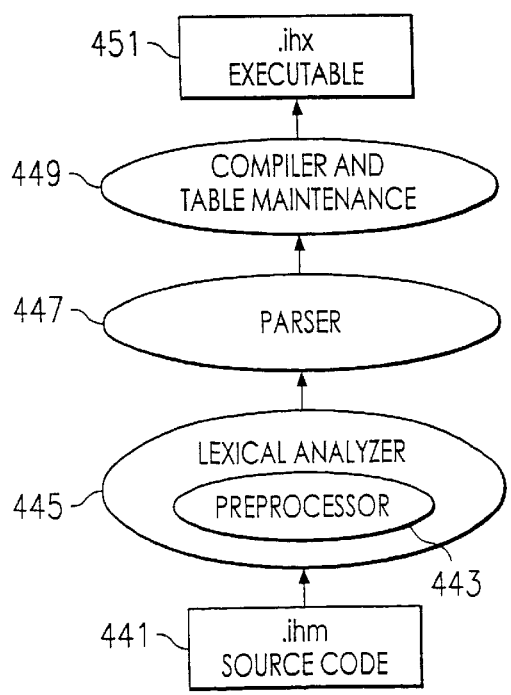

| Field Name | Size (bytes) | Conventions |
|---|---|---|
| version | 2 | 8.8 BCD format i.e. 0x0110 means version 1.10 |
| timeStamp | 4 | Time compiled Number of seconds since January 1, 1970 |
| stateCnt | 2 | Number of states in script |
| statePos | 2 | Byte offset in file to state table |
| varCnt | 2 | Number of variables in script |
| varPos | 2 | Byte offset in file to debug information |
| constSize | 2 | Number of bytes in constant heap |
| constPos | 2 | Byte offset in file to constant table |
| codeCnt | 2 | Number of tokens in code table |
| codePos | 2 | Byte offset in file to code table |
| fill | 232 | Reserved for future use |

Header Format

Figure 15

| Field Name | Size (bytes) | Conventions |
|---|---|---|
| addr | 2 | Index into p-code table |
| stateId | 2 | Ordinal ID of state (e.g. 1, 2, 3...) |

State Table Format

Figure 16

| Field Name | Size (bits) | Conventions |
|---|---|---|
| type | 2 | 0: p-code table index<br>1: opcode<br>2: constant table index<br>3: variable table index |
| data | 14 | type dependent |

Table 3 Token Format

Figure 17

| Field Name | Size (bits) | Conventions |
|---|---|---|
| type | 8 | 0: p-code table index<br>1: opcode<br>2: constant table index<br>3: variable table index<br>4: 32-bit signed integer<br>5: string pointer |
| data | 32 | type dependent |

Table 5 Extended Token Format

Figure 19

| Disarm | Arm Home | Arm Away | Hall Light |
|---|---|---|---|
| 1 | 2 | 3 | All Off |
| 4 | 5 | 6 | Not Used |
| 7 | 8 | 9 | Not Used |
| Bypass | 0 | Not Used | Not Used |

Figure 20

| Field Name | Range | Format | Conventions |
|---|---|---|---|
| System Id | | %c | System that message belongs to. Maybe or may not be sender or receiver. |
| | 'X' | | 'X' = AMX |
| | 'x' | | 'x' = X-10 |
| | 'A' | | 'A' = Audio/Video |
| | 'a' | | 'a' = Audit |
| | 'C' | | 'C' = CEBus |
| | 'E' | | 'E' = Echelon |
| | 'H' | | 'H' = Environment |
| | 'I' | | 'I' = IHML |
| | 'L' | | 'L' = Lighting & Electrical |
| | 'P' | | 'P' = Macro |
| | 'm' | | 'm' = Main |
| | 'M' | | 'M' = Modem |
| | 'D' | | 'D' = Motor |
| | 'S' | | 'S' = Security |
| | 's' | | 's' = Shell |
| | 'R' | | 'R' = Sprinkler |
| | 'W' | | 'W' = Weather |
| | 'T' | | 'T' = Timer |
| | '+' | | '+' = External (LAN, Modem, or Serial) |
| Arguments | | | See Individual sections below |

Figure 21

| Field Name | Range | Format | Conventions |
|---|---|---|---|
| Header | | | Refer to Messge Header Description |
| System ID | 'X' | %c | AMX Message |
| Command | 'C' | %c : | Notify Request |
| Device ID | 1-255 | %d | AMX device ID. All channels on device will be reported. |

Figure 22

| Field Name | Range | Format | Conventions |
|---|---|---|---|
| Header | | | Refer to Message Header Description |
| System ID | 'X' | %c | AMX Message |
| Command | 'C' | %c | Cancel Notify Request |
| Device ID | 1-255 | %d | AMX device ID |

Figure 23

| Field Name | Range | Format | Conventions |
|---|---|---|---|
| Header | | | Refer to Message Header Description |
| System ID | 'X' | %c | AMX Message |
| Command | 'R' | %c | Change Request |
| Channel | 'C' | %c | Request channel change |
| Value | 1,2,3,6,7,8,9 or 10 | %d | AMX command ID<br>1 = Channel on<br>2 = Channel off<br>3 = Get channel status<br>6 = Push channel<br>7 = Release channel<br>8 = Device ID<br>9 = Read address<br>10 = Pulse channel |
| Device ID | 1-255 | %d | AMX device ID |
| Channel ID | 1-255 | %d | Actual range is device dependent |

Figure 24

| Field Name | Range | Format | Conventions |
|---|---|---|---|
| Header | | | Refer to Message Header Description |
| System ID | 'X' | %c | AMX Message |
| Command | 'R' | %c | Change Request |
| Type | 'M' 'S' | %c | M = Request message transmit<br>S = Request string transmit |
| Device ID | 1-255 | %d | AMX device id |
| Value | String | %[^\0] | Command to be transmitted |

Figure 25

| Field Name | Range | Format | Conventions |
|---|---|---|---|
| Header | | | Refer to Message Header Description |
| System ID | 'A' | %c | Audio/Video Message |
| Command | 'N' | %c | Notify |
| Room | 0 – n | %d | 0 = All Rooms<br>1-n = Room Number |

Figure 26

| Field Name | Range | Format | Conventions |
|---|---|---|---|
| Header | | | Refer to Message Header Description |
| System ID | 'A' | %c | Audio/Video Message |
| Command | 'C' | %c | Cancel Notify Request |
| Room | 0 – n | %d | 0 = All Rooms<br>1-n = Room Number |

Figure 27

| Field Name | Range | Format | Conventions |
|---|---|---|---|
| Header | | | Refer to Message Header Description |
| System ID | 'A' | %c | Audio/Video Message |
| Command | 'n' | %c | Status Request – not added to Notify List |
| Room | 0 – n | %d | 0 = All Rooms<br>1-n = Room Number |

Figure 28

| Field Name | Range | Format | Conventions |
|---|---|---|---|
| Header | | | Refer to Message Header Description |
| System ID | 'A' | %c | Audio/Video Message |
| Command | TBD | %c | Command |
| Sub-command | TBD | %c | Sub-command |
| Equipment ID | 0 – n | %d | 0 = Default<br>1-n = Equipment source number<br>(e.g., Tuner #1 or CD #3) |
| Room | 0 – n | %d | 0 = All Rooms<br>1-n = Room Number |

Figure 29

| Field Name | Range | Format | Conventions |
|---|---|---|---|
| Header | | | Refer to Message Header Description |
| System ID | 'A' | %c | Audio/Video Message |
| Command | '>' | %c | Pass-through Command |
| Subsystem command | | %s | Subsystem-specific command string |

Figure 30

| Field Name | Range | Format | Conventions |
|---|---|---|---|
| Header | | | Refer to Message Header Description |
| System ID | 'A' | %c | Audio/Video Message |
| Command | 'U' | %c | Update status |
| Room | 0 – n | %d | 0 = All Rooms<br>1-n = Room Number |
| Attribute | | | |

Figure 31

| Field Name | Range | Format | Conventions |
|---|---|---|---|
| Header | | | Refer to Message Header Description |
| System ID | 'H' | %c | Environment Message |
| Command | 'N' | %c | Notify Request |
| Device (Zone) | 0 – n | %d | 0 = All Devices (Zones)<br>1-n = Device (Zone) number |
| Attribute | 'T',<br>'H',<br>'S',<br>'M',<br>'P',<br>'F',<br>'Z',<br>'f',<br>'c',<br>'s' | %c | 'T' = current temp<br>'H' = current humidity<br>'S' = current setpoints<br>'M' = current HVAC mode<br>'P' = current program<br>'F' = current fan mode<br>'Z' = current calling HVAC mode<br>'f' = current calling fan mode<br>'c' = comfort setpoint<br>'s' = setback setpoint |
| Day | 0-9 | %d | Used for 'P' Attribute only<br>0 = Monday<br>...<br>6 = Sunday<br>7 = Weekdays<br>8 = Weekends<br>9 = All days |

Figure 32

| Field Name | Range | Format | Conventions |
|---|---|---|---|
| Header | | | Refer Message to Header Description |
| System ID | 'H' | %c | Environment Message |
| Command | 'C' | %c | Cancel Notify Request |
| Device (Zone) | 0 – n | %d | 0 = All Devices (Zones)<br>1-n = Device (Zone) number |
| Attribute | '*'<br>'T',<br>'H',<br>'S',<br>'M',<br>'P',<br>'F',<br>'Z',<br>'f' | %c | '*' = all attributes (T,H,S,M,P)<br>'T' = current temp<br>'H' = current humidity<br>'S' = current setback<br>'M' = current HVAC mode<br>'P' = current program<br>'F' = current fan mode<br>'Z' = current calling HVAC mode<br>'f' = current calling fan mode |

Figure 33

| Field Name | Range | Format | Conventions |
|---|---|---|---|
| Header | | | Refer to Message Header Description |
| System ID | 'H' | %c | Environment Message |
| Command | 'R' | %c | Change Request |
| Device(Zone) | 0 – n | %d | 0 = All Devices (Zones)<br>1-n = Device (Zone) number |
| Attribute | 'S',<br>'c',<br>'s' | %c | 'S' = set current setpoint (user override)<br>'c' = set cool setpoint and enter comfort mode<br>'s' = set setback setpoint and enter setback mode |
| Cool Point | 50-100,<br>'c',<br>'s' | [+-]%d | 50-100 = degrees Fahrenheit (If preceded by '+' or '-' the number represents relative degrees from existing setpoint)<br>'c' = last known comfort setpoint<br>'s' = last known setback setpoint |
| Heat Point | 50-100 | [+-]%d | Degrees Fahrenheit (If preceded by '+' or '-' the number represents relative degrees from existing setpoint) |

Figure 34

| Field Name | Range | Format | Conventions |
| --- | --- | --- | --- |
| Header | | | Refer to Message Header Description |
| System ID | 'H' | %c | Environment Message |
| Command | 'R' | %c | Change Request |
| Device (Zone) | 0 – n | %d | 0 = All Devices (Zones)<br>1-n = Device (Zone) number |
| Attribute | 'M' | %c | 'M' = current mode |
| Mode | 0-3 | %d | 0 = Off<br>1 = Auto<br>2 = Cool<br>3 = Heat |

Figure 35

| Field Name | Range | Format | Conventions |
| --- | --- | --- | --- |
| Header | | | Refer to Message Header Description |
| System ID | 'H' | %c | Environment Message |
| Command | 'R' | %c | Change Request |
| Device (Zone) | 0 – n | %d | 0 = All Devices<br>1-n = Device (Zone) number |
| Attribute | 'F' | %c | 'F' = current fan mode |
| Mode | 0-1 | %d | 0 = Auto<br>1 = On |

Figure 36

| Field Name | Range | Format | Conventions |
|---|---|---|---|
| Header | | | Refer to Message Header Description |
| System ID | 'H' | %c | Environment Message |
| Command | 'R' | %c | Change Request |
| Device (Zone) | 0 – n | %d | 0 = All Devices (Zones) <br> 1-n = Device (Zone) number |
| Attribute | 'P' | %c | 'P' = current program |
| Day | 0-9 | %d | 0 = Monday <br> ... <br> 6 = Sunday <br> 7 = Weekdays <br> 8 = Weekends <br> 9 = All days |
| Cool Point 1 | 0-99 | %d | Degrees Fahrenheit |
| Cool Point 2 | 0-99 | %d | Degrees Fahrenheit |
| Cool Point 3 | 0-99 | %d | Degrees Fahrenheit |
| Cool Point 4 | 0-99 | %d | Degrees Fahrenheit |
| Heat Point 1 | 0-99 | %d | Degrees Fahrenheit |
| Heat Point 2 | 0-99 | %d | Degrees Fahrenheit |
| Heat Point 3 | 0-99 | %d | Degrees Fahrenheit |
| Heat Point 4 | 0-99 | %d | Degrees Fahrenheit |
| Time 1 | 0-23 | %d | 0 = Midnight <br> 12 = Noon |
| Time 2 | 0-23 | %d | 0 = Midnight <br> 12 = Noon |
| Time 3 | 0-23 | %d | 0 = Midnight <br> 12 = Noon |
| Time 4 | 0-23 | %d | 0 = Midnight <br> 12 = Noon |

Figure 37

| Field Name | Range | Format | Conventions |
|---|---|---|---|
| Header | | | Refer to Message Header Description |
| System ID | 'H' | %c | Environment Message |
| Command | 'U' | %c | Update status |
| Device (Zone) | 1 – n | %d | 1-n = Device (Zone) Number |
| Attribute | 'T', 'H', 'M', 'F', 'Z', 'f' | %c | 'T' = current temp<br>'H' = current humidity<br>'M' = current HVAC mode<br>'F' = current fan mode<br>'Z' current HVAC calling mode<br>'f' = current fan calling mode |
| Argument | 0-99 | %0.1f | Temperature:<br>  Degrees Fahrenheit |
| | 0-99 | %d | Humidity:<br>  Percent |
| | 0-3 | %d | HVAC Mode:<br>  0 = Off<br>  1 = Auto<br>  2 = Cool<br>  3 = Heat |
| | 0-1 | %d | Fan Mode:<br>  0 = Auto<br>  1 = On |
| | 0, 2-4 | %d | HVAC Calling Mode:<br>  0 = Off<br>  2 = Cool<br>  3 = Heat<br>  4 = Cool 2 |
| | 0-1 | %d | Fan Calling Mode:<br>  0 = Off<br>  1 = On |

Figure 38

| Field Name | Range | Format | Conventions |
|---|---|---|---|
| Header | | | Refer to Message Header Description |
| System ID | 'H' | %c | Environment Message |
| Command | 'U' | %c | Update status |
| Device (Zone) | 1 – n | %d | 1-n = Device (Zone) number |
| Attribute | 'S', 'c', 's' | %c | 'S' = current setpoint<br>'c' = comfort setpoint<br>'s' = setback setpoint |
| Cool Point | 50-100 | %d | Degrees Fahrenheit |
| Heat Point | 50-100 | %d | Degrees Fahrenheit |

Figure 39

| Field Name | Range | Format | Conventions |
|---|---|---|---|
| Header | | | Refer to Message Header Description |
| System ID | 'H' | %c | Environment Message |
| Command | 'U' | %c | Update status |
| Device(Zone) | 1 - n | %d | 1-n = Device (Zone) number |
| Attribute | 'P' | %c | 'P' = current program |
| Day | 0-9 | %d | 0 = Monday<br>...<br>6 = Sunday<br>7 = Weekdays<br>8 = Weekends<br>9 = All days |
| Cool Point 1 | 0-99 | %d | Degrees Fahrenheit |
| Cool Point 2 | 0-99 | %d | Degrees Fahrenheit |
| Cool Point 3 | 0-99 | %d | Degrees Fahrenheit |
| Cool Point 4 | 0-99 | %d | Degrees Fahrenheit |
| Heat Point 1 | 0-99 | %d | Degrees Fahrenheit |
| Heat Point 2 | 0-99 | %d | Degrees Fahrenheit |
| Heat Point 3 | 0-99 | %d | Degrees Fahrenheit |
| Heat Point 4 | 0-99 | %d | Degrees Fahrenheit |
| Time 1 | 0-23 | %d | 0 = Midnight<br>12 = Noon |
| Time 2 | 0-23 | %d | 0 = Midnight<br>12 = Noon |
| Time 3 | 0-23 | %d | 0 = Midnight<br>12 = Noon |
| Time 4 | 0-23 | %d | 0 = Midnight<br>12 = Noon |

Figure 40

| Field Name | Range | Format | Conventions |
|---|---|---|---|
| Header | | | Refer to Message Header Description |
| System ID | 'L' | %c | Lighting Message |
| Command | 'N' | %c | Notify |
| Zone | 0 - n | %d | Vantage: Master ID<br>All others: 0 |
| Station | 1-16<br>1-16<br>00-FF | %s | Vantage: Station ID in decimal<br>X-10: House Code (A-P) converted to integer<br>LiteTouch: Station ID in hex |
| Button | 0-9 | %d | Button Number |

Figure 41

| Field Name | Range | Format | Conventions |
|---|---|---|---|
| Header | | | Refer to Message Header Description |
| System ID | 'L' | %c | Lighting Message |
| Command | 'C' | %c | Cancel Notify Request |
| Zone | 0 - n | %d | Vantage: Master ID<br>All others: 0 |
| Station | 1-16<br>1-16<br>00-FF | %s | Vantage: Station ID in decimal<br>X-10: House Code (A-P) converted to integer<br>LiteTouch: Station ID in hex |
| Button | 0-9 | %d | Button Number |

Figure 42

| Field Name | Range | Format | Conventions |
|---|---|---|---|
| Header | | | Refer to Message Header Description |
| System ID | 'L' | %c | Lighting Message |
| Command | 'R' | %c | Change Request |
| Zone | 0 - n | %d | Vantage: Master ID<br>All others: 0 |
| Station | 1-16<br>1-16<br>00-FF | %s | Vantage: Station ID in decimal<br>X-10: House Code (A-P) converted to integer<br>LiteTouch: Station ID in hex |
| Button | 0-9 | %d | Button Number |
| State | 0-100<br>'P'<br>'R'<br>'T' | %s | Switch State:<br>0=full off, 100=full on, 1-99=% On (Dim level)<br>'P' = Switch Push<br>'R' = Switch Release<br>'T' = Switch Toggle |

Figure 43

| Field Name | Range | Format | Conventions |
|---|---|---|---|
| Header | | | Refer to Message Header Description |
| System ID | 'L' | %c | Lighting Message |
| Command | 'A' | %c | All On Request |

Figure 44

| Field Name | Range | Format | Conventions |
|---|---|---|---|
| Header | | | Refer to Message Header Description |
| System ID | 'L' | %c | Lighting Message |
| Command | 'a' | %c | All Off Request |

Figure 45

| Field Name | Range | Format | Conventions |
|---|---|---|---|
| Header | | | Refer to Message Header Description |
| System ID | 'L' | %c | Lighting Message |
| Command | 'n' | %c | Status request without notification |
| Zone | 0 - n | %d | Vantage: Master ID<br>All others: 0 |
| Station | 1-16<br>1-16<br>00-FF | %s | Vantage: Station ID in decimal<br>X-10: House Code (A-P) converted to integer<br>LiteTouch: Station ID in hex |
| Button | 0-9 | %d | Button Number |

Figure 46

| Field Name | Range | Format | Conventions |
|---|---|---|---|
| Header | | | Refer to Message Header Description |
| System ID | 'L' | %c | Lighting Message |
| Command | 'U' | %c | Update Status |
| Zone | 0 - n | %d | Vantage: Master ID<br>All others: 0 |
| Station | 1-16<br>1-16<br>00-FF | %s | Vantage: Station ID in decimal<br>X-10: House Code (A-P) converted to integer<br>LiteTouch: Station ID in hex |
| Button | 0-9 | %d | Button Number |
| State | 0-100<br>'P'<br>'R'<br>'T' | %s | Switch State:<br>0=full off, 100=full on, 1-99=% On (Dim level)<br>'P' = Switch Push<br>'R' = Switch Release<br>'T' = Switch Toggle |
| State | 0-100 | %d | Percent dim level: 0 = full off, 100 = full on |

Figure 47

| Field Name | Range | Format | Conventions |
|---|---|---|---|
| Header | | | Refer to Message Header Description |
| System ID | 'm' | %c | Main Message |
| Command | 'S' | %c | Shutdown Request |

Figure 48

| Field Name | Range | Format | Conventions |
|---|---|---|---|
| Header | | | Refer to Message Header Description |
| System ID | 'M' | %c | Modem Message |
| Command | 'N' | %c | Notify Request |
| Type | 'D' 'V' 'M' 'R' 'P' | %c | Notify Type:<br>'D' = DTMF Input<br>'V' = Voice Connection<br>'M' = Modem connection<br>'R' = Voice message recorded<br>'P' = Voice payback complete |

Figure 49

| Field Name | Range | Format | Conventions |
|---|---|---|---|
| Header | | | Refer to Message Header Description |
| System ID | 'M' | %c | Modem Message |
| Command | 'S' | %c | Notify Request |

Figure 50

| Field Name | Range | Format | Conventions |
|---|---|---|---|
| Header | | | Refer to Message Header Description |
| System ID | 'M' | %c | Modem Message |
| Command | 'C' | %c | Cancel Notify Request |
| Type | 'D' 'V' 'M' 'R' 'P' | %c | Notify Type:<br>'D' = DTMF Input<br>'V' = Voice connection<br>'M' = Modem connection<br>'R' = Voice message recorded<br>'P' = Voice playback complete |

Figure 51

| Field Name | Range | Format | Conventions |
|---|---|---|---|
| Header | | | Refer to Message Header Description |
| System ID | 'M' | %c | Modem Message |
| Command | 'R' | %c | Change Request |
| Type | 'R' 'P' 'I' 'O' | %c | Notify Type: 'R' = Voice record 'P' = Voice playback 'I' = Datafile input (from external device) 'O' = Datafile output (to external device) |
| Source/ Destination | 0-4 | %d | Source/Destination 0 = Telephone line interface (default) 1 = Telephone Handset (transmit/receive device) 2 = Internal Speaker (transmit only device) 3 = External Microphone (receive only device) 4 = Telephone line with handset and internal speaker |
| Datafile Name | | %s | Datafile name(e.g., for voice playback or database file transfer) |

Figure 52

| Field Name | Range | Format | Conventions |
|---|---|---|---|
| Header | | | Refer to Message Header Description |
| System ID | 'M' | %c | Modem Message |
| Command | 'U' | %c | Update Status |
| Status | 'O', 'V', 'D' | %c | Modem Status: 'O' = Idle 'V' = Voice Connection 'D' = Data Connection |

Figure 53

| Field Name | Range | Format | Conventions |
|---|---|---|---|
| Header | | | Refer to Message Header Description |
| System ID | 'D' | %c | Motor Message |
| Command | 'N' | %c | Notify Request |
| Subcommand | 'S' | %c | Motor State |
| Device | 0 - n | %d | Motor device number |

Figure 54

| Field Name | Range | Format | Conventions |
|---|---|---|---|
| Header | | | Refer to Message Header Description |
| System ID | 'D' | %c | Motor Message |
| Command | 'C' | %c | Cancel Notify Request |
| Subcommand | 'S' | %c | Motor State |
| Device | 0 – n | %d | Motor Device Number |

Figure 55

| Field Name | Range | Format | Conventions |
|---|---|---|---|
| Header | | | Refer to Message Header Description |
| System ID | 'D' | %c | Motor Message |
| Command | 'C' | %c | Change Request |
| Subcommand | 'S' | %c | Motor State |
| Device | 0 - n | %d | Motor device number |
| State | 'O', 'C', 'T', '?' | %c | 'O' = Open<br>'C' = Close<br>'T' = Toggle<br>'?' = Stop |

Figure 56

| Field Name | Range | Format | Conventions |
|---|---|---|---|
| Header | | | Refer to Message Header Description |
| System ID | 'D' | %c | Motor Message |
| Command | 'U' | %c | Update Status |
| Subcommand | 'S' | %c | Motor State |
| Device | 0 - n | %d | Motor device number |
| State | 'o', 'c', 'O', 'C', 'T', '?' | %c | 'o' = Opening (still in motion)<br>'c' = Closing (still in motion)<br>'O' = Open (stopped)<br>'C' = Close (stopped)<br>'T' = Toggle (stopped, position unknown)<br>'?' = Stopped (position unknown) |

Figure 57

| Field Name | Range | Format | Conventions |
|---|---|---|---|
| Header | | | Refer to Message Header Description |
| System ID | 'p' | %c | Pool/Spa Message |
| Command | 'N' | %c | Notify Request |
| Device | 0-8 | %d | 0 = all pools/spas<br>1-8 = individual pool or spa |
| Attribute | 'S',<br>'T',<br>'M',<br>'H',<br>'P',<br>'B',<br>'J',<br>'L' | %c | 'S' = current setpoint<br>'T' = current temp<br>'M' = current mode<br>'H' = Heater<br>'P' = Pump<br>'B' = Bubbles<br>'J' = Jets<br>'L' = Light |

Figure 58

| Field Name | Range | Format | Conventions |
|---|---|---|---|
| Header | | | Refer to Message Header Description |
| System ID | 'p' | %c | Pool/Spa Message |
| Command | 'C' | %c | Cancel Notify Request |
| Device | 0-8 | %d | 0 = all pools/spas<br>1-8 = individual pool or spa |
| Attribute | 'S',<br>'T',<br>'M',<br>'H',<br>'P',<br>'B',<br>'J',<br>'L' | %c | 'S' = current setpoint<br>'T' = current temp<br>'M' = current mode<br>'H' = Heater<br>'P' = Pump<br>'B' = Bubbles<br>'J' = Jets<br>'L' = Light |

Figure 59

| Field Name | Range | Format | Conventions |
|---|---|---|---|
| Header | | | Refer to Message Header Description |
| System ID | 'p' | %c | Pool/Spa Message |
| Command | 'R' | %c | Change Request |
| Device | 0-8 | %d | 0 = all pools/spas<br>1-8 = individual pool or spa |
| Attribute | 'S',<br>'M',<br>'H',<br>'P',<br>'B',<br>'J',<br>'L' | %c | 'S' = current setpoint<br>'M' = current mode<br>'H' = Heater<br>'P' = Pump<br>'B' = Bubbles<br>'J' = Jets<br>'L' = Light |
| Setpoint | 0-120 | [+-]%d | Setpoint temperature in degrees Fahrenheit (If preceded by '+' or '-' the number represents relative degrees from existing setpoint) |
| | 0-1 | %d | Mode:<br>    0 = Off<br>    1 = On |

Figure 60

| Field Name | Range | Format | Conventions |
|---|---|---|---|
| Header | | | Refer to Message Header Description |
| System ID | 'p' | %c | Pool/Spa Message |
| Command | 'U' | %c | Update status |
| Device | 1-8 | %d | Pool/spa device number |
| Attribute | 'S', 'T', 'M', 'H', 'P', 'B', 'J', 'L' | %c | 'S' = current setpoint<br>'T' = current temp<br>'M' = current mode<br>'H' = Heater<br>'P' = Pump<br>'B' = Bubbles<br>'J' = Jets<br>'L' = Light |
| Argument | 0-120<br><br>0-1 | %d<br><br>%d | Temperature and Setpoint, in degrees Fahrenheit<br><br>Mode:<br>  0 = Off<br>  1 = On |

Figure 61

| Field Name | Range | Format | Conventions |
|---|---|---|---|
| Header | | | Refer to Message Header Description |
| System ID | 'S' | %c | Security Message |
| Command | 'C' | %c | Cancel Notify Request |
| Attribute | 'S', 'Z', 'T', '*' | %c | 'S' = System<br>'Z' = Zone State<br>'T' = Text<br>'*' = All attribute |
| Zone ID | 0-n | %d | 0 = all zones<br>1-n = zone ID |

Figure 62

| Field Name | Range | Format | Conventions |
|---|---|---|---|
| Header | | | Refer to Message Header Description |
| System ID | 'S' | %c | Security Message |
| Command | 'C' | %c | Cancel Notify Request |
| Attribute | 'S', 'Z', 'T', '*' | %c | 'S' = System<br>'Z' = Zone State<br>'T' = Text<br>'*' = All attributes |
| Zone ID | 0-n | %d | 0 = all zones<br>1-n = zone ID. |

Figure 63

| Field Name | Range | Format | Conventions |
|---|---|---|---|
| Header | | | Refer to Message Header Description |
| System ID | 'S' | %c | Security Message |
| Command | 'R' | %c | Request Change |
| Attribute | 'S' | %c | System Request |
| Change Type | 'D', 'H', 'W' | %c | 'D' = Disarm<br>'H' = Arm Home<br>'W' = Arm Away |
| Password | | %s | Security System Password |

Figure 64

| Field Name | Range | Format | Conventions |
|---|---|---|---|
| Header | | | Refer to Message Header Description |
| System ID | 'S' | %c | Security Message |
| Command | 'R' | %c | Request Change |
| Attribute | 'Z' | %c | Zone Request |
| Zone | 1-n | %d | Zone ID to Bypass |
| Change Type | 'B', 'S' | %c | 'B' = Bypass Zone<br>'S' = Secure Zone (un-bypass) |
| Password | | %s | Security System Password |

Figure 65

| Field Name | Range | Format | Conventions |
|---|---|---|---|
| Header | | | Refer to Message Header Description |
| System ID | 'S' | %c | Security Message |
| Command | 'U' | %c | Update Security |
| Attribute | 'S' | %c | System Status |
| State | 'D', 'H', 'W', 'A', 'F' | %c | 'D' = Disarmed<br>'H' = Armed Home<br>'W' = Armed Away<br>'A' = Alarm<br>'F' = Fire |

Figure 66

| Field Name | Range | Format | Conventions |
|---|---|---|---|
| Header | | | Refer to Message Header Description |
| System ID | 'S' | %c | Security Message |
| Command | 'U' | %c | Update Status |
| Attribute | 'Z' | %c | Zone Status |
| Zone ID | 1-n | %d | Zone Number |
| State | 'B', 'S', 'f' | %c | 'B' = Bypassed<br>'S' = Secure (not bypassed)<br>'f' = Faulted |

Figure 67

| Field Name | Range | Format | Conventions |
|---|---|---|---|
| Header | | | Refer to Message Header Description |
| System ID | 'S' | %c | Security Message |
| Command | 'U' | %c | Update Status |
| Attribute | 'T' | %c | Text Status |
| State | | %s | Security system textual message. 32- characters |

Figure 68

| Field Name | Range | Format | Conventions |
| --- | --- | --- | --- |
| Header | | | Refer to Message Header Description |
| System ID | 'R' | %c | Sprinkler Message |
| Command | 'N' | %c | Notify Request |
| Attribute | 'M', 'c', 'Z', 'z', 'P', 'T' | %c | 'M' = Circuit Mode<br>'c' = Circuit state<br>'Z' = Zone state<br>'z' = Zone duration<br>'P' = Program<br>'T' = Timer |
| Zone ID | 0 - n | %d | 0 = All zones<br>1-n = Sprinkler zone |

Figure 69

| Field Name | Range | Format | Conventions |
| --- | --- | --- | --- |
| Header | | | Refer to Message Header Description |
| System ID | 'R' | %c | Sprinkler Message |
| Command | 'C' | %c | Cancel Notify Request |
| Attribute | 'M', 'c', 'Z', 'z', 'P', 'T' | %c | 'M' = Circuit Mode<br>'c' = Circuit state<br>'Z' = Zone state<br>'z' = Zone duration<br>'P' = Program<br>'T' = Timer |
| Zone ID | 0 - n | %d | 0 = All zones<br>1-n = Sprinkler zone number |

Figure 70

| Field Name | Range | Format | Conventions |
| --- | --- | --- | --- |
| Header | | | Refer to Message Header Description |
| System ID | 'R' | %c | Sprinkler Message |
| Command | 'R' | %c | Change Request |
| Attribute | 'Z' | %c | Zone Request |
| Zone ID | 1 - n | %d | 1-n = Sprinkler zone number |
| State | 0, 1, 'T' | %d | 0 = Off<br>1 = On<br>'T' = Toggle |
| Duration (optional) | 0-n | %d | Duration time, in minutes |

Figure 71

| Field Name | Range | Format | Conventions |
|---|---|---|---|
| Header | | | Refer to Message Header Description |
| System ID | 'R' | %c | Sprinkler Message |
| Command | 'R' | %c | Change Request |
| Attribute | 'z' | %c | Zone Duration Request |
| Zone ID | 1 - n | %d | 1-n = Sprinkler zone number |
| Duration | 0-n | %d | Duration time, in minutes |

Figure 72

| Field Name | Range | Format | Conventions |
|---|---|---|---|
| Header | | | Refer to Message Header Description |
| System ID | 'R' | %c | Sprinkler Message |
| Command | 'R' | %c | Change Request |
| Attribute | 'M' | %c | Mode Request |
| State | 'O', 'A', 'M', 'D', 'T', 0-1 | %c | 'O' = Off<br>'A' = Automatic<br>'M' = Manual<br>'D' = Rain Delay<br>'T' = Test (timed cycle trough all zones)<br>0 = Circuit Off<br>1 = Circuit On |

Figure 73

| Field Name | Range | Format | Conventions |
|---|---|---|---|
| Header | | | Refer to Message Header Description |
| System ID | 'R' | %c | Sprinkler Message |
| Command | 'R' | %c | Change Request |
| Attribute | 'T' | %c | Program Change Request |
| Sunday | 0 - FFFFFFFF | %lx | Start Times |
| Monday | 0 - FFFFFFFF | %lx | Start Times |
| Tuesday | 0 - FFFFFFFF | %lx | Start Times |
| Wednesday | 0 - FFFFFFFF | %lx | Start Times |
| Thursday | 0 - FFFFFFFF | %lx | Start Times |
| Friday | 0 - FFFFFFFF | %lx | Start Times |
| Saturday | 0 - FFFFFFFF | %lx | Start Times |

Figure 74

| Field Name | Range | Format | Conventions |
|---|---|---|---|
| Header | | | Refer to Message Header Description |
| System ID | 'R' | %c | Sprinkler Message |
| Command | 'R' | %c | Change Request |
| Attribute | 'P' | %c | Program Change Request |
| Program File | | %s | Program datafile name |

Figure 75

| Field Name | Range | Format | Conventions |
|---|---|---|---|
| Header | | | Refer to Message Header Description |
| System ID | 'R' | %c | Sprinkler Message |
| Command | 'U' | %c | Update Status |
| Attribute | 'Z'<br>'z' | %c | 'Z' = Zone Status<br>'z' = Zone Duration |
| Zone ID | 1-n | %d | Zone number |
| State | 0 - 1,<br><br>0-n | %d | 0 = Zone off<br>1 = Zone on<br><br>0-n = Zone duration |

Figure 76

| Field Name | Range | Format | Conventions |
|---|---|---|---|
| Header | | | Refer to Message Header Description |
| System ID | 'R' | %c | Sprinkler Message |
| Command | 'U' | %c | Update Status |
| Attribute | 'M'<br>'c' | %c | 'M' = Mode Status<br>'c' = Circuit Mode Status |
| State | 'O',<br>'A',<br>'M',<br>'D',<br>'T',<br><br>0-1 | %c | 'O' = Off<br>'A' = Automatic<br>'M' = Manual<br>'D' = Rain Delay<br>'T' = Test (times cycle through all zones)<br><br>0 = Circuit Off<br>1 = Circuit On |

Figure 77

| Field Name | Range | Format | Conventions |
|---|---|---|---|
| Header | | | Refer to Message Header Description |
| System ID | 'R' | %c | Sprinkler Message |
| Command | 'U' | %c | Update Status |
| Attribute | 'T' | %c | Timer Status Update |
| Sunday | 0- FFFFFFFF | %lx | Start Times |
| Monday | 0-FFFFFFFF | %lx | Start Times |
| Tuesday | 0-FFFFFFFF | %lx | Start Times |
| Wednesday | 0-FFFFFFFF | %lx | Start Times |
| Thursday | 0-FFFFFFFF | %lx | Start Times |
| Friday | 0-FFFFFFFF | %lx | Start Times |
| Saturday | 0-FFFFFFFF | %lx | Start Times |

Figure 78

| Field Name | Range | Format | Conventions |
|---|---|---|---|
| Header | | | Refer to Message Header Description |
| System ID | 'R' | %c | Sprinkler Message |
| Command | 'U' | %c | Update Status |
| Attribute | 'P' | %c | Program Status Update |
| Program File | | %s | Program datafile name |

Figure 79

| Field Name | Range | Format | Conventions |
|---|---|---|---|
| Header | | | Refer to Message Header Description |
| System ID | 'W' | %c | Weather Message |
| Command | 'N' | %c | Notify Request |
| Attributes | 'A' - 'X' | %s | List of attributes (multiples can be combined in a single string)<br>'A' = Inside temperature - current<br>'B' = Inside temperature - today's high<br>'C' = Inside temperature - today's low<br>'D' = Outside temperature - current<br>'E' = Outside temperature - today's high<br>'F' = Outside temperature - today's low<br>'G' = Outside temperature - year's high<br>'H' = Outside temperature - year's low<br>'I' = Wind speed - current<br>'J' = Wind speed - high<br>'K' = Wind direction<br>'L' = Wind chill<br>'M' = Barometer<br>'N' = Inside humidity - current<br>'O' = Inside humidity - high<br>'P' = Inside humidity - low<br>'Q' = Outside humidity - current<br>'R' = Outside humidity - high<br>'S' = Outside humidity - low<br>'T' = Dew point<br>'U' = Rainfall - today<br>'V' = Rainfall - month<br>'W' = Rainfall - year<br>'X' = Heat index<br>'Y' = Barometric trend |

Figure 80

| Field Name | Range | Format | Conventions |
|---|---|---|---|
| Header | | | Refer to Message Header Description |
| System ID | 'W' | %c | Weather Message |
| Command | 'C' | %c | Cancel Notify Request |
| Attributes | 'A' - 'X' | %s | List of attributes (multiples can be combined in a single string)<br>'A' = Inside temperature - current<br>'B' = Inside temperature - today's high<br>'C' = Inside temperature - today's low<br>'D' = Outside temperature - current<br>'E' = Outside temperature - today's high<br>'F' = Outside temperature - today's low<br>'G' = Outside temperature - year's high<br>'H' = Outside temperature - year's low<br>'I' = Wind speed - current<br>'J' = Wind speed - high<br>'K' = Wind direction<br>'L' = Wind chill<br>'M' = Barometer<br>'N' = Inside humidity - current<br>'O' = Inside humidity - high<br>'P' = Inside humidity - low<br>'Q' = Outside humidity - current<br>'R' = Outside humidity - high<br>'S' = Outside humidity - low<br>'T' = Dew point<br>'U' = Rainfall - today<br>'V' = Rainfall - month<br>'W' = Rainfall - year<br>'X' = Heat index<br>'Y' = Barometric trend |

Figure 81

| Field Name | Range | Format | Conventions |
|---|---|---|---|
| Header | | | Refer to Message Header Description |
| System ID | 'W' | %c | Weather Message |
| Command | 'w' | %c | Update Status |
| Attribute | 'A' - 'X' | %c | 'A' = Inside temperature - current<br>'B' = Inside temperature - today's high<br>'C' = Inside temperature - today's low<br>'D' = Outside temperature - current<br>'E' = Outside temperature - today's high<br>'F' = Outside temperature - today's low<br>'G' = Outside temperature - year's high<br>'H' = Outside temperature - year's low<br>'I' = Wind speed - current<br>'J' = Wind speed - high<br>'K' = Wind direction<br>'L' = Wind chill<br>'M' = Barometer<br>'N' = Inside humidity - current<br>'O' = Inside humidity - high<br>'P' = Inside humidity - low<br>'Q' = Outside humidity - current<br>'R' = Outside humidity - high<br>'S' = Outside humidity - low<br>'T' = Dew point<br>'U' = Rainfall - today<br>'V' = Rainfall - month<br>'W' = Rainfall - year<br>'X' = Heat index<br>'Y' = Barometric trend |
| Value | | | See format table |

Figure 82

| Value | Format | Range | Units |
|---|---|---|---|
| Inside temperature - current | %3d | -99 to 999 | degrees |
| Inside temperature - today's high | %3d | -99 to 999 | degrees |
| Inside temperature - today's low | %3d | -99 to 999 | degrees |
| Outside temperature - current | %3d | -99 to 999 | degrees |
| Outside temperature - today's high | %3d | -99 to 999 | degrees |
| Outside temperature - today's low | %3d | -99 to 999 | degrees |
| Outside temperature - year's high | %3d | -99 to 999 | degrees |
| Outside temperature - year's low | %3d | -99 to 999 | degrees |
| Wind speed - current | %2d | 0 to 99 | mph |
| Wind speed - high | %2d | 0 to 99 | mph |
| Wind direction | %s | N, NE, E, SE, S, SW, W, NW | |
| Wind chill | %3d | -99 to 999 | degrees |
| Barometer | %5.2f | 00.00 to 99.99 | inches |
| Inside humidity - current | %3d | 0 to 100 | percent |
| Inside humidity - high | %3d | 0 to 100 | percent |
| Inside humidity - low | %3d | 0 to 100 | percent |
| Outside humidity - current | %3d | 0 to 100 | percent |
| Outside humidity - high | %3d | 0 to 100 | percent |
| Outside humidity - low | %3d | 0 to 100 | percent |
| Dew point | %2d | 0 to 99 | degrees |
| Rainfall - today | %4.2f | 00.00 to 99.99 | inches |
| Rainfall - month | %5.2f | 00.00 to 99.99 | inches |
| Rainfall - year | %5.2f | 00.00 to 99.99 | inches |
| Heat index | %3d | 0 to 999 | degrees |
| Barometric trend | %1c | R = Rising<br>F = Falling<br>H = Holding | |

Figure 83

| Field Name | Range | Format | Conventions |
|---|---|---|---|
| Header | | | Refer to Message Header Description |
| System ID | 'T' | %c | Timer Message |
| Command | 'R' | %c | Change Request |
| Tag | String | %[^:] | Unique string (up to 10 characters) used to cancel the timer event |
| Repeat | 0-1 | %d | 0 = Execute one time only<br>1 = Repeat event until cancelled |
| Time | String | %[^:] | See DBDD for a complete description of the time expression. |
| Message | String | %[^\0] | Remainder of line echoed back to requester upon event execution (May contain ':'s) |

Figure 84

| Field Name | Range | Format | Conventions |
|---|---|---|---|
| Header | | | Refer to Message Header Description |
| System ID | 'T' | %c | Timer Message |
| Command | 'C' | %c | Change Request |
| Tag | String | %[^:] | Unique string (up to 10 characters) used to cancel the timer event |

Figure 85

| Field Name | Range | Format | Conventions |
|---|---|---|---|
| Header | | | Refer to Message Header Description |
| System ID | 'P' | %c | Macro Message |
| Command | 'R' | %c | Execute Request |
| Argument | | %s[,%d] | Name of script file to be executed.<br>File must be located in the DAT directory.<br>If followed by a "%d", that integer value will be used as the script ID, otherwise a 0 will be used. |

Figure 86

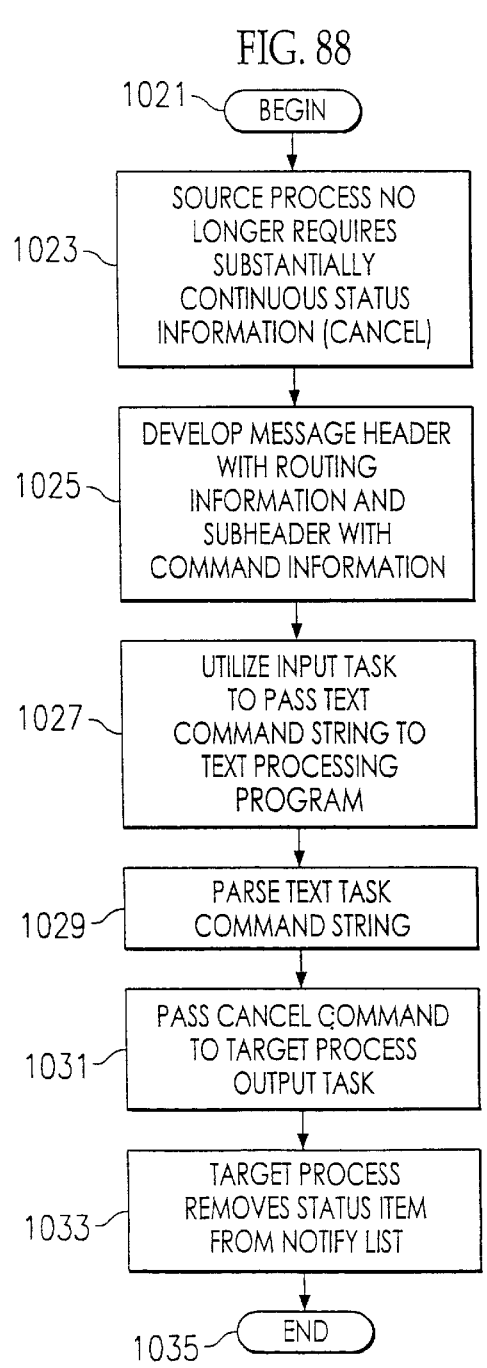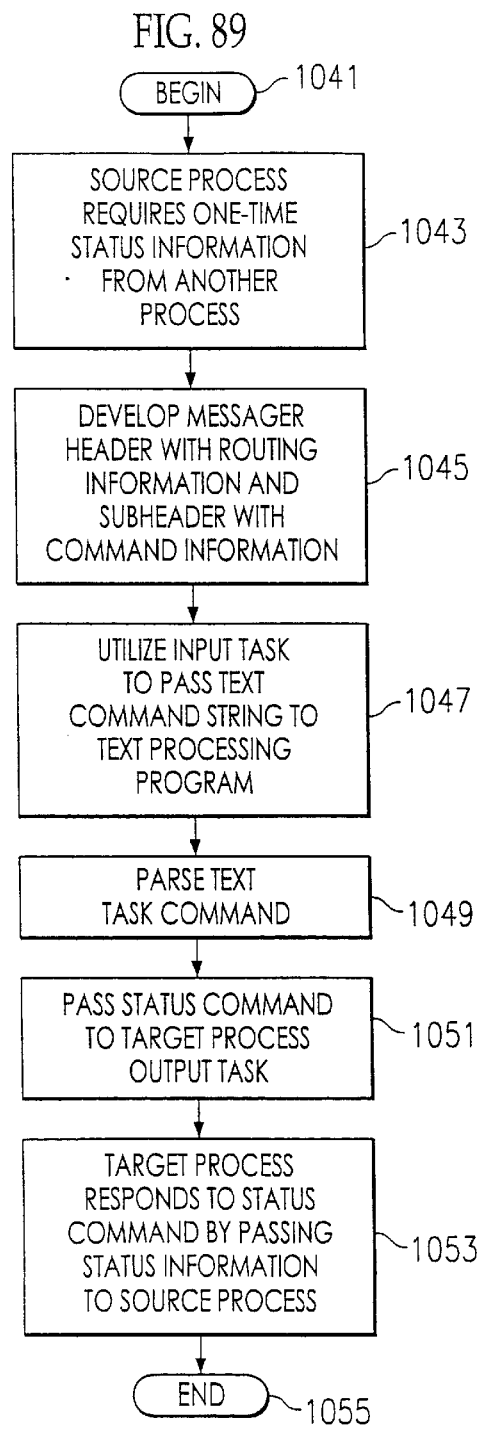

IHML COMPILING
PROCESS

AUDIO CONTROL FROM A LIGHTING KEYPAD

WEATHER DISPLAY ON A TOUCHPANEL

METHOD AND APPARATUS FOR IMPROVED BUILDING AUTOMATION

1. CROSS-REFERENCE TO RELATED APPLICATIONS

This application claims the benefit of U.S. Provisional Patent Application Ser. No. 60/028,234; filed Oct. 1, 1996, entitled Method and Apparatus for Improved Building Automation; and U.S. Provisional Patent Application Ser. No.60/028,168; filed Oct. 11, 1996, entitled Method and Apparatus for Improved Building Automation.

2. FIELD OF THE INVENTION

The present invention relates in general to building automation systems, and in particular to a software system that allows for control of, and/or communication with, end devices and communication systems that utilize different command and communications protocols and languages.

3. DESCRIPTION OF THE PRIOR ART

With the decrease in the costs associated with microprocessors, and volatile and nonvolatile memory, many building systems such as security, HVAC, lighting, water management, entertainment, communication, and the like have been placed under microprocessor control. A variety of competing and commercially available technologies have emerged for the basic building subsystems which are susceptible to automation and control through the execution of computer programs. While this competition is generally positive, insofar as it reduces the overall costs to consumers, and provides enhanced functionality with each new generation of technology, the downside associated with the existence of numerous competitive systems is that several different technological control and communication protocols have been independently developed, rendering the automation systems incompatible.

This presents significant problems for those in the industry trying to provide centralized or unified control over a plurality of modular building automation subsystems. The dissimilarity in the communication and control protocols presents particularly acute problems for those attempting to provide retrofit automation for existing buildings. The problem becomes still more accurate for those trying to provide centralized or unified control by retrofitting existing residential structures, since the costs associated with centralized automation may be prohibitive if preexisting automation over building subsystems has to be replaced entirely as part of the retrofit.

Another problem that occurs in the retrofitting of centralized or unified control systems onto existing residential structures is the reality that a variety of interface devices are available for the building subsystems to allow user interface with the building subsystems. For example, user interfaces range from technologically complicated computer interfaces to relatively simple mechanical switches. A variety of key panels, infrared remote controls, and touch screens may also be utilized to control various building automation subsystems. This is particularly true in the subassemblies relating to home entertainment and communications. It is also not uncommon to have building subsystem interfaces which are alternatives to one another. For example, a particular piece of entertainment equipment may be alternatively operable by the user through a keypad as well as an infrared remote control. This variety in the types and technologies utilized in the user interfaces also presents particular problems for those trying to provide economical and efficient retrofits for building automation systems which are monolithic in design.

The central problem associated with the automation of building systems is that during some intervals of use by the user a monolithic system is preferred with a strong central control of all subsystems. However, during other intervals of use by the user, local control over particular subsystems is preferable to the monolithic control. One particular example is the user requirement in many automation projects that home lighting and audio be controllable through either a local control placed within particular rooms, or a centralized controller.

In the prior art, those entities that have attempted to commercially provide centralized automation for retrofit onto residential or commercial structures have discovered that significant work must be performed in essentially custom programming for each particular building. The costs associated with this custom programming often render the centralized building automation systems so expensive that they can be afforded only by the most wealthy. Currently, there are substantial untapped markets for centralized retrofit automation for residential and commercial applications. This market is likely to remain untapped as long as the costs associated with the custom programming remain relatively high in comparison with the ever decreasing costs associated with processors, sensors, mass memory, and commercially available consumer goods, such as entertainment equipment, which tend to decrease rapidly in price while simultaneously increasing in functionality with each new product version.

There are substantial business opportunities for those competitors that can innovate in a manner which reduces the overall costs of centralized automation (especially in a retrofit environment) while simultaneously increasing the functionality of the centralized automation, and also allowing for periodic upgrades in particular subsystem components without requiring corresponding custom programming expenses.

The present invention is directed to a number of specific improvements in building automation systems which meet these requirements and which should result in substantial commercial advantage for those practicing the technology disclosed and claimed herein.

4. SUMMARY OF THE INVENTION

The present invention is directed to an improved building automation system and a method of controlling building automation systems. The invention may be implemented in either a centralized processing embodiment or a distributed processing embodiment. Both of these embodiments will be discussed in this summary and in the detailed description.

The basic system features which render the building automation system and related method superior to the prior art systems and methods will now be described in broad overview.

The first characteristic of the present invention which renders it superior to the state of the prior art is its basic modularity of design. The automation system of the present invention is modular in the extreme. This diminishes the amount of custom programming required in order to affect control of a particular building. It allows for a relatively open architecture which can accommodate a variety of unique control applications which are scripted for a particular building. By modularizing many of the common processes utilized in the automation system, the custom programming required to control any particular building is minimized. This modularity in design allows for uniform and coordinated control over a plurality of automation subsystems which may be incompatible with one another at the device or machine level, but which can be controlled utilizing a relatively small and uniform set of "interprocess control commands" which define an interprocess control protocol which is utilized in relatively high level scripts and control applications which may be written for a particular building.

When characterized as an apparatus, the present invention is directed to an improved building automation system. It includes a number of components which cooperate to allow optimum building automation and control. A plurality of building automation subsystems are provided. Each of the building automation subsystems includes at least one end device which is subject to control in accordance with a particular control protocol. The plurality of building automation subsystems may individually respond to a relatively large number of different control protocols which are generally incompatible. The present invention further includes a set of interprocess control command which together constitute an interprocess control protocol. In accordance with the present invention, at least one programmable controller is provided with associated memory, which operates to store and selectively execute program instructions, including the set of interprocess control commands. A plurality of modular subsystem programs are provided. Each of these subsystem programs is responsive to interprocess control commands from the interprocess control protocol. Each of the plurality of modular subsystem programs is utilized for generating command signals in accordance with a particular control protocol which may be device specific, from a plurality of available and different control protocols in the building automation subsystems. The present invention also requires the use of a plurality of modular control applications. Each control application is for specific control of at least one of the plurality of building automation subsystems. The plurality of modular control applications utilize particular ones of the set of interprocess control commands to control execution of particular ones of the plurality of modular subsystem programs.

The improved building automation system of the present invention may also be utilized to translate control instructions in one particular control protocol to control instructions in another different control protocol. For this purpose, a plurality of modular communication programs are provided. Each of the modular communication programs receives control instructions in a first control protocol as an input, and produces as an output control instructions in a second control protocol.

The improved building automation system of the present invention further includes a plurality of user interface devices. The user interface devices are utilized to receive user input and display system status. Each of the interface devices is communicatively coupled through particular ones of the modular control applications to particular ones of the plurality of building automation subsystems. Preferably, the relationship between control applications and user interface devices is a flexible one, and can be changed during use in order to suit the operator's requirements.

Preferably, the improved building automation system of the present invention includes at least one text parsing program. The text parsing program processes communication traffic in the building automation system. The text parsing program routes interprocess communication commands between the modular subsystem programs and modular control applications as well as the modular communication programs in order to affect control over the automated building systems.

In the preferred particular embodiment described herein, the text parsing program includes executable instructions which allow for conditional communication of interprocess control commands depending upon system "events." The system "events" may include the status of any particular operating condition of the building automation subsystems, the status of any particular operating condition of any of the modular subsystem programs, or the status of any one of the modular control applications. Since the present invention contemplates and allows true peer-to-peer communication, any particular "process" within the building automation system may trigger a command which requires other particular processes within the building automation system to perform a particular operation.

One particular advantage of the present invention is that the extensive modularity allows for generic commands for the control of particular subsystem types. For example, a building may include a number of lighting systems which are incompatible with one another, and which are responsive to a different control protocols. The automation system of the present invention utilizes the interprocess control protocol to allow for "generic" control instructions which may be utilized by the system to control any or all of the lighting systems.

The utilization of this extensive modularity and genericness of control protocols allows one to develop program applications which control building automation systems without regard to, or prior knowledge of, the particular device protocols utilized by the different automation subsystems at the device level.

The improved building automation system of the present invention also utilizes a generic modularity at the subsystem-specific level in order to facilitate the peer-to-peer communication, multitasking, and flexibility in design. Each of the plurality of modular subsystem programs includes an output task program module and an input task program module. The output task program module receives executable instructions including interprocess control commands, while the input task program produces status information and/or interprocess control commands for consumption by other processes.

This extensive modularity and the utilization of input task modules and output task modules allows for the utilization of several generic commands to pass information between processes within the system. A "notify" command is provided for eliciting a substantially continuous state indication from any particular one of the plurality of subsystem-specific programs. A "cancel" command is provided to discontinue any substantially continuously state indication. A "status" command is provided for eliciting a non-continuous state indication from any particular one of the plurality of the subsystem specific programs. A "change request" command is provided for altering the state of any particular end device in any particular one of the building automation subsystems. Communication between the processes of the automation system is facilitated by utilization of a "notify list" which is communicatively associated with programs or processes and which governs the output of status information from the program or process.

The present invention utilizes a multitasking kernel program which communicatively couples the program modules and processes together to allow for real-time asynchronous communication therebetween. In order to facilitate the modularity, a plurality of global utility programs are also provided to connect the programs and processes and to allow for systematic start-up, shut down, audit operations and timing operations.

The passing of interprocess control commands in the automation system of the present invention is facilitated through the utilization of "message headers" which include routing information. The message header preferably includes the identification of the source process as well as identification of the target process. Additionally, each interprocess command control includes a "subheader" which includes the commands which are to be utilized by the processes.

The improved building automation system of the present invention further includes an event-response architecture which is analogous to the artificial intelligence expert rule-based systems, but which has significant differences. In accordance with the present invention, a plurality of operating "states" are defined in the programs. Each state includes a mapping of a plurality of system "events" to a plurality of conditional commands. When the automation system determines that a particular "event" has occurred, it automatically communicates the particular related command for processing. The command may report status information or may control some other process or program. In the preferred embodiment of the present invention the program instructions define a plurality of rule sets. Each of the rule sets map specific automation system events to specific interprocess control commands. The modular control applications identify specific automation system events as they occur, and respond by communicating associated specific interprocess control commands for execution. In accordance with the preferred embodiment of the present invention, a plurality of operating states are defined by the plurality of rules sets, and the modular control applications operate by switching between particular ones of the plurality of automation rules sets depending upon the current operating state or condition of a particular device or program.

In the preferred embodiment of the present invention, a "global" state is defined for the automation system which is active upon initialization of the system. A variety of other "secondary" states are defined within the system. The secondary states may be utilized in conjunction with the global state when a particular "event" occurs and is detected by the system. For example, a "global state" may be defined for the HVAC system during ordinary use. The "global state" is called for execution upon initialization of the HVAC program. However, additional "secondary" states may be provided for certain operating conditions or "events." For example, one "secondary" state may be provided for HVAC operation during parties. As an alternative example, yet another "secondary" state may be provided for operation of the HVAC system when the weather system indicates that the temperature has descended by a predetermined amount.

In an alternative embodiment, a plurality of programmable controllers may be distributed throughout the building automation system, each dedicated for control of a particular subsystem. In this embodiment, at least one communication channel should be provided to allow communication between the building automation subsystems and the programmable controllers. In one particular embodiment, the communication channel may comprise the power lines which run through the building. In this particular embodiment, a particular communication protocol is determined for utilization in communication utilizing the communication channel (the power line). In the preferred embodiment, a "serial adapter" is provided between the communication channel and the automation subsystems under control. Preferably, each serial adapter includes a modular subsystem program for generating command controls for control of the particular end device associated with that subsystem. Additionally, a communication program is provided for handling the communication with the other components in the automation system through the communications channel. Yet another subsystem is provided which is identified as the "serial driver" which is utilized to provide command and control instructions for the end devices under control of the building automation subsystem.

5. DESCRIPTION OF THE FIGURES

The novel features believed characteristic of the invention are set forth in the appended claims. The invention itself however, as well as a preferred mode of use, further objects and advantages thereof, will best be understood by reference to the following detailed description of an illustrative embodiment when in conjunction with the accompanying drawings, wherein:

FIG. 3 is a block diagram depiction of the preferred embodiment of the software utilized in accordance with the present invention in order to obtain optimum control over building automation systems;

Figure 4:
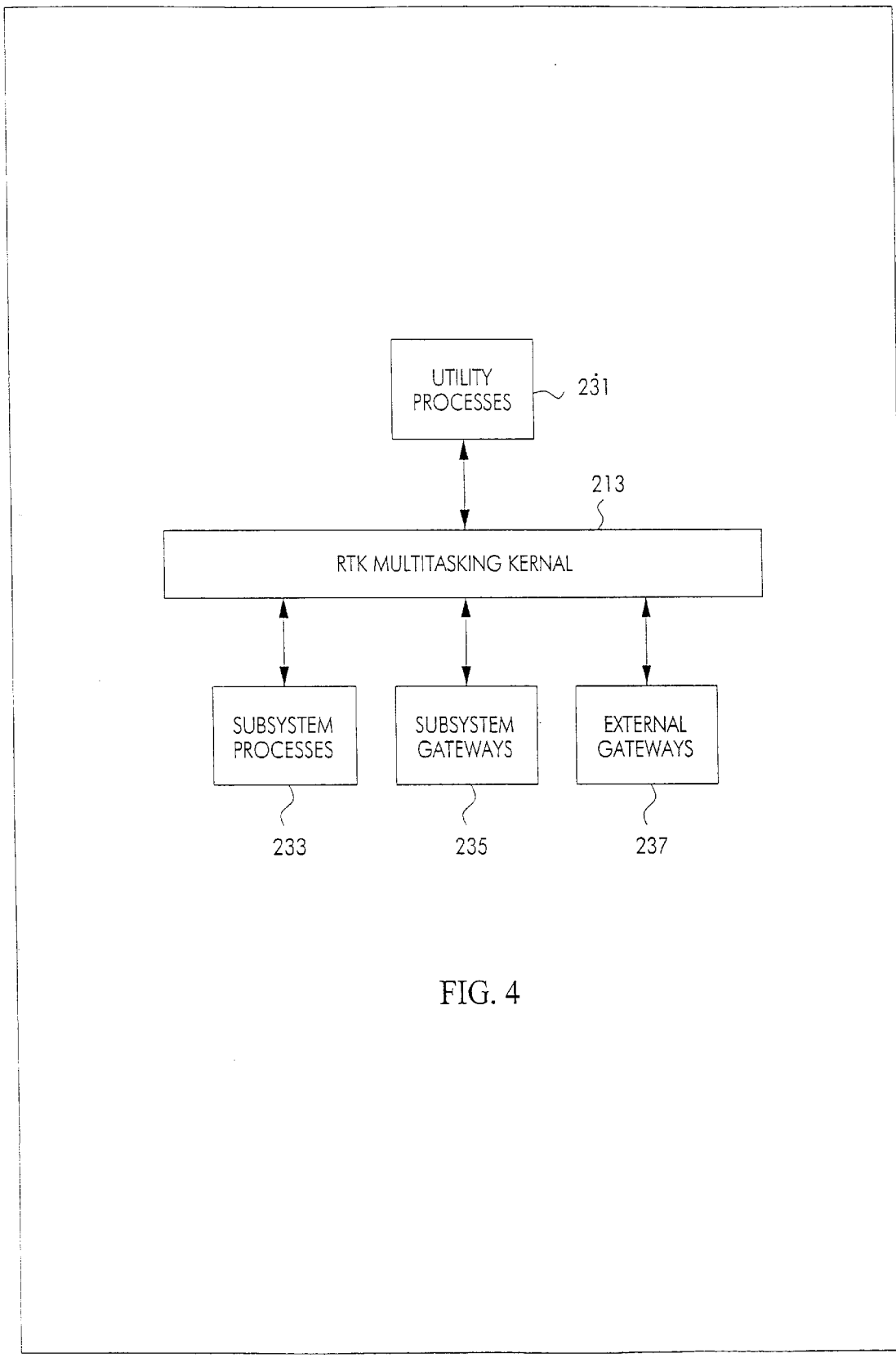
Figure 5:
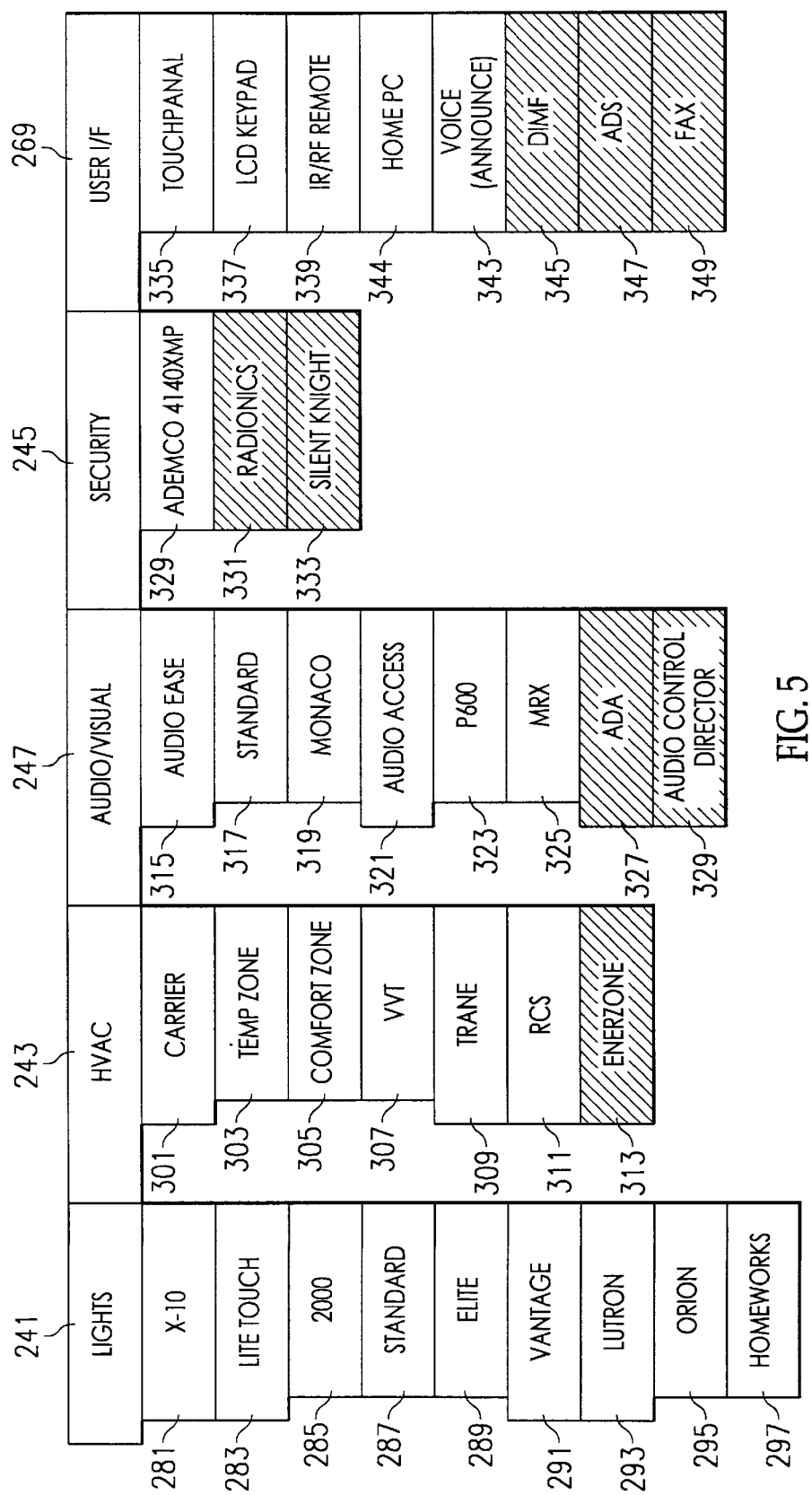
Figure 6:
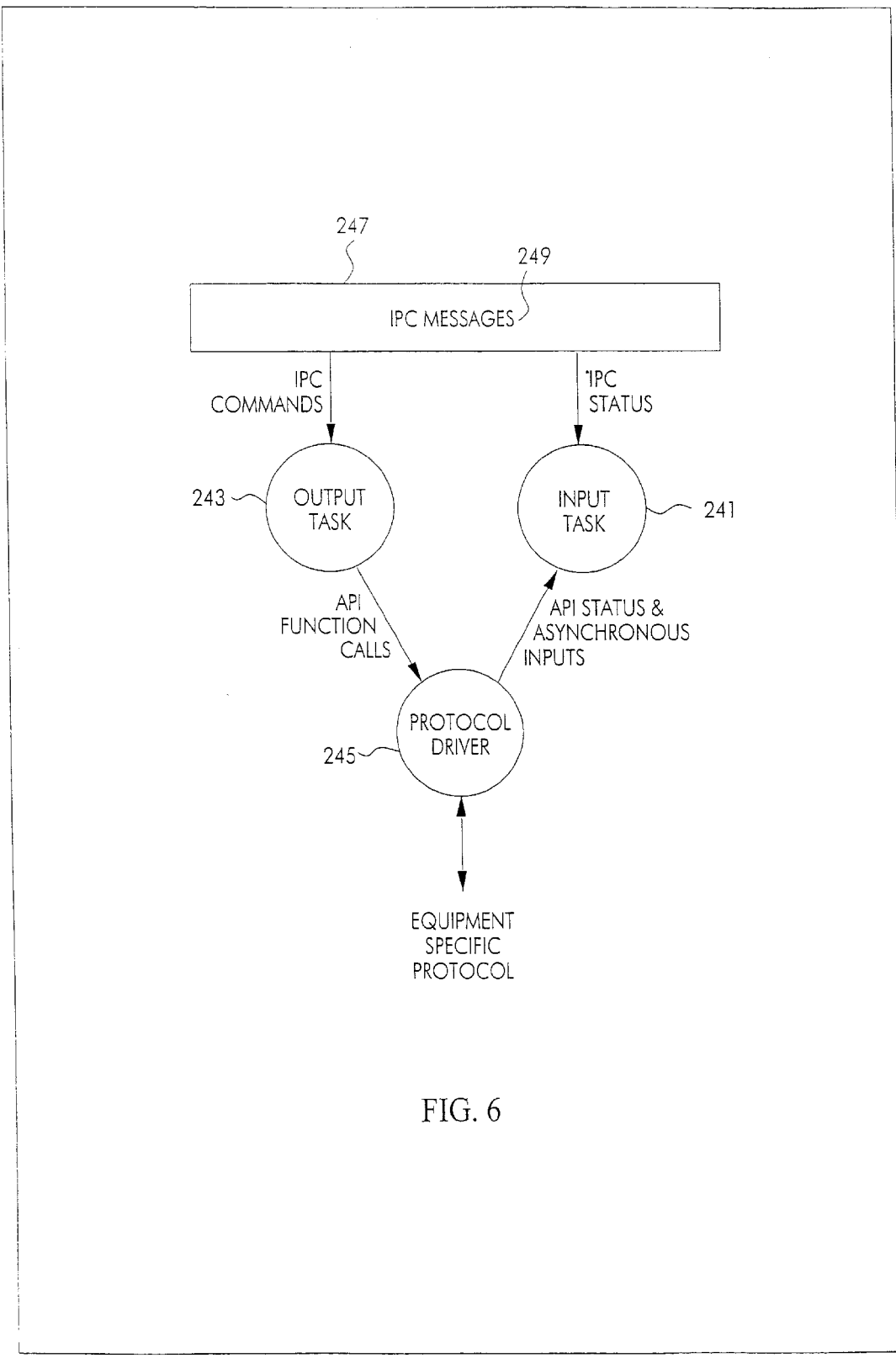
Figure 7:
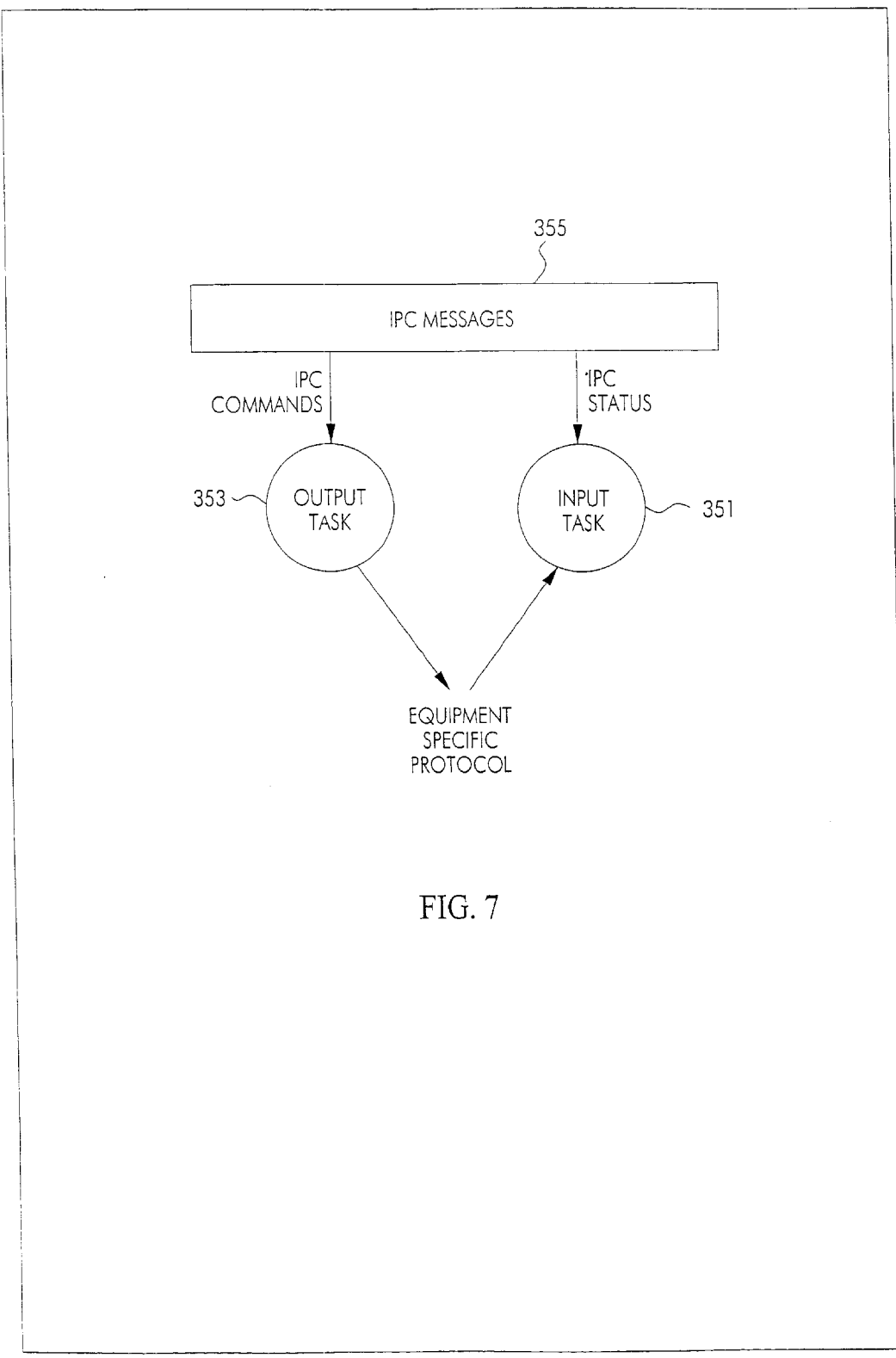
Figure 8:
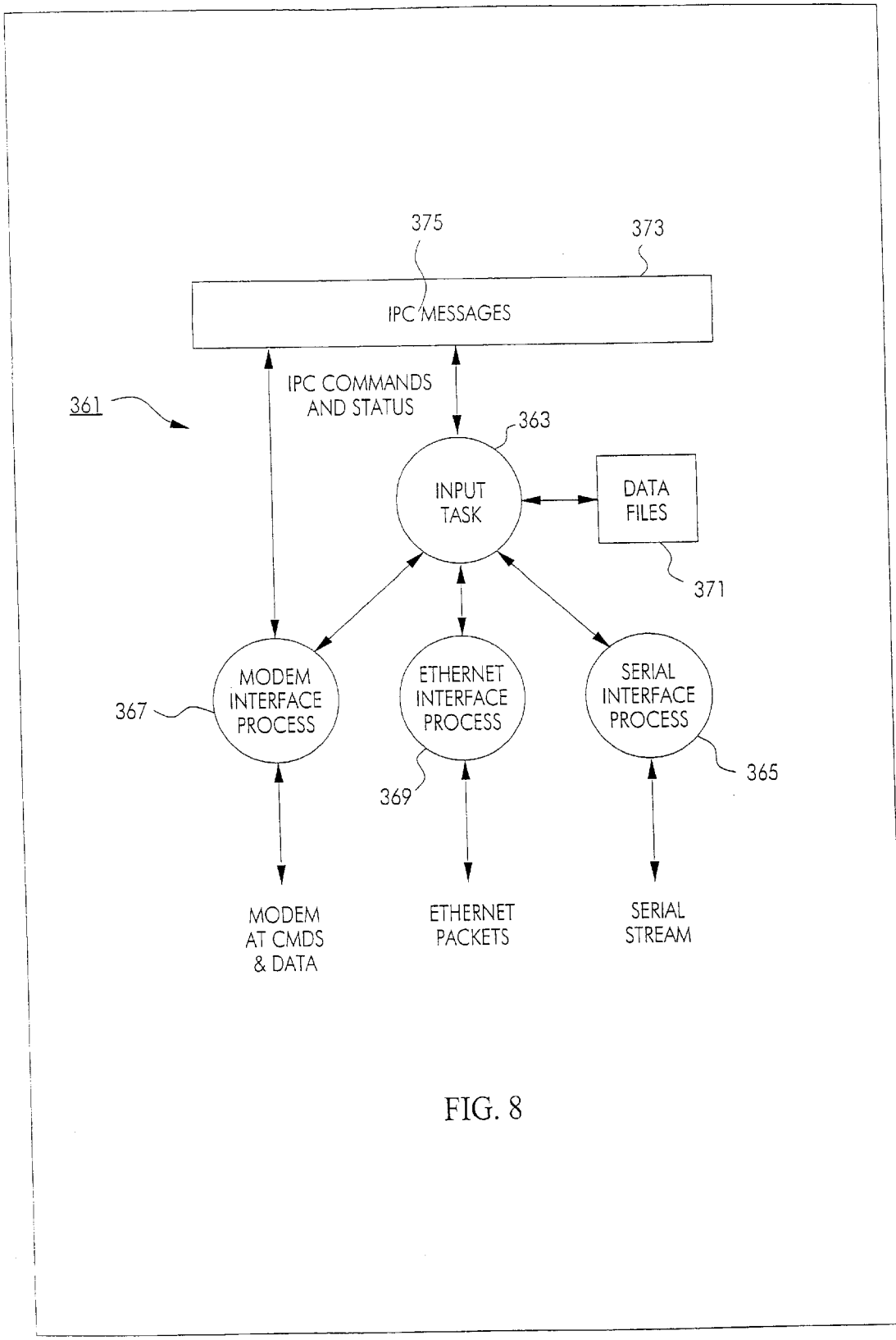
Figure 14:
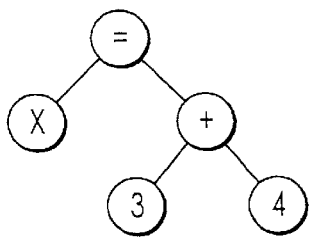
Figure 18:
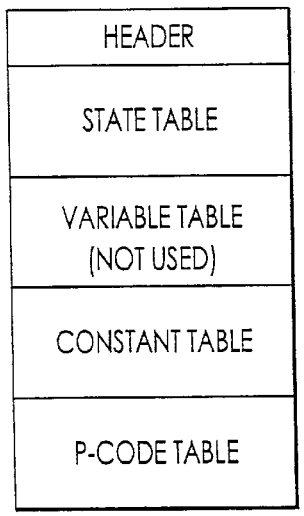
Figure 87:
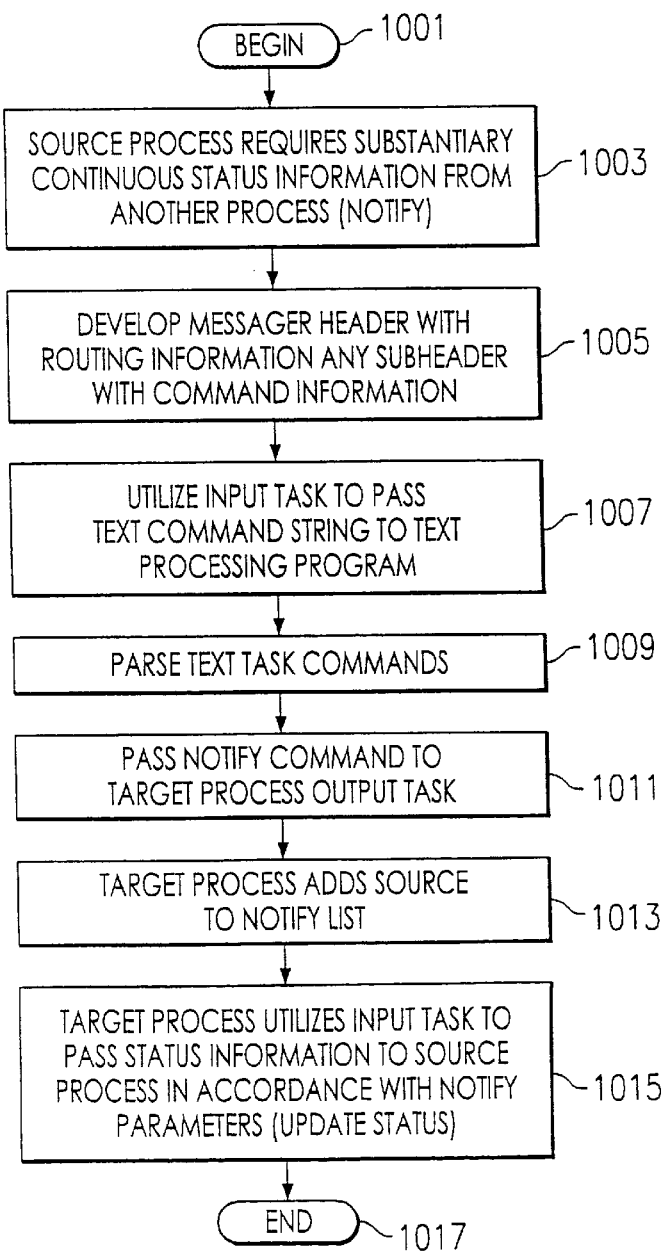
Figure 90:
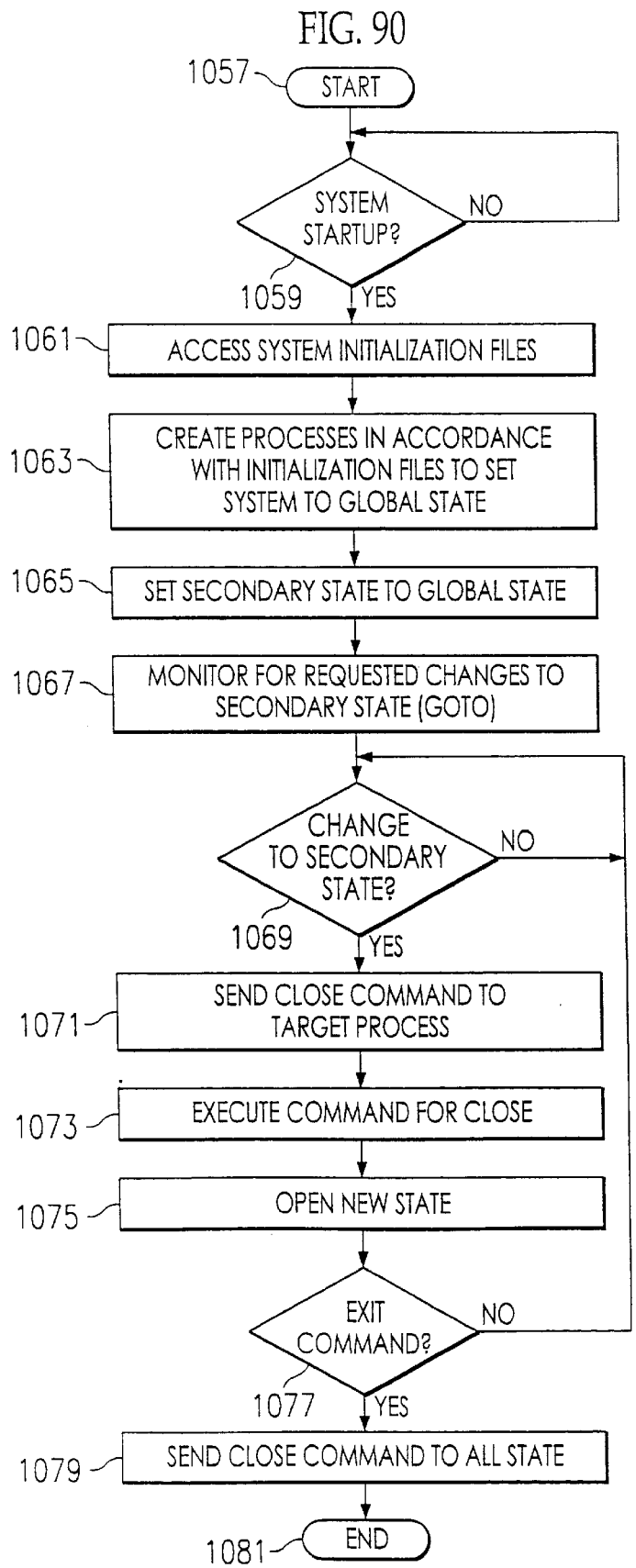
Figure 91:
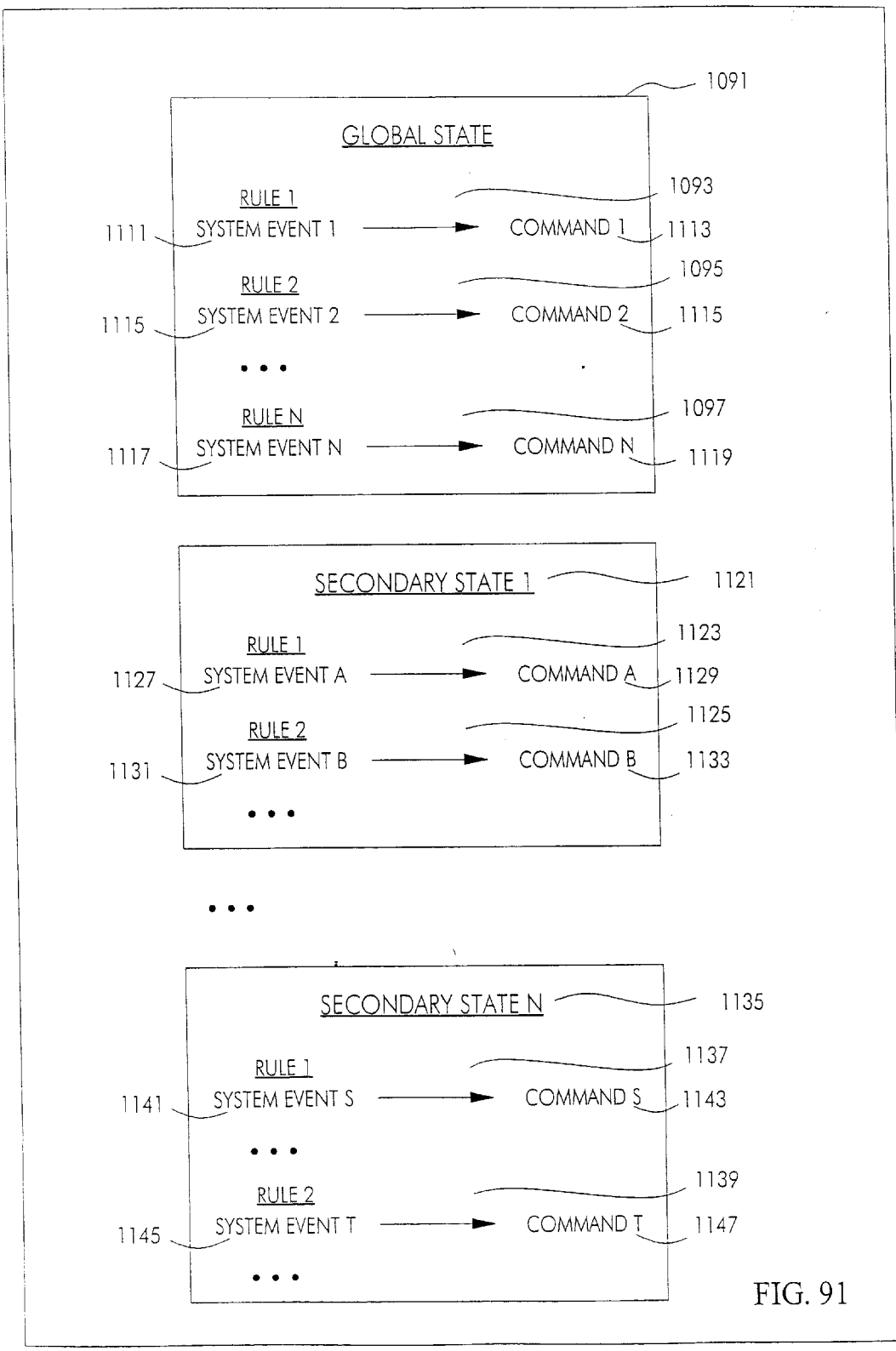
Figure 92:
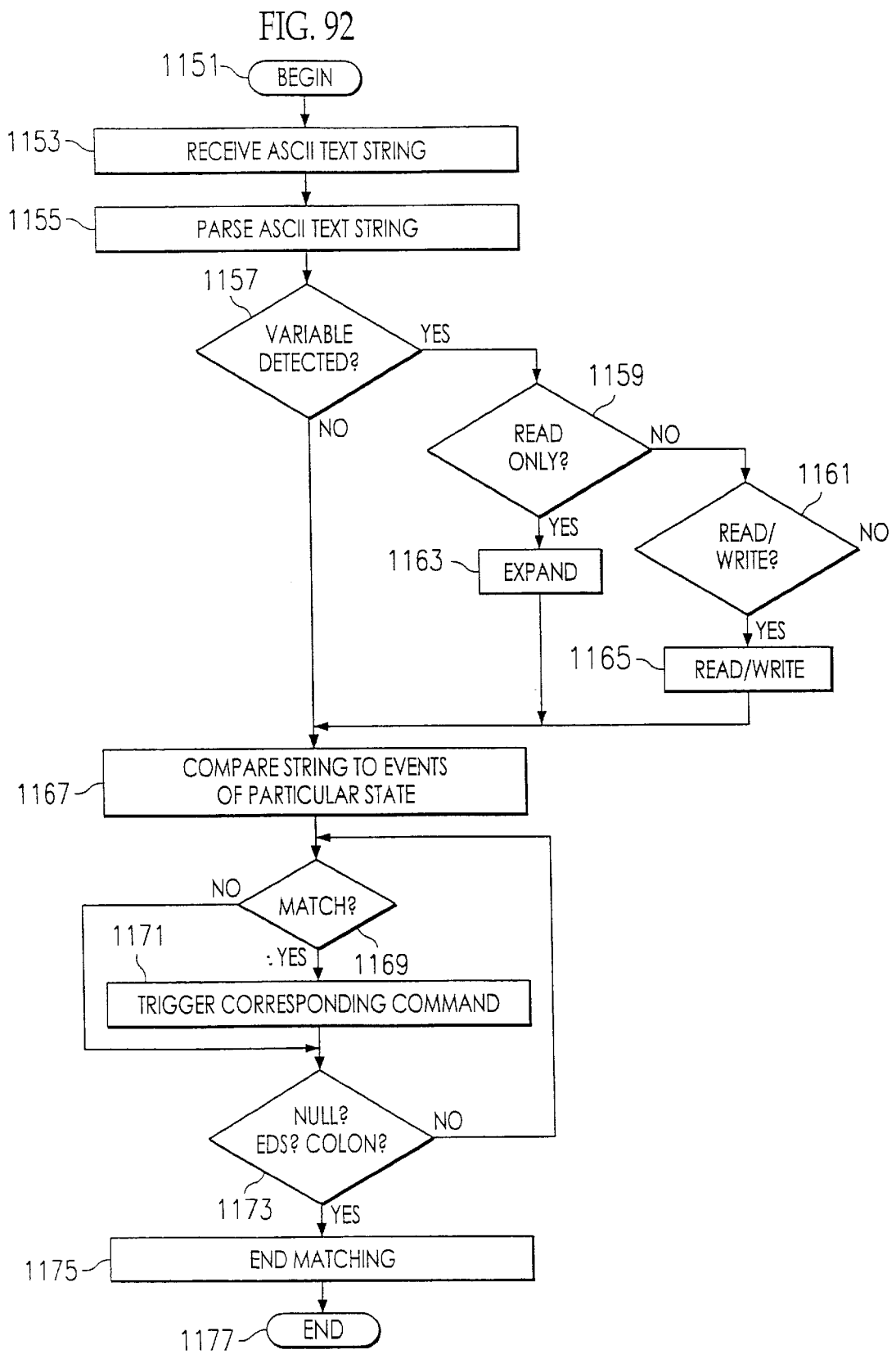
Figure 93:
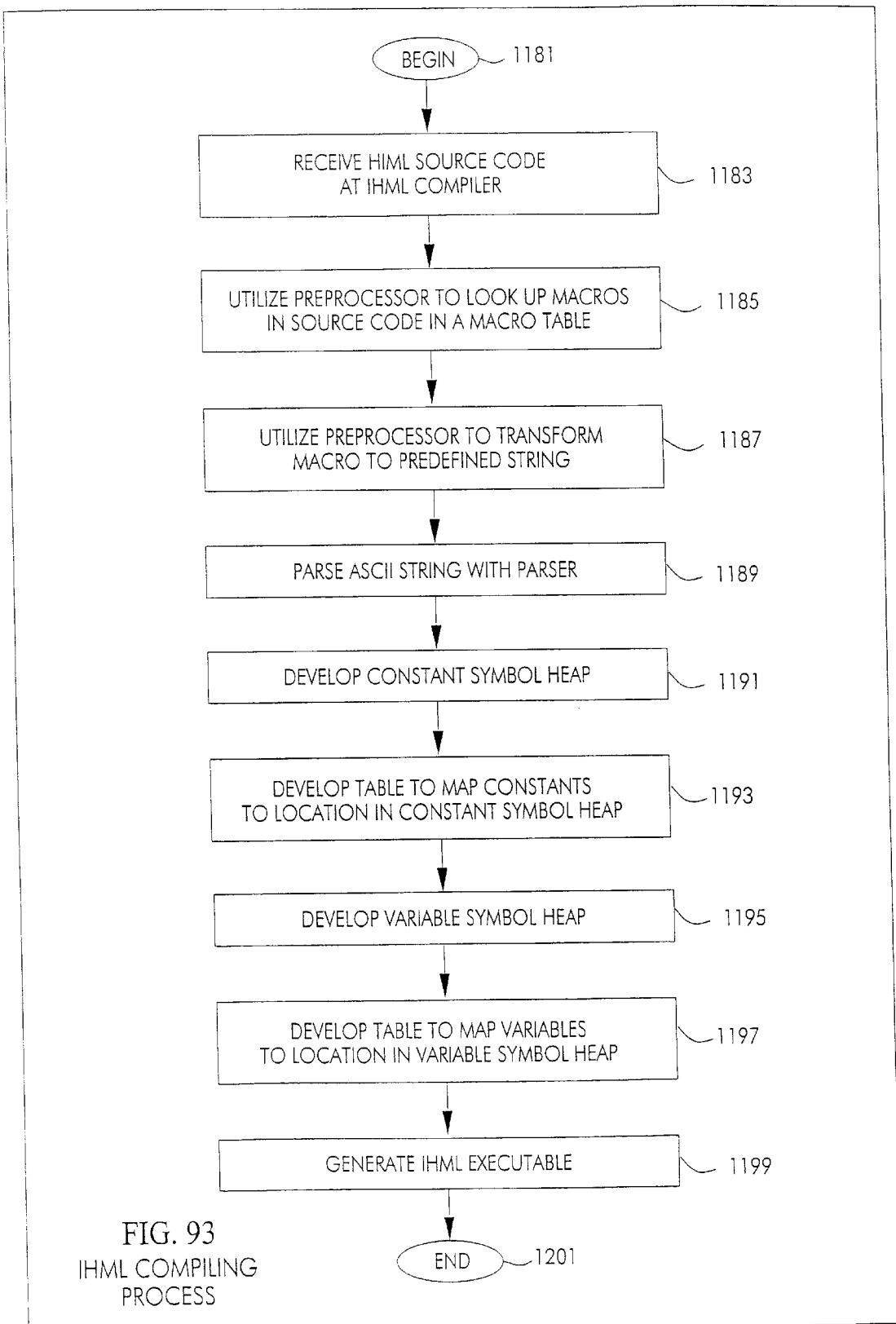
Figure 94:
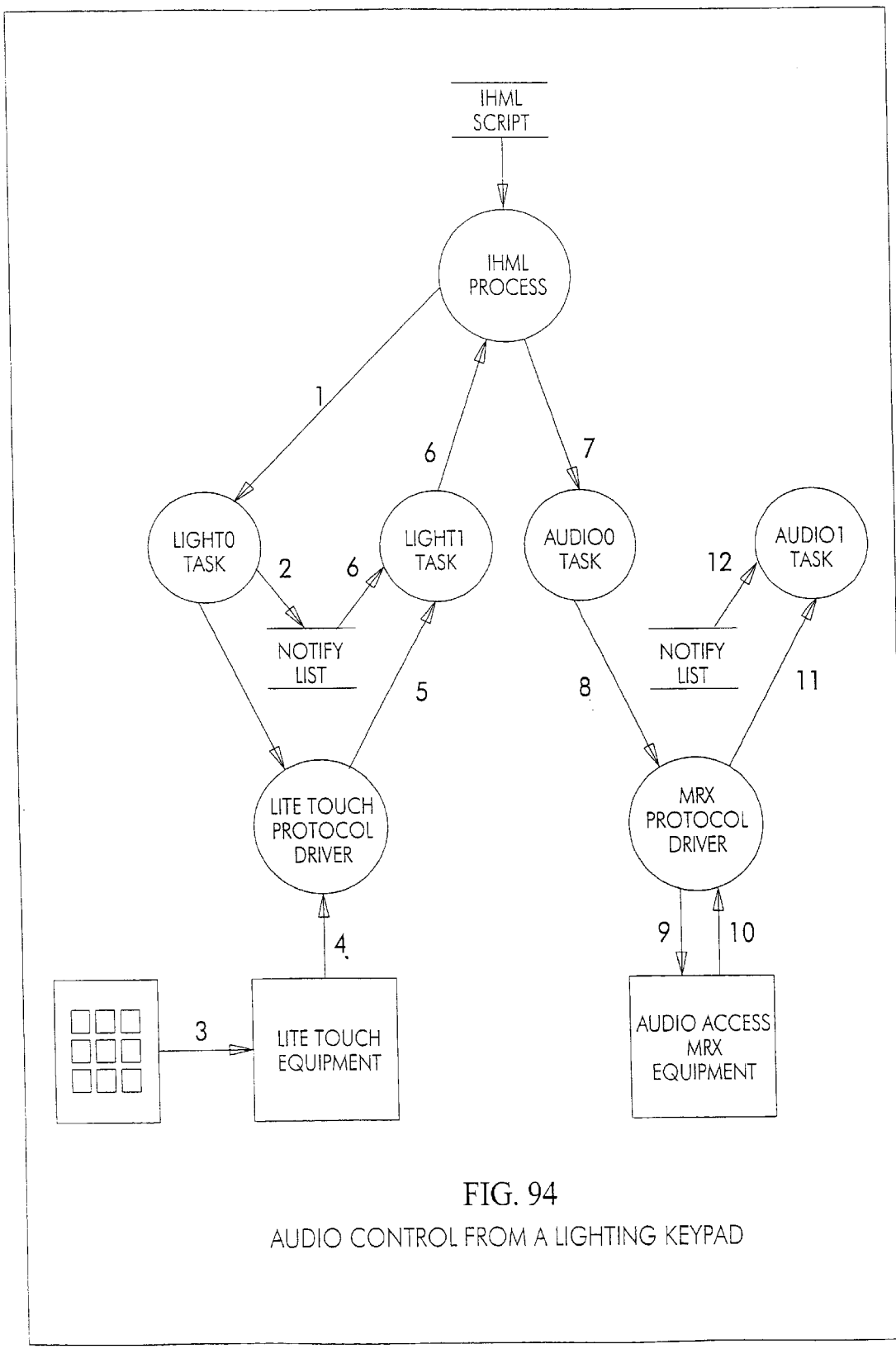
Figure 95:
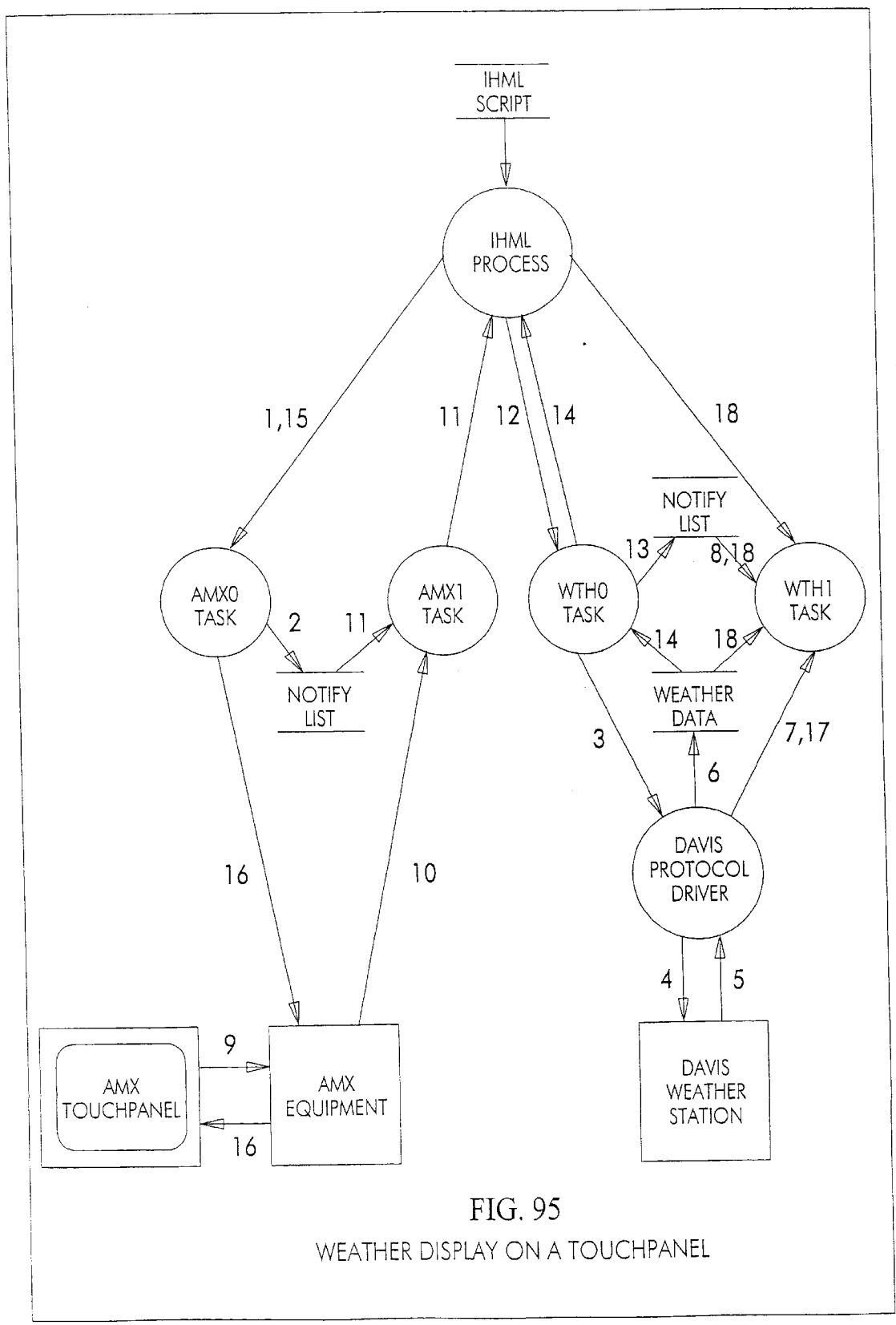
Figure 96:
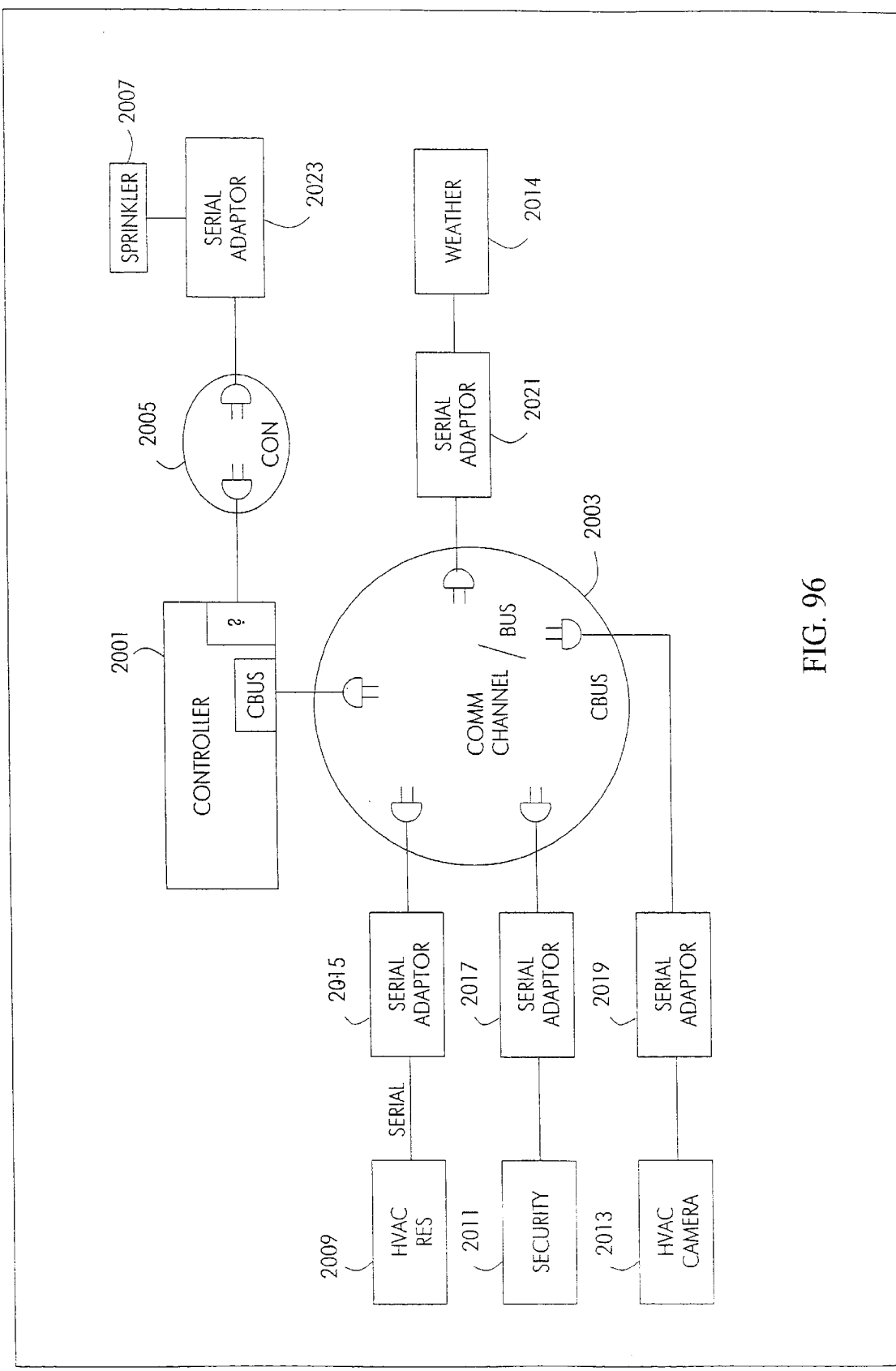
Figure 97:
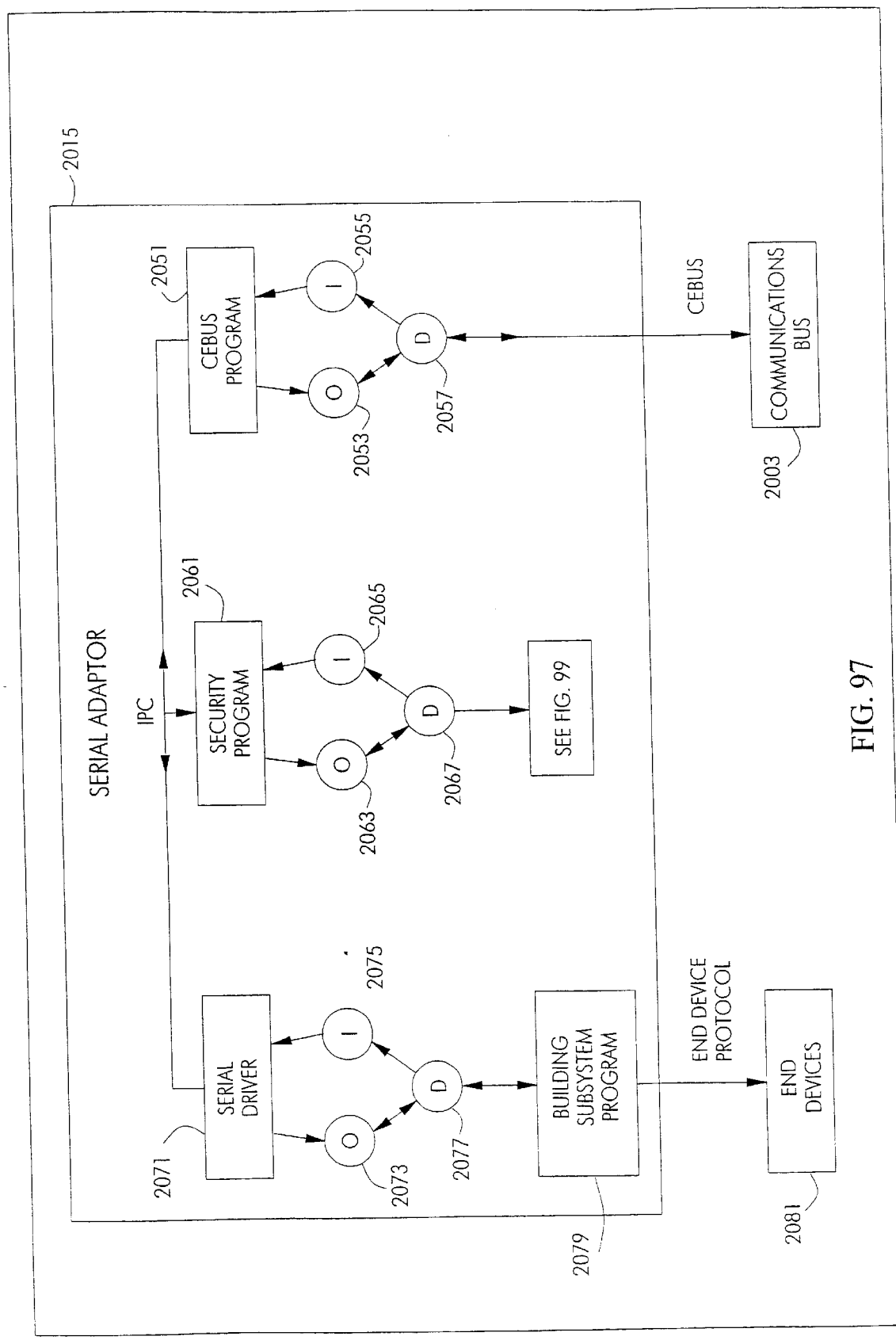
Figure 98:
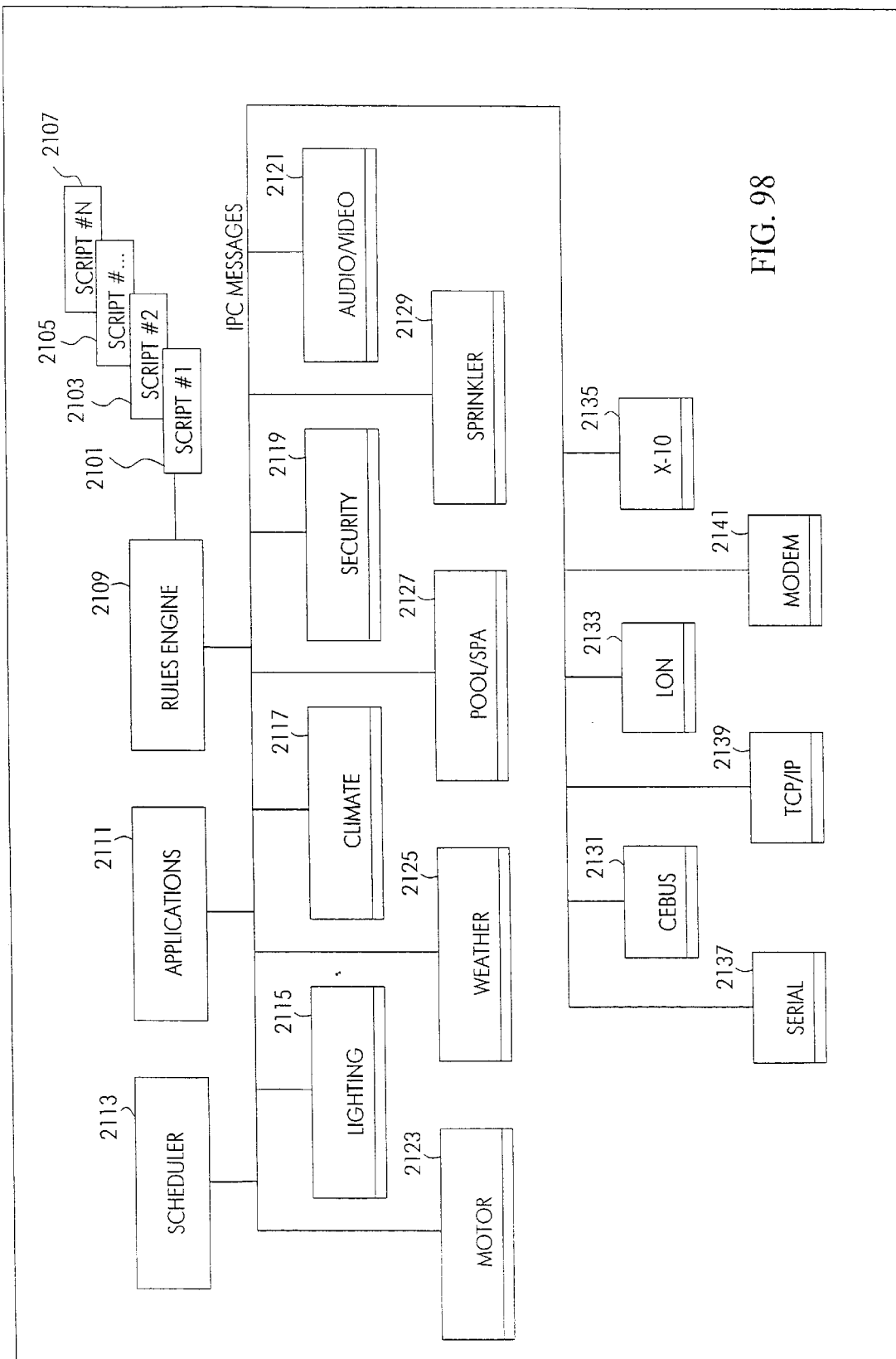

FIG. 4 provides a high level structure diagram of the software architecture of the present invention;

FIG. 5 is a block diagram representation of exemplary software modules of the middleware;

FIG. 6 is a diagram of the task-pair and driver architecture of the software of the present invention;

FIG. 7 is a diagram depiction of the utilization of subsystem gateways in the software of the present invention;

FIG. 8 is a diagram depiction of the external interface gateways in accordance with the present invention;

FIG. 9 is a pictorial representation of a prior art expert system model;

FIG. 10 is a pictorial representation of the present invention which illustrates the parallels between the present invention and prior art expert system models;

FIG. 11 is a block diagram representation of the event/response architecture of the present invention;

FIG. 12 is a block diagram representation of the global and secondary states utilized in the present invention;

FIG. 13 is a block diagram and flow representation of the organization of a compile utilized with the present invention;

FIG. 14 is a block diagram representation of the utilization of Reverse Polish Notation utilized with the P-code of the present invention;

FIG. 15 is a tabular presentation of the format of the "header" utilized in the p-code file of the present invention;

FIG. 16 is a tabular presentation of a state table utilized in the present invention;

FIG. 17 is a tabular presentation of the token format utilized in the present invention;

FIG. 18 is a pictorial representation of a physical file format in accordance with the preferred embodiment of the present invention;

FIG. 19 is a tabular representation of the extended token stack utilized in accordance with the preferred embodiment of the present invention;

FIG. 20 is a pictorial representation of exemplary control over a twenty button user input device;

FIG. 21 is a tabular presentation of message headers utilized with the interprocess control commands in accordance with the preferred embodiment of the present invention;

FIGS. 22 through 86 are tabular representations of particular formats for interprocess control commands in accordance with the preferred embodiment of the present invention;

FIG. 87 is a flowchart representation of the "notify" command processing flow;

FIG. 88 is a flowchart representation of the "cancel" command processing flow;

FIG. 89 is a flowchart representation of the "status request" command processing flow;

FIG. 90 is a flowchart representation of the start-up and shut-down processing flow;

FIG. 91 is a graphical representation and illustration of the global and secondary states;

FIG. 92 is a flowchart representation of the text parsing processing flow;

FIG. 93 is a flowchart representation of text processing utilized to convert IHML source code to IHML executable code;

FIG. 94 is a block diagram and flow depiction of an exemplary utilization of the present invention to control audio output from a lighting keypad;

FIG. 95 is a pictorial and flow chart representation of the utilization of the present invention to display weather information on a touch panel;

FIGS. 96 through 98 are block diagram representations of an alternative embodiment of the present invention which utilizes distributed processing to control building automation; and.

Figure 99:
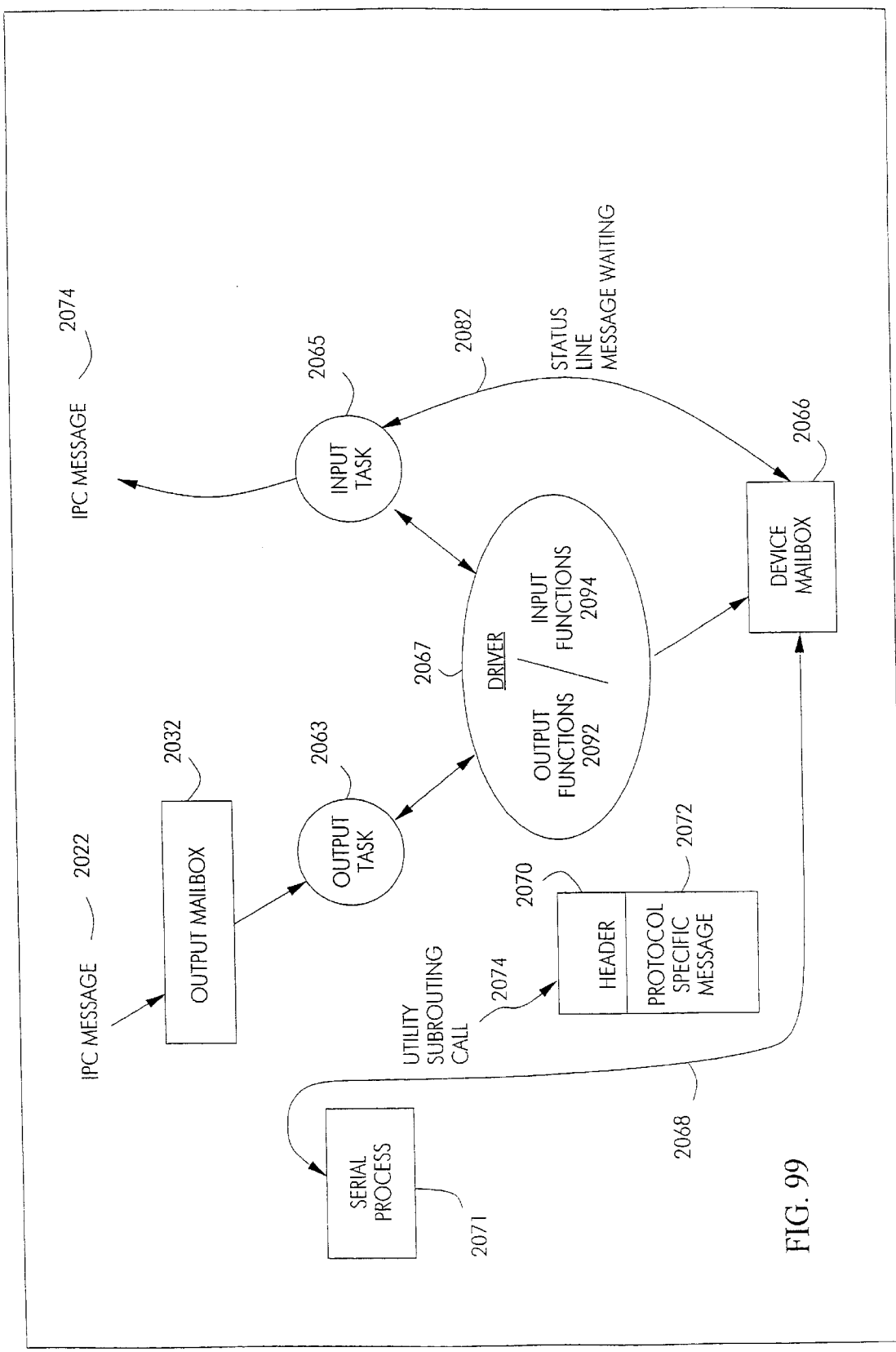

FIG. 99 is a block diagram representation of the communication link between the driver program and the serial process within a serial adapter in accordance with the present invention.

6. DETAILED DESCRIPTION OF THE INVENTION

The following detailed description includes the following subsections:

1. Overview of the Building Automation System;
2. An Overview of the Software;
3. Architecture of the Middleware;
4. The Metalanguage;
5. Interprocess Control;
6. Exemplary Scenarios; and
7. Alternative Embodiment with Distributed Processing.

1. Overview of the Building Automation System

Figure 1:
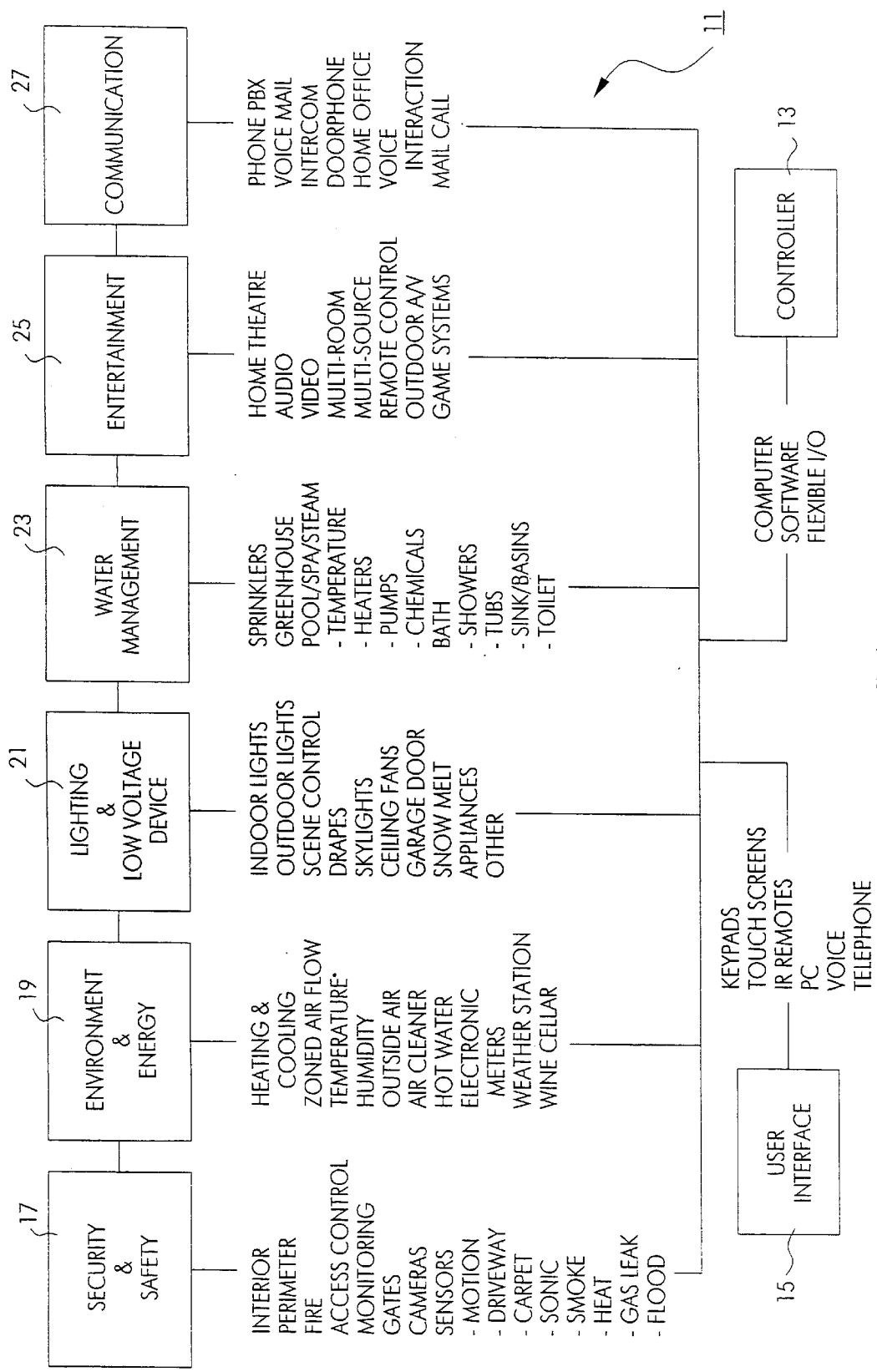
FIG. 1 is a block diagram depiction of a building automation system in accordance with the present invention.

FIG. 1 is a block diagram depiction of a building automation system 11 in accordance with the present invention. A controller 13 maintains in memory a plurality of computer programs which can be utilized to control a variety of building systems, including a security and safety system 17, an environment and energy system 19, a lighting and low voltage device system 21, a water management system 23, an entertainment system 25, and a communication system 27. A user interface system 15 is utilized to allow the human operator to interact with controller 13 in order to exert control over these and other building systems. For each of the building systems depicted in FIG. 1, a variety of exemplary end devices are identified, and set forth in tabular form beneath the block which identifies the particular building system. A variety of conventional interface devices are also identified with the user interface 15 block.

Figure 2B:
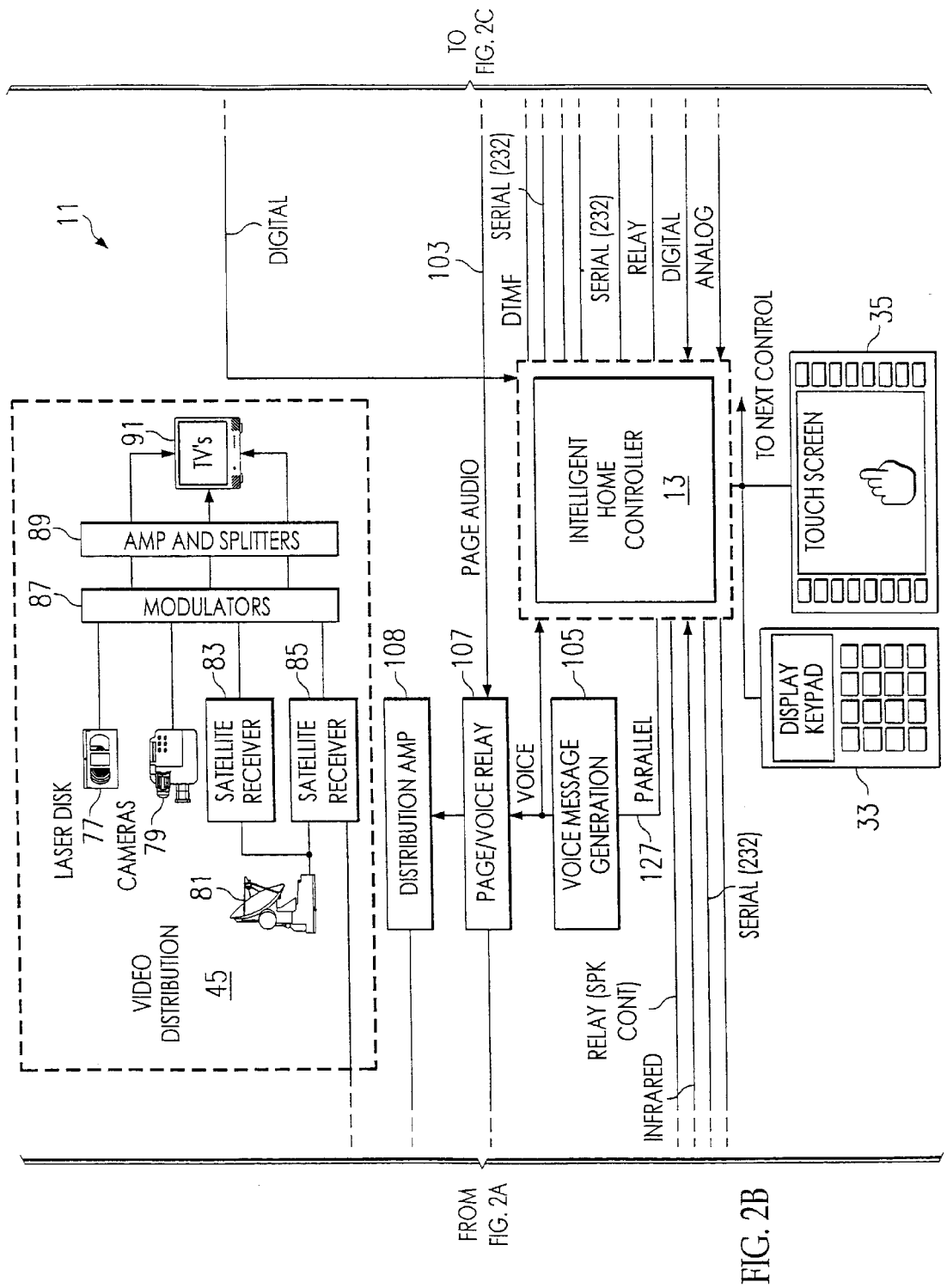
FIG. 2 is a more detailed block diagram depiction of an integrated building system constructed in accordance with the present invention.
Figure 2C:
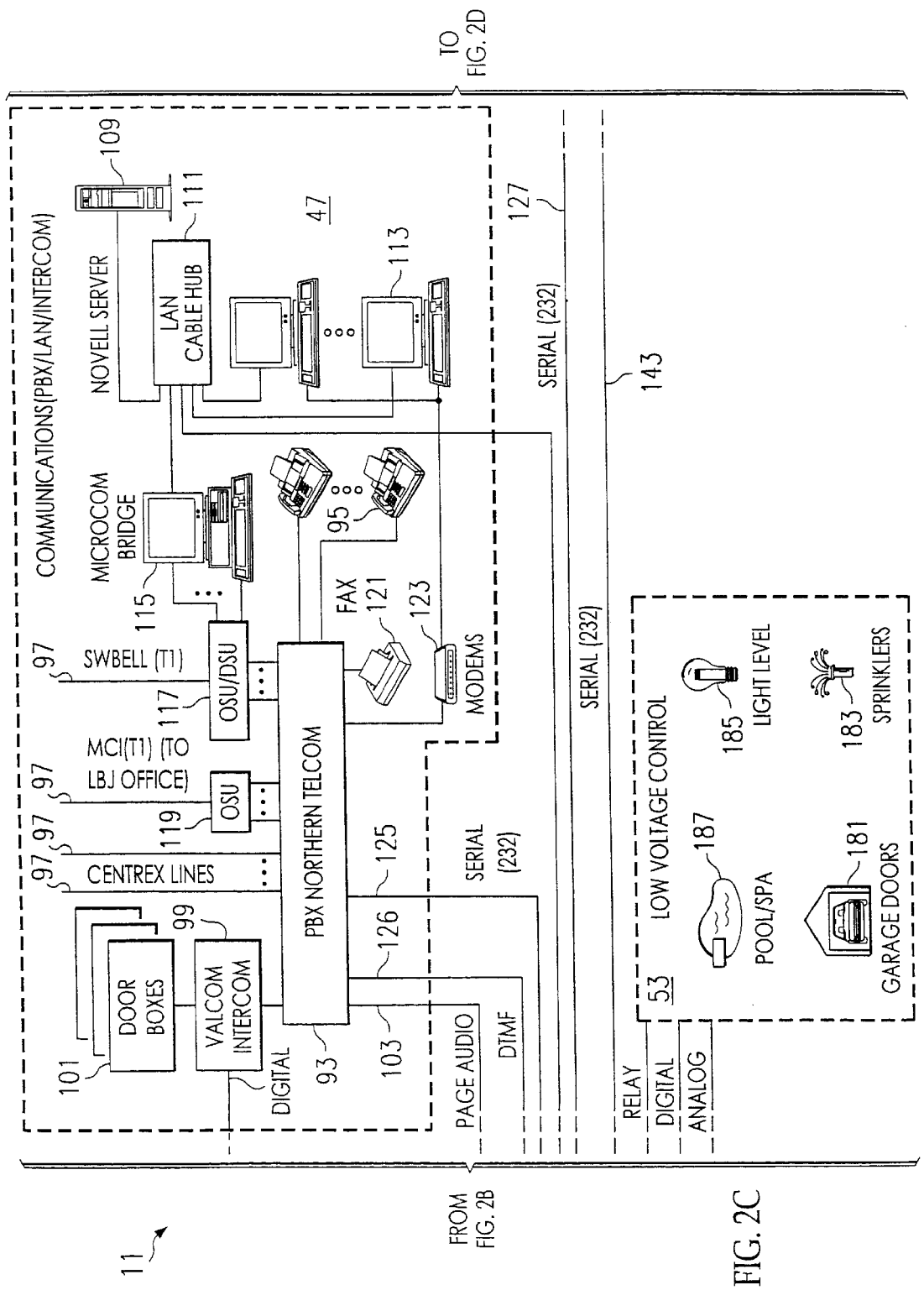
Figure 2D:
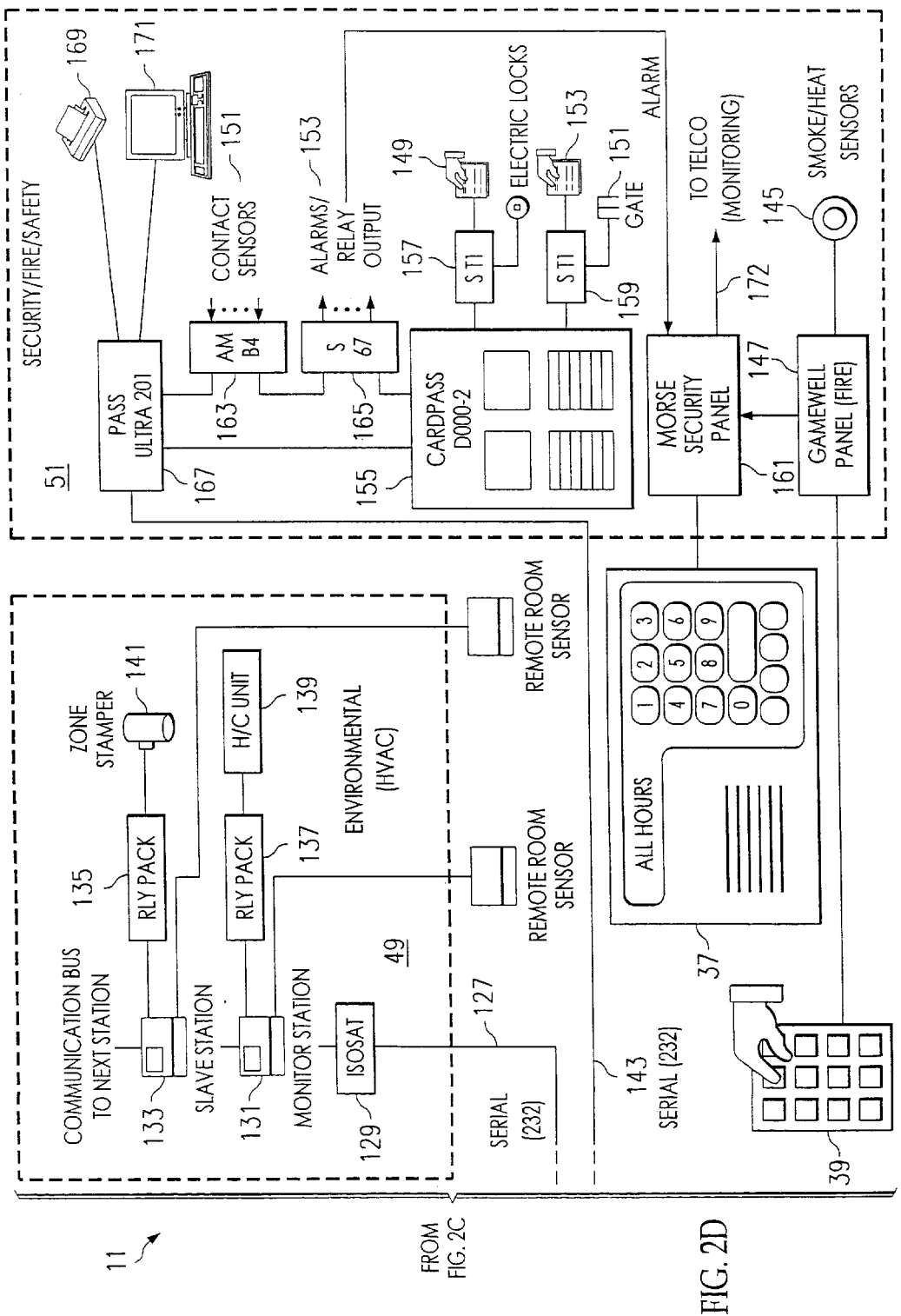

FIG. 2 is a more detailed block diagram depiction of an integrated building system 11 constructed in accordance with the present invention. As is shown, controller 13 is communicatively connected to a variety of subsystems. The particular end devices and communication medium are merely exemplary, and not intended to be limiting of the scope of the present invention. A user may interact with controller 13 and systems under its control utilizing a variety of exemplary user interface devices, including infrared controller 29, radio frequency controller 31, display keypad 33, touch screen 35, security panel 37, and keypad 39.

Controller 13 communicates through serial data with lighting/appliance control 41, which provides power to outlets 55, lighting 57, drapes 59, and general load switching 61, all of which are subject to "dimming" control which varies the amount of electricity provided to the various end devices.

Controller 13 controls and/or communicates with audio/video control 43, via either infrared signals or serial electrical signals. Controller 13 provides commands to audio controller 63 (such as an "Audio Ease" system) and its associated volume control 65 and speakers 67. Controller 13 also provides control over CD player 69, tuner 71, tape player 73, and home theater 75.

Controller 13 also manages the operation of video distribution system 45, which includes laser disk 77, camera 79, satellite antenna 81, satellite receivers 83, 85, modulators 87, amplifiers and splitters 89, and televisions 91.

Controller 13 likewise controls the operation of communication system 47. Preferably, communication system 47 includes a PBX telephone system 93 and its associated telephone end devices 95. The PBX telephone system 93 receives one or more input lines 97, some of which communicate through CSU 119, and CSU/DSU 117.

The PBX telephone system 93 may be utilized to send a voice page throughout the building by interacting with page/voice relay 107 through distribution amp 108 to broadcast pages utilizing the speakers 67 of the audio/video control 43. Controller 13 may also control voice message generator 105 through parallel data line 127 in order to generate a synthetic human voice communication which may be routed through page/voice relay 107 and distribution amp 108 to the audio/video control 43 for broadcasting on speakers 67.

PBX telephone system 93 may receive as an input intercom messages from door boxes 101, which are routed through intercom processor 99. PBX telephone system receives fax 121 and modem 123 input. The PBX telephone system 93 may also interact with Novell server 109, local area network cable hub 111, and associated computers 113, through a bridge such as MicroCom bridge 115. In general, PBX telephone system 93 may communicate with controller 13 utilizing serial bus 125 or DTMF line 126.

Environmental system 149 is likewise under the control of controller 13 through the serial data line 127. Environmental system 149 includes one or more HVAC units 139, and one or more zone dampers 141, and their associated relay packs 137, 135. Environmental system 149 further includes thermostatic systems which allow for the monitoring and control of temperature utilizing the HVAC units 139, and preferably include isosat 129, monitor stat 131, and slave stat 133.

Controller 13 likewise can be utilized to control security/fire system 51 through serial data line 143. A variety of end devices are present in security/fire system 51 including smoke/heat sensors 145, electronic gate 151, electronic lock 147, contact sensors 151, card pass system 155. Smoke/heat sensors 145 communicate through fire panel 147 to monitoring security panel 161. Monitoring security panel 161 allows for telephonic monitoring of the alarm system and alarm condition transmission via telephone line 172. Electronic gate 151 and its associated keypad 153 communicate through ST1 159 to card pass system 155. Likewise, electronic lock 147 and its associated keypad 149 communicate through ST1 157 to card pass system 155. Contact systems 151 are utilized to monitor the state of doors and windows, and communicate through AM 163 to Pass Ultra 201 system 167 and the card pass system 155. The alarms/relay output 153, communicate through bus 165 to card pass system 155. Pass Ultra 201 system 167 communicates serial data to controller 13, but also can be utilized to communicate data to personal computer 171 and any associated printing device 169, such as devices utilized in security stations.

A variety of low voltage devices 53 are also under the control of controller 13 through analog and digital lines, as well as relay lines. The low voltage devices include garage doors 181, lawn sprinklers 183, exterior lights 185, and pool/spa heaters 187.

FIG. 2 is merely an exemplary depiction of an integrated building automation system 11. A variety of additional building systems and devices may be placed under automated control, a variety of additional or alternative communication technologies may be utilized, and a variety of different electrical configurations are possible utilizing the present invention.

In the present invention, controller 13 executes computer programs to allow the user to maintain control of the building systems. FIG. 3 is a block diagram depiction of the preferred embodiment of the software utilized by controller 13 (of FIGS. 1 and 2) to obtain optimum control over the building systems. The building automation software 201 includes at least one user interface 203 (but typically a plurality of different types of user interfaces); applications 205 which includes an intelligent home metalanguage application ("IHML") 217, and at least one script, preferably, but not necessarily, written utilizing the intelligent home metalanguage application 217; middleware which is composed of a plurality of software modules, each dedicated to a different building system, as well as a plurality of software modules dedicated for communication purposes, all of which may communicate utilizing an interprocess communication (IPC) system 219; an operating system application interface (O/S API) 209; a patch panel database 211; a real time kernel 213; and an operating system 215. The building automation software 201 may be accessed from a remote location utilizing any conventional or novel remote communication technology, such as via modem 221, worldwide web 223, or local area network 225 and/or wide area network 226.

Operating system 215 may comprise any conventional operating system, such as DOS, Windows 3.11, Windows 95, or Unix operating systems, or any other commercially available operating system. In the preferred embodiment of the present invention, the real time kernel 213 comprises the commercially available "RT Kernel", a real time multitasking kernel for C, Version 3.0, offered by On Time Informatik Gmbh. This software allows for real time multitasking by providing a necessary mechanism for handling multiple simultaneous interrupts.

A variety of features of software 201 allow for improved control of building systems, including:

(1) real-time multitasking environment, to provide necessary mechanisms for handling multiple simultaneous inputs;

(2) generic interprocess communications, to provide context-sensitive message formats;

(3) globally-accessible utility processes, to handle non-system-specific tasks such as initialization, serial communications, disk access and event logging;

(4) modular subsystem interface processes and gateways, to maximize code flexibility and reusability;

(5) easily configurable and customizable using data files to eliminate custom software and decrease installation costs while supporting increased user interface capabilities;

(6) unlimited number and type of user interfaces with no perceivable performance degradation; and (7) remote access to enable off-site integration, diagnostics and modification.

FIG. 4 provides a high level structure diagram of the software architecture. As is shown therein, real time kernel 213 is communicatively coupled to utility processes 231, subsystem processes 233, subsystem gate-ways 235, and external gateways 237. The types of items which can be considered as included within the subsystem processes 233 can best be understood by simultaneous reference to FIGS. 3 and 4. Subsystem processes 233 include software modules which are adapted to directly control different types of building systems, such as lights module 241, HVAC module 243, security module 245, audio visual module 247, weather module 249, sprinkler module 251, pool/spa module 253 and other end devices module 255. The types of items that are included in the subsystem gateways 235 now can be best understood by simultaneous reference to FIGS. 3 and 4. Subsystem gateways 235 include software modules which are adapted to allow for communication in a particular communication protocol between any of the software modules which constitute middleware 207, or between one of software modules 207 and particular end devices or subsystems. These subsystems 235 include X-10 module 257, CEbus module 259, and Lonworks module 251, and other I/O module 269. The RS232 module 265 may be used for intermodule communication, communication and control of end devices, and/or communication with systems and/or devices external to the building. The types of modules which are included in the external gateways 237 can best be understood with simultaneous reference to FIGS. 3 and 4. External gateways may 237 include RS232 module 265, TCP/IP module 267, modem module 263, and other I/O module 271.

Each of the modules of middleware 207 include a driver section which allows each module to send and receive data or commands in a format suitable for one or more particular end devices, such as transceivers, transmitters, and receivers. For example, audio/visual module 247 may be adapted to send and receive data commands through a touch screen or graphical user interface on a CRT device, to receive data or commands from an infrared remote control device, or receive data or commands from a numeric keypad.

Additionally, the particular software modules of middleware 207 are properly preprogrammed to be easily communicatively coupled to a variety of commercially available building subsystems or particular end devices. This is best understood with reference to FIG. 5.

As is depicted, lights module 241 is adapted to support a variety of command and communication protocols from commercially available systems which are manufactured by third party manufacturers. For example, lights module 241 must be able to support a fairly standard and commonly used communication protocols, such as X-10 protocol 281, the Light Touch protocols 283, including the Light Touch 2000 protocol 285, the Light Touch Standard protocol 287, and the Light Touch Elite protocol 289. Lights module 241 shall also accommodate the Vantage protocol 291, the Lutron protocol 293, including the Lutron Orion protocol 295 and the Lutron Homeworks 297.

The HVAC module 243 must support a variety of differing and commercially available command and communication protocols for a variety of third-party vendors, including the Carrier protocol 301, including the Temp Zone protocol 303, the Comfort Zone protocol 305, the VVT protocol 307. Additionally, the HVAC module 243 should support the Trane protocol 309, the RCS protocol 311, and the Enerzone protocol 313.

In similar fashion, the audio/visual module 247 must support a variety of commercially available command communication protocols of a variety of systems or end devices manufactured by third-party vendors, including the Audio Ease protocol 315 including the Audio Ease Standard protocol 317, and the Audio Ease Monaco protocol 319. Additionally, the audio/visual module 247 should accommodate the Audio Access protocol 321, including the Audio Access P600 protocol 323 and the Audio Access MRX protocol 325. Additionally, the audio/visual module 247 should accommodate the ADA protocol 327 and the Audio Control Director protocol 329.

The security module 245 should accommodate a variety of commercially available command and communication protocols for systems and end devices manufactured by third-party manufacturers, including the ADEMCO 4140XMP protocol 329, the Radionics protocol 331, and the Silent Knight protocol 333.

The user interface module 269 should accommodate a variety of commercially available user interface command communication protocols including touch panel protocol 335, LCD keypad protocol 337, IR/RF remote protocol 339, home PC protocol 341, voice (announce) protocol 343, DTMF protocol 345, ADS1 347, and a facsimile protocol 349.

The other modules of middleware 207 are likewise adapted to be communicatively coupled with commercially available subsystems and end devices utilizing the communication protocols of third-party vendors. As third-party vendors generate new and different subsystems and devices which utilize still different protocols, those protocols may be added to the modules of middleware 207. It is important to note that the particular examples given with respect to FIG. 5 are merely exemplary, and not intended to be limiting. Various and other communication protocols for subsystems and end devices may be added to the existing protocols depicted therein, or particular ones of the protocol depicted in FIG. 5 may be removed, as the case may be.

2. An Overview of the Software

The software will be discussed in three major categories: (A) Core Software; (B) Interfaces; and (C) Enabling Features.

(A) Core Software

The solid foundation of the present invention is the core software which provides the common building blocks necessary to support the overlying architecture. The core software consists of (1) the real-time multitasking environment, which provides the mechanism for (2) interprocess communication and (3) the global software, providing utility functions to the remaining software.

(1) Multitasking Environment:

A traditional single-tasking architecture cannot handle simultaneous asynchronous inputs from multiple devices without system degradation. That type of software architecture tends to blend across logical boundaries (e.g. lighting vs. security). Execution time is excessive and indeterminant; for example, all software processing stops during disk access until the task is complete.

To minimize latency and time delays due to simultaneous user inputs, and to provide a deterministic environment, it was necessary to integrate a real-time multitasking kernel with the software 201. This off-the-shelf kernel 213 provides multitasking execution and a variety of interprocess communication methods, including mailboxes, message queues, and various semaphores. Since the target platform is typically a personal computer, the kernel overlays on top of DOS to provide multitasking and re-entrance features that DOS cannot provide.

The software 201 implements a cooperative scheduling system. A home automation system is essentially "event-driven" as opposed to "priority driven", whether the event is physical (user or device input) or time-based. In other words, an input event (e.g. security sensor indicates a fault) drives a series of context-sensitive outputs (e.g., nothing happens if the system is disarmed—otherwise the alarm sounds, the security monitoring company is called, and the fault location is communicated to the homeowner). Though capable of time-sliced and preemptive priority scheduling mechanisms used in other home automation systems, the software response times are quite acceptable with cooperative scheduling. Due to the processing speeds capable with a 386 (or better) PC, multiple events are processed with no perceivable delay to the user. In fact, the controller 13 is typically idle 95% of the time; in other words, the controller 13 only uses 5% of the processing power available.

(2) Interprocess Communication:

The interprocess communication (IPC) protocol provides a generic message capability between the software tasks. This allows for communication between discrete and stand alone tasks. All need for knowledge about the system as a whole has been removed; no subsystem process knows or needs to know what other subsystems are present nor how they communicate or interact.

The messages are ASCII (text) based to increase human readability which facilitates debugging and datafile generation. The metalanguage processor takes full advantage of the textual messaging, using script files to define how the subsystems will react and interact to various events. Each IPC message begins with a message header which contains routing information (what process sent it, what subsystems it's meant for, where to send status, user interface device ID, etc.) and a subheader, containing the subsystem and command IDs. Command IDs are standard across subsystems to increase readability; for example, the command ID 'N' is used for Notify Request, 'S' for Status Request, 'C' for Cancel Notify, and 'R' for Change Request. All message files are separated by a colon, (:), to increase readability. The IPC messages are readily upgradeable and expandable using secondary command IDs within the context-sensitive structure.

Subsystem-specific messages are generic for each subsystem type. For example, the same message used to request status from Vantage lighting equipment is used to request status from Lite Touch lighting equipment. Differences in subsystem equipment protocols and addressing are handled deep within the subsystem process, so as not to affect IPC-level communications.

Conditional context fields are used where appropriate; an application may not know (or care) about the state of a device when the control message is generated. For example, a lighting user interface may not care if a physical switch is turned on or off, it just needs to toggle the state whenever its local switch is pressed. In this case, the message will contain a 'T' for toggle.

Pass-through commands have been implemented to allow equipment-specific messaging, proven to dramatically decrease initial integration times. The string field after the pass-through subcommand ID, '>', is passed directly to the subsystem equipment; no internal processing is necessary.

Besides device control messages, data transfer messages have been defined to support off-line diagnostics and configuration. All datafiles may be transferred to or from a remote PC through the External Interface Gateway, as discussed below.

(3) Global Software:

The global software modules facilitate system functionality. The global software consists of the parent process (Main) and support processes for audit trail log (Audit), multiple serial port interfaces (Comm) and command-line interface (Shell).

The Main process is primarily responsible for startup, shutdown and monitoring of the system. It accesses the system initialization files to determine which processes to create, as well as system-level task parameters. If a system-critical task fails during initialization, the Main process can log the failure and shutdown affected processes, the Main process coordinates system shutdown by sending a Shutdown Request to each process. Each process then releases any allocated memory, closes disk files, and generally cleans up in preparation for shutdown. The Main process also acts as software watchdog timer and monitors all tasks for non-responsive inactivity, indicating possible software failures. If necessary, the Main process shuts down and recreates the task, using the Audit process to log the failure.

The Audit process maintains ASCII text disk file to capture events as they occur, as well as displaying them on the target system monitor in real-time. Each log entry is also tagged with the current date and time to enable off-line and post-event debugging. A multi-level logging feature allows the installer to adjust the amount and type of information that is captured. For example, detailed information may be useful for tracking a particular problem during integration. The installer can increase to the log level to capture the greatest amount of detail, tracking a thread from user input, through subsystem control and back to user feedback. The log level is minimized during normal use so as to decrease disk capacity requirements. At the minimum log level all critical errors are captures, such as the software watchdog situation described above.

The Comm process provides a communications access through the serial port interfaces. Many home subsystems provide a serial interface to a home control computer using a proprietary protocol. Standard PCs support only 2 or 4 serial communication ports (comm ports), not enough to support the full compliment of subsystems within a house. Several manufacturers have developed multi-port serial cards with up to 16 independent comm ports. The multitasking kernel supports up to 63 serial ports per system. The Comm process utilities, accessible from all subsystem processes, provide an interface to the kernel's serial communication functions. These utilities support binary as well as ASCII string and character transfers to and from the communication ports.

The Shell process provides a command-line interface, accessible at the target system as well as remotely through the External Interface Gateway, via a network, modem, or serial-interfaced PC. The Shell process provides a variety of run-time features including system shut-down, process startup and shutdown, target system windowing control, DOS command-line access, debug parameter modification (e.g., log level), direct interprocess communications, databases display, and on-line help.

(B) Interfaces

Previous experience has shown that each home system is substantially different, even if they have the same subsystems and devices present. Traditional architectures required that system-level knowledge be dispersed throughout the subsystem processors. Each subsystem required intelligence to communicate with other subsystems; interoperability dictated custom software for each client.

The software of the present invention removes the requirement for system-level knowledge at the subsystem process level. Each process is discrete and stand alone, requiring only local knowledge of the subsystem under control.

Software interface processes and gateways provide communication paths to home automation subsystems within the home, as well as providing remote access outside the home.

(C) Enabling Features (1) Database and Configuration Files:

Certain subsystem processes require configuration information. For example, the environmental control process needs to know how to communicate with the subsystem, how many zones there are, what the zones are named, capabilities each zone has (e.g., status only, scheduling capabilities, automatic switchover between heat and cool, etc.). Process configuration parameters are created in the process software itself, but run-time configuration occurs through three mechanisms: the system initialization file, a subsystem database configuration file, and driver-specific capabilities.

The system initialization file defines the overall system: what processes will be started, communication parameters, IHML scripts and Timer files to start on initialization, and what subsystem devices are present. Though default parameters are created in the process software, those parameters can be changed using process-specific directives in the system initialization file. Some driver-specific information may also be included in the initialization file, provided the quantity of data is limited. For example, the 'amx_env' section defines addressing and capability information on every HVAC zone controlled through the amx_env protocol driver.

Subsystem database configuration files define the subsystem's configuration. For example, the lighting process data file defines the address, type, function and name of every light switch. Subsystem configuration files are used when the quantity of data involved would deter its inclusion in the system initialization file.

Finally, protocol drivers themselves provide some level of configuration to the rest of the system. During development it is determined which of the possible subsystem capabilities each protocol driver provides. In the case of lighting, some interfaces require polling, while others already provide full asynchronous feedback. On process initialization, the driver informs the controlling process which capabilities it possesses. The controlling process can use the driver-provided capability or can provide the capability itself, based on configuration directives in the system initialization file.

(2) User Interfaces:

User interfaces fall into two categories: configuration and control. Configuration user interfaces are used to define what operation(s) will occur based on a user input or other event. In the present invention, configuration tools are textual in nature.

Control user interfaces are devices which initiate an operation or series of operations. Control user interfaces include subsystem devices (e.g., lighting keypads), telephones, and custom controls (touchpanels, MLCDs, and RF/IR remote control units). Using the IHML Metalanguage, it is possible to initiate any controllable operation or series of operations based on any input from any device attached to the controller 13.

This feature allows the homeowner to select user interfaces that are appropriate for every situation. For example, expensive workstations and touchpanels are often used in high-use areas where a great deal of control and status feedback is desired. The kitchen, master suite and media/theater rooms are popular locations for touchpanels. The home office or study is perfect for a workstation interface.

Moderate control and status can be accomplished through MLCDs and display telephones, where IHML-driven messages allow the homeowner access to small amounts of information. For comparison, MLCDs and display telephones are from ¼ to ⅛ the cost of touchpanels. Display telephones can be located in any room equipped with a telephone jack, while MLCDs are usually located near entry/exit doors.

Local control can be accomplished using a variety of user interfaces that are even more economical. Standard telephones, keypads and hand-held remote controls can control local or system-wide functions, but have limited feedback. Standard telephones provide control and voice feedback for a single device or zone at a time. Keypads provide LED indicators for on/off status on a limited number of devices. RF and IR remotes provide no status feedback at all, but provide non-wired control which is not possible with other interface devices. The cost for these devices is a fraction of the touchpanel cost.

The controller 13 is thus capable of simultaneously interfacing to any number of these and other user interface devices. The homeowner may select a wide variety of products to be used around the home for different situations, a cost-effective alternative to closed architecture systems.

(3) Notify List:

It is necessary to provide feedback to a user as to the state of the subsystems, prior to and during control. For example, it is not sufficient to emulate an RF remote garage door opener without an indication that the garage door is up or down, allowing the user to decide whether to push the control button or not. Most garage door openers do not directly provide status as to whether the garage door is up or down; external sensors, possibly connected to another subsystem, may be required to provide status feedback. The user interface also needs continuous feedback to determine if the garage door really went down when requested. In addition, it is common for multiple user interfaces to need simultaneous feedback on the same device. There are three basic problems: some subsystems do not provide direct status, some subsystems do not provide asynchronous status updates, and multiple user interfaces may require simultaneous feedback.

The responsibility of matching an external sensor input to device status is managed by the InteliHome Meta Language (IHML) script, as discussed below. The other two problems are solved using the real-time notify list concept; the controller 13 provides real-time continuous updates to an unlimited number of user interfaces simultaneously, while limiting polling to only the lowest level protocol drivers, and only then when necessitated by deficiencies in equipment feedback.

Each process maintains a notify list. When a user interface requires real-time feedback on a device, the process receives an IPC Notify Request message. The process adds the feedback information (device/zone ID, user interface address, and calling process) to its notify list, requests status from the subsystem, and returns Update Status messages to each of the calling processes. The Update Status message will include the user interface address, device/zone ID, and current state. If asynchronous status updates are received, the notify list is checked for that device/zone. If listed, Update Status messages are again sent to all calling processes. This continues until a Cancel Notify message is sent from the calling process, and the subsystem process purges that entry from the notify list.

FIG. 87 is a flowchart representation of the general procedure utilized in the software of the present invention to issue and respond to a "notify command." The process begins at software block 1001 and continues at software block 1003, wherein a particular source process determines that it requires substantially continuous status information from any other process in the automation system. In accordance with software block 1005, the source process develops a message header which includes routing information and a subheader which includes command information. The particular format of the header will be discussed elsewhere in this application. The building automation system will utilize the routing information to pass the notify command to the desired target process. In accordance with block 1007, the source process utilizes the input task to pass a text command string to a text processing program. Next, in accordance with block 1009, the text processing program parses the text task command. This will be discussed in detail elsewhere in this application. Then, in accordance with block 1011, the text processing program passes the notify command to the target process. In particular, the notify command is passed to the output task associated with the particular target process. Then, in accordance with block 1013, the target process adds the source process to its notify list. The notify list is discussed elsewhere in this application, and constitutes a list associated with a particular process which determines the recipients of status information and the parameters associated with the passing of the status information.

Then, in accordance with block 1015, the target process utilizes its input task to pass status information to the source process in accordance with the notify parameters. The status information is passed utilizing an "update status" command. The process ends at block 1017.

FIG. 88 is a flowchart representation of utilization of the "cancel" command in accordance with the present invention. The process begins at block 1021, and continues at block 1023, wherein the source process determines that it no longer requires substantially continuous status information. In accordance with block 1025, the source process develops a message header with routing information and a subheader with command information. The command information will constitute a "cancel" command. Then, in accordance with block 1027, the source process utilizes its input task to pass text command strings to a text processing program. Then, in accordance with block 1029, the text processing program parses the text task command string. The text processing program will then pass the cancel command to the target process output task in accordance with block 1031. Then, in accordance with block 1033, the target process removes the status item from it's notify list and the process ends at block 1035.

FIG. 89 is a flowchart representation of the utilization of a "status" command in order to elicit status information from a particular process. The process begins at block 1041, and continues at block 1043, wherein a source process requires one-time status information from another process. Then, in accordance with block 1045, the source process develops a message header with routing information and a subheader with command information. The command information will include the "status" command. Then, in accordance with block 1047, the source process utilizes its input tasks to pass text command strings to the text processing program. In accordance with block 1049, the text processing program parses the text task command. As a result of the parsing operation, in accordance with block 1051, the text processing program passes the "status" command to the target process output task. Then, in accordance with block 1053, the target process responds to the status command by passing status information to the source process, preferably utilizing its input task, and the process ends at block 1055.

If the subsystem is not capable of providing asynchronous status updates, the subsystem is polled at regular, configurable intervals. In some processes, the number of devices to poll is quite large. This is the case with the lighting process, where there may be hundreds of lighting switches in large installations. In order to conserve processing time and minimize latency, only those devices/zones in the notify list are polled.

There are cases where a process needs immediate status information, but does not require continuous feedback. One example relates to a light sensor input device. A client may wish certain functions to react differently based on whether it is light outside, possibly the lights attached to a certain function would not come on during daylight hours, but would come on after dusk. To handle this situation, the Status Request message is used. Status of the device is returned immediately to the calling process, but the device is not added to the notify list. A separate message reduces IPC message traffic, since Notify/Cancel messages would have to be used if the Status Request were not available.

It is important to re-stress the capabilities that the notify list provides, for it is unique among home system control software:

(1) real-time, continuous status feedback, whether or not the subsystem is capable of such;
(2) polling limited to the low level protocol drivers, eliminating system knowledge of its existence; and
(3) simultaneous feedback to multiple user interfaces without degradation of system performance.
(4) Event Scheduling:

The event scheduling capabilities of the present invention are extensive. Single or multiple events may be executed based on the month, day of the month, day of the week, or time of day.

The simplest example is based on inexpensive light timers set to turn on the exterior lights at 6:00 p.m. every evening and turn them off at 6:00 a.m. every morning, providing nighttime security. Throughout the year sunrise and sunset times can vary by several hours. An external light sensor is used to automatically control the lights at dusk and dawn, but installation and interfacing issues increase system cost. Using the event scheduler feature of the present invention, the control times can be automatically adjusted throughout the year, based on calculated sunrise/sunset times for the location of the residence.

Another example concerns sprinkler scheduling. Though moisture sensors and weather stations can be interfaced to the sprinkler program through IHML scripts, the event scheduler feature of the present invention can adjust the sprinkler zones' duration and frequency if those devices are not present in the system. The average rainfall by month can be used to calculate 12 different sprinkler schedules. In some locations, a seasonal schedule may be sufficient. Use of the event scheduler in conjunction with external sensors allows the sprinkler system to become truly automatic, lending artificial intelligence properties to an otherwise limited subsystem.

The event scheduler can even be configured for specific days or dates. For example, a "Good Morning Kids" script can execute on weekdays throughout the school year, but not during scheduled vacations. At midnight on December 31st of every year, a voice announcement can bring in the new year.

3. Architecture of the Middleware (1) Modular Subsystem Processes:

The subsystem software architecture has been designed using modular techniques to maximize code reuse and minimize customization. The processes are segregated by subsystem type (e.g. lighting, security, environmental control, etc.) and are based on a task-pair and driver architecture. As shown in FIG. 6, each subsystem process consists of an input task 241, an output task 243, and subsystem-specific protocol driver 245. Even in multitasking environments, a task can only pend on one condition at a time. In the case of a controller 13 process, there are two conditions, an incoming message from an external equipment, or an incoming message from another process. If a single I/O task was utilized, the two message queues would have to be polled or time-sliced, as is done in many other home automation systems. The controller's 13 input/output (I/O) task pairs enable a single process to wait for both external equipment messages (using the input task) and internal IPC messages (using the output task) at the same time.

The output task pends on an IPC mailbox 247, waiting for an interprocess communication message 249. The message header contains interprocess routing information. The message body contains those processing parameters necessary to achieve the desired outcome. The output task 243 does not send commands to the subsystem interface directly; the protocol driver 245 handles all direct communications with the specific subsystem.

The input task 241 pends on the subsystem interface through the protocol driver 245. The input task 241 is responsible for handling asynchronous messages as well as requested status. Depending on the circumstances, the input task 241 may act on the message received or it may communicate the message received to the output task 243 through a message queue or semaphore.

The subsystem protocol driver 245 is responsible for direct communications with the specific subsystem.

Subsystem-specific idiosyncracies, such as protocol and handshaking requirements, are managed by the protocol driver 245. All subsystem drivers for the same process have the same application interface (API) to the controlling task-pair. The API is broken into four categories: initialization, write (control or data output from the controller 13 to the subsystem), read (status or data specifically requested by the controller 13 from the subsystem), and asynchronous input (status or data sent by the subsystem to the controller 13 based on a subsystem event, not by request). As new subsystems become available only the driver needs to be written, not the entire interface. For example, the lighting process can support a variety of subsystems (Lite Touch, Vantage, Lutron Orion, Lutron Homeworks, X-10, etc., as depicted in FIG. 5), without modification to the input or output tasks 241, 243, even though the interface protocols are completely different. The desired protocol driver 245 is linked to the process task-pair at compile-time.

(2) Subsystem Gateways:

Some controller 13 interfaces use standard protocols to combine multiple equipment types within a single subsystem. Consumer Electronics Bus (CEBus), Echelon and X-10 are open residential standards which can include a variety of subsystem types (lighting, environmental, security, to name a few), as well as providing user interface capabilities through keypads, touchpanels or remote controls. AMX and Crestron use a proprietary bus and protocol for internal communications, but have published external interface protocols for serial communications. These types of interfaces are implemented as gateway processes within the controller 13 software.

Subsystem gateway processes are depicted in FIG. 7 and are implemented in a similar manner to other subsystem processes, with input and output tasks 351, 353. Each are communicatively coupled to an IPC mailbox 355. The output task 353 "consumes" IPC commands, and the input task 351 "produces" IPC status data. There is no need for a separate protocol driver since the external protocol is specific to the gateway. The main purpose of a gateway is so that multiple internal processes can share the same external hardware interface. A gateway multiplexes and interleaves messages onto the interface, and demultiplexes messages from the interface, routing them to the appropriate processes. Gateways provide protocol translation for the controller 13; IPC protocol is translated to the external protocol; and external protocol is translated to IPC format.

The gateway translation allows multiple external standards to be used at the same installation. For example, CEBus light switches, Echelon thermostats, an X-10 gate controller, and AMX touchpanels and television managers can coexist within the same residence. More importantly, they are all interoperable. A single AMX touchpanel button, "Good Morning", can turn on the gradually fade the CEBus lights up to 68%, adjust the Echelon thermostat and turn on the TV to the morning news, all with a single push.

Since all external messages are converted to the IPC format, any and all gateway devices may interact with one another. The interoperability assignment is accomplished using IHML scripts, further discussed below.

(3) External Interface Gateways:

External Interface Gateways are handled differently from subsystem processes and subsystem gateways, in part due to the nature of the protocols involved. FIG. 8 provides a diagram view of external interface gateway 361. The external interface gateway 361 provides remote access to the controller 13 through industry standard, commercially used protocols. There are two distinct uses for the External interface gateway 361: (1) device/subsystem control, and (2) on-line support.

Device/subsystem control mechanisms allow the homeowner to remotely control the home and determine status from his/her car phone or office PC. On-line support provides access to the Shell process and to configuration and database files, allowing an installer remote access to cost-effectively perform on-line system maintenance, diagnostics and configuration.

The external interface gateway 361 process enables on-line external access via telephone (using touchtone input and voice feedback), modem (for dial-in access), serial (for direct connection), and Local Area Network (for in-house or dial-in access from a network PC). The architecture of the external interface gateway 361 consists of task-pair processes for the external interface process 363, serial interface process 365, modem interface process 367, and ethernet interface process 369. The serial and ethernet processes 365, 369, communicate only through the external interface process 365. The modem process 367 can receive IPC messages from any process since a single phone-line, connected through a high speed modem is used to support voice, DTMF and data transfers as well as on-line access to the Shell process. As each data packet is received by the controller 13, the external interface process 363 directs it to the appropriate location. In the case of IPC messages, the external interface process appends the IPC message header to the beginning of each message, with the appropriate routing information. Data is stored directly to disk by the external interface process 363, in the appropriate file. As is shown, the external interface process 363 is coupled to an IPC mailbox 373 which passes IPC messages 375.

Data files 371 and messages are transferred over each interface using a full TCP/IP stack. These protocols provide the most widely used industry-standard means of communication. The external interface gateways 361 do not translate IPC messages into subsystem-specific protocols as is done in the subsystem gateways; the IPC messages are embedded within a TCP/IP packet. This gives the external system direct access to interprocess communications, giving it the same power as a user interface connected directly to the controller 13.

The TCP/IP protocols were selected to enable configuration and control via local area network (LAN), but the concept has since expanded to include Internet access. Connection to the Internet provides the homeowner unlimited access to the outside world. The installers and service providers have password-protected access within the home, possibly providing graphical user interface (GUI) applications on a World Wide Web (WWW) server. GUI applications may be developed for control, configuration, diagnostics, data collection and analysis.

4. The Meta Language

The present invention utilizes a unique programming language: the InteliHome Meta Language (IHML). IHML is designed to provide control of an event intensive system; in this case, the day to day actions in a home or building. While IHML may be used to define the traditional home automation problems (e.g. setting the heater to economy mode when the security system is armed 'away"), IHML goes beyond this task. As will be seen below, its generic action/reaction nature may also be (and is routinely) used to define the interaction of user interfaces with unrelated target systems.

IHML's implementation is a compromise between the efficiency of a compiled language and the simplicity of an interpreted one. IHML is "compiled" into a set of pseudo-assembly instructions (p-code) which are then interpreted by a distinctly different set of software. This allows for the implementation of a simplistic and efficient interpreter (hereafter referred to as the executor), while lessening the requirements of the compiler.

Every home is different. Applicant has discovered that two homes with exactly the same lighting, heat/ventilation/air conditioning (HVAC), and security systems are still two different homes. How does a software provider economically deliver of services to these homes while still providing the primary intention of home automation—customization for the home owner's life style?

Assuming the subsystems (i.e. lighting, HVAC, etc.) are implemented correctly, the solution is relatively simple. Provide a scripting language that is easy to implement and can tie together the outputs and inputs of the subsystems with each other. The implementation of this solution becomes more involved when user interfaces (e.g. keypads, touch panels) are considered to be a subsystem. IHML along with the software architecture of the present invention makes this assumption and provides a solution.

A brief history of the precursors to IHML will be helpful to put the concept in context. One of the inventors made a request of the software development group to press a single button and cause multiple actions to occur. This is nothing new in the world of software or home automation, but a chain reaction of events was put into place. The idea of a "macro" language was formed; a language read from a file at run-time would be interpreted to cause actions to be taken within the home system.

This "macro" language took many forms over the next several years, eventually evolving into a scripting language that generated outputs (only) to the system when executed. As complexity grew, "macro" soon gained the capability to pause or wait for a specified length of time without causing time delays in other subsystems.

A second scripting language eventually formed known as AXTP. AXTP was designed to be able to interpret presses and screen jumps on complex user interfaces such as touch panels and cause commands to be sent to the other subsystems in the house. A secondary and more difficult task also handled by AXTP was to interpret events within the subsystems of the home and cause effects on the touch panel reflecting those events. It was soon discovered that simple keypads and previously considered "complex" home automation scenarios were simple problems compared with the complexities of multi-paged touch panels; all such complexities were easily solved by AXTP.

Eventually, simplicity, efficiency (memory usage), and expandability became the topics of concern instead of capability. From this sprang IHML. IHML does not represent any capabilities not theoretically possible from a combination of Macro and AXTP; however, IHML provides the benefits of both Macro and AXTP in a single solution. Equivalent AXTP and Macro code have been shown to be reduced by a 10:1 to 20:1 memory usage ratio when compared with IHML. Speed has not been tested but is assumed by engineers to be similar or better. Simplicity cannot be tested, but based on IHML's similarity to traditional languages (C, BASIC, etc.) compared with AXTP's exotic syntax, IHML is considered a major step forward.

IHML is heavily dependent on other concepts supported by the InteliHome Controller (IHC) design. Concepts such as interprocess communication (IPC), ASCII based message formats, "notify list" asynchronous events, and generic subsystem communication are critical to the basis of the IHML concept.

IHML makes the assumption that actions/causes within the home are represented in the form of ASCII messages that may be requested to be forwarded to the IHML processor responsible for the IHML script in question. It also assumes that responses/effects can be made by the same mechanism. Once these two assumptions are fulfilled, the problem becomes a familiar one; an artificial intelligence expert system or a rules engine. IHML is basically a traditional rules engine. If one compares IHML and the overall structure of the InteliHome Controller architecture to the popular expert systems of the 70's and early 80's (See Charniak, E. and McDermott, D. "Abduction, Uncertainty and Expert Systems" in Introduction to Artificial Intelligence, pp. 453–484, Addison-Wesley, 1986), it will become apparent that the overall structure of the IHC system is a expert system.

As is shown in FIG. 9, a prior art expert rule system includes a rule engine 401, which communicates through communication link 403 to a knowledge base 405 which preferably includes a codification of expert knowledge in a particular area. Knowledge base 405 provides through communication link 407 an output which is fed back into the rule engine 401.

The IHML script provides the rules and outputs to the knowledge database; the subsystems of the present invention respond to the outputs to cause new inputs to the rules engine. The major difference between the present invention and the traditional AI expert system is, that with the present invention, the process is the desired effect; with an expert system the final result is the desired outcome.

FIG. 10 is a pictorial representation of the "rule base" nature of the present invention. As is shown, the IHML language defines a rule set 411 which controls the building automation subsystems 413. In turn, building automation subsystems 413 control the equipment 415 which is under control of the building automation system. Commands and status information (either or both) are communicated through communication path 417 as an input to the rule set 411. In accordance with the present invention, the content of the rule set 411 will change dynamically as operating states, status information, and commands are passed back from the building automation subsystems 413. As can be seen, the operation of the building automation system of the present invention causes dynamic changes to the rule engine defined by the IHML rule sets 411.

IHML is based very loosely on the AWK (the correct Unix nomenclature is "awk") script language. An input string is parsed via a regular expression scanner. Upon a match, an action resembling a C or BASIC command set is executed. IHML's resemblance with awk ends here. Awk is a file processing system. Awk reads and processes lines from a text file until it encounters the end-of-file, then the script is halted. Its only output is text to generate a new file. IHML processes IPC messages generating new messages to be forwarded to other tasks. Since the IHC is continually running, an IHML script will simply wait for more input until it is halted by a system shutdown or new events are received.

FIG. 11 is a pictorial representation of the dynamic nature of the automation system of the present invention. As is shown, an incoming event 421 is provided to one or more event matching software modules 423. The occurrence of a matched event 425 results in some type of action, such as action/response 427. In particular cases, the action/response 427 may constitute an interprocess control command. Alternatively, the action/response 427 may constitute status information or operating system data. An outgoing command 429 is then provided. The outgoing command 429 is treated as an incoming event for one or more other processes. As can be seen in the view of FIG. 11, the automation system of the present invention provides an automation system which responds to automation system "events." Those events may constitute commands or status data regarding any particular end device in the building automation system or any particular subsystem in the building automation system. The event may include the operating states and/or conditions of particular software modules within the building automation system. The architecture of the present invention provides a true peer-to-peer automation system.

The IHML language consists of a static list of rules mapping inputs (system events) to outputs (system commands) that remain in effect during the entire execution time along with a secondary list that may change during execution. These lists of rules are traditionally referred to as states due to the finite automata nature of the secondary state methodology.

Primary State (Global):

The primary rule state is known as the global state. This state is automatically started upon the initialization of the IHML script. The rules held within this state are in effect the entire time the IHML script is running. This state is all that is needed for simple control and is typically what one would find in a traditional rules engine used for artificial intelligence or home automation. There are problems where a fixed set of rules may not be sufficient; in these cases, the concept of a modifiable secondary state allows for finer control.

Secondary States:

The secondary state behaves exactly as the global state. The difference is a secondary state may be replaced by another state within the script during runtime as needed. IHML automatically uses "state 1" on startup as the secondary state. The goto keyword will replace the secondary set of rules by the set defined by the state number corresponding to the argument of the goto command. This feature allows a script to be tailored to handle events differently based on the current situation in the system. For example, a home owner may want the HVAC system to behave differently during a party or while guests are visiting. As shown in FIG. 12, common rules for the home operation may be placed in the global state while rules controlling the HVAC system could be placed in three secondary states ("normal", "guests", "party") with tailoring done for each case.

FIG. 12 graphically depicts the relationship between a "global state" 431, and a plurality of secondary states 433, 435, 437. Each secondary state relates to a different operating condition. Each secondary state includes a set of executable instructions which map "system events" (as shown and described in connection with FIG. 11) to outgoing commands. The states depicted in FIG. 12 relate to the HVAC system and provide one set of rules in secondary state 433 which govern the normal operation of the HVAC system, an alternative set of rules for secondary state 435 which govern the operation of HVAC system when guests are present, and yet another set of rules defined by secondary state 437 which govern the operation of the HVAC system when a party is ongoing.

Another common case is the control of a multi-screen touch panel. Pressing button #1 on one screen may have a completely different meaning from button #1 on a second screen. In this case, creating a secondary state for each screen allows the user to tailor the rules for each screen without worrying about overlapping of button id's.

When the secondary state is changed with the goto keyword, two things happen. First, the current secondary state is closed. This causes a close event to be sent to the state and any rules triggered will be executed. Secondly, the new state is opened and a open event is sent to it to allow for any needed initialization.

During startup of an IHML script the global state and state 1 also receive the open event. Notice that the open statements in the global state will never be executed again since the global state is not affected by the goto command; however, state 1 may be open and closed many times during the execution of the script. Due to this, startup initialization should only be done in the global state, not in state 1. On shutdown of a script caused by the exit keyword, the global state and current secondary state will both receive the close event.

FIG. 90 is a flowchart representation of the change in operating states in accordance with the present invention. The process commences at block 1057, and continues at software block 1059, wherein the system monitors for start up. Once start up occurs, in accordance with block 1061, the system accesses the system initialization files. Next, in accordance with block 1063, the processes associated with initialization are created in accordance with the initialization files to set the system to a "global" state. Next, in accordance with block 1065, the secondary states are set to be equal to the global state. In other words, the capacity for "secondary" states is provided, but there are no active instructions for any particular secondary state until activated at a later time. Then, in accordance with block 1067, the system monitors for requested changes to the secondary state. This corresponds to the "goto" command. In accordance with block 1069, the system monitors for a requested change to a particular secondary state. Once that occurs, in accordance with block 1071, the system sends a "close" command to a target process. Next, in accordance with block 1073, the system executes all commands required to affect a "closing" of a the target process. Then, in accordance with block 1075, the system executes a "open" command to open a new state which corresponds to the particular secondary state for which a "goto" command has been received.

Next, in accordance with block 1077, the system monitors for an exit command. The exit command is utilized in the present invention to close activity for all processes. Once an exit command is received control passes to software block 1079, wherein the system sends close commands to all states. All operations necessary to affect a closure of the active states are performed, and the process terminates at block 1081.

FIG. 91 is a pictorial representation of the relationship between global and secondary states. As is shown, a global state 1091 exists which is defined by a plurality of rules, including rules 1093, 1095, and 1097. Each rule maps a particular system event 1111, 1115, 1117, to particular commands 1113, 1115, 1119. During normal operations, the text parsing program parses the message traffic in the automation system in order to attempt to match message traffic with particular ones of the system events 1111, 1115, 1117. Once an event is matched, the corresponding particular command 1113, 1115, 1119 are communicated for execution.

Each particular global state may have corresponding secondary states which define particular types of operation. In the view of FIG. 91, secondary states 1121, 1135 are pictorially represented. Secondary state 1121 includes rules 1123, 1125 which map particular system events 1127, 1131 to particular system commands 1129, 1133. In accordance with the present invention, when the system is in one secondary state and receives a command to "goto" another particular secondary state, the first secondary state is closed, and the subsequent secondary state is opened. This affects a substitution of one set of rules for a preexisting set of rules. Continuing with the example, secondary state 1121 may be closed in favor of any other particular secondary state, such as secondary state 1135. As is shown, secondary state 1135 includes a number of rules 1137, 1139 which map particular system events 1141, 1145 to particular system commands 1143, 1147. When the automation system receives a command of "goto" to secondary state 1135, the process associated with secondary state 1121 are closed, and the rule set of secondary state 1135 serves as a substitute secondary state 1121.

A typical IHML statement consists of two parts: a input event and a output result. The input event is typically an ASCII string matching (via regular expression techniques) an incoming IPC message. Other events such as "OPEN" and "CLOSE" are induced upon a state change. The output result is a more complex expression resembling C or BASIC statements resulting in either an outgoing IPC message or a state change. In its simplest form an IHML statement is just two strings, the implies ("→") operator is optional:

"Hello"→"World"

This command would respond with the command "World" when it receives the event "Hello".

A more interesting rule might be:

```
"Hello" -> {
send "World"
helloCnt = helloCnt + 1
if (helloCnt > 5)
{
    send "I"m tired of playing this game"
}
}
```

These examples won"t do anything useful in the building automation environment. The strings "World" and "I"m tired. . . " don"t contain IPC routing information required by the IHC software; however, they are perfectly legal in IHML and would be executed without error in the IHML executor. IHML has no understanding of the overall structure of the system. It is only concerned with solving its portion of the problem. The messages would eventually be discarded by the IPC routing algorithms.

Variables:

IHML supports an unlimited number of variables. IHML has no syntax for declaring a variable, instead variables are declared automatically when used. Also, all variables in IHML are global to all states; however, variables between different scripts, even different occurrences of the same script, are unique. Variables are guaranteed to be initialized to the NULL string or zero depending on how the variable is accessed. IHML maintains all variables as string type. Conversion to and from numeric format is performed automatically by the IHML executor. There are two classes of "magic" variables in the IHML language: I/O variables and constant variables. I/O I/O Variables:

I/O variables are a set of 10 variables which my be referenced as $[0-9] or #[0-9]. When referenced with the "$" prefix, the variable is assumed to be a read/write variable; if referenced with the "#" prefix, the variable is assumed to be read only. For example:

$1=#5 //is perfectly legal, while

1=#5 //is absurd.

It is important to note that even though $1 is read/write and #1 is read-only, they both refer to the same variable. So that:

$2=#1

$3=#2 is the same as:

$3=#1

These examples are trivial examples. The true power of this set of variables is their use in parsing an input event or creating an outgoing response, as will be seen below.

Constant Variables:

The second class of "magic" variables is the predefined constant variable. As of this writing, only the #D variable exists. This value is set at run time. It is typically used for IHML scripts which control a user interface and represents the device id of that user interface device. This allows a single set of source code to be executed multiple times (each with a different #D value) to handle multiple identical devices in the home. The expression $D is invalid.

Event Detection:

As shown above, an event is just an ASCII text string passed into the IHML executor. Even the special cases of open and close events are implemented in this way. The event is matched to another string which is held in the event position of a rule, hereafter referred to as the pattern. Upon successful match the rule is executed. It should be noted that matching only has to be successful the end of a pattern string. If the actual incoming event contains more information, it is discarded and the rule is still triggered. The rule below will be triggered by any of the following incoming events: "Hello", "Hello!!!", and "Hello,World".

"Hello"→send "Hello"

Also notice that null string used as a pattern will match any incoming event, including the open and close events.

Event Matching with Magic Variables:

Two extensions to this pattern matching give IHML much of its power: read-only and read/write Magic Variables.

The Magic Variables discussed above may be embedded in the event string of the rule. When the executor is searching for rules to invoke it will recognize the imbedded variables and perform special operations. In the case of the read-only variable ("#" prefix), the value of the variable will be expanded into the pattern string prior to pattern matching. If the variable is read/write ("$" prefix), any substring will match and the variable will be assigned the value of the substring.

open→$1="Hello"

open→$2="World"

"#1,#2"→send "Hello"

"#1,$2"→send "Hello"

In the above example the rule "#1,#2" will only match the event "Hello,World". The read-only variables 1 and 2 are expanded to create this literal string. The second rule, "#1,$2", will be expanded to "Hello,$2". This rule will match "Hello,World", "Hello,InteliHome", or "Hello,Mark". The variable $2 will be assigned the value "World", "InteliHome", or "Mark" appropriately.

The question arises: When should a read/write variable's pattern matching stop? Three characters will stop matching: NULL string terminator, colon (magic character in IHC messages) and the first character following the variable in the rule's event string. This implies that the event "$1,$2" will discontinue matching $1 until it encounters the end of string (EOS), a colon, or a comma. The comma is the first character following the $1 variable in the string. This allows an incoming event such as: "Hello,World" to be matched as you would expect, $1="Hello" and $2="World".

FIG. 92 is a flowchart representation of the basic operations performed during text parsing in accordance with the present invention. The process commences at block 1151, and continues at block 1153, wherein the text parsing program receives ASCII text strings. Then in accordance with block 1155, the text parsing program parses the ASCII text string. In accordance with block 1157, if a variable is detected in the text string, control passes to blocks 1159, 1161, wherein it is determined whether the variable is a read-only or a read/write variable. If the variable is a read-only variable, control passes to block 1163, wherein the variable is expanded. If the variable is a read/write variable, control passes to block 1165, wherein the read/write operations are performed. Control then returns to block 1167, wherein the ASCII string is compared to the events associated with a particular state of the automation system. In accordance with block 1169, the text string is compared to the events associated with the process in order to determine if a match occurs. If a match occurs, control passes to block 1171, wherein a particular command corresponding to the system event is "triggered." In other words, the particular command associated with the particular event is passed for processing. In accordance with block 1173, the system monitors for null characters, end of string markers, or colons. If none of these are detected, control returns to block 1169; however, if these characters are detected, the matching ends in accordance with block 1175, and the process ends at block 1177.

This gives the user two powerful capabilities: 1) to create custom events based on variable values set previously in the engine and 2) to pattern match a family of messages and extract the details. For example, the format of a HVAC temperature update is:

H:U:<zone#>:T:<temperature in degrees Fahrenheit>

If the user is interested in the temperature of zone 3 of a HVAC system the event may be written as such: "H:U:#1:T:$2" →. . .

For this example we assume that #1 contains the zone number. If #1 contains "3" and an update is received for zone 3 the rule will be triggered. Any other temperature updates for other zones will be ignored. The temperature is read into $2 when the rule is triggered. This allows the action portion of the rule to use this information. For example, to display the temperature for zone 3 on a keypad LCD display:

"H:U:#1:T:$2"→"X:R:S:#D:Temp=#2"

With this rule, an update to zone 3 (or whatever value #1 holds) with a value of 72 degrees will cause a request to be sent to a LCD display with device id of #D to display the string "Temp=72". Notice that we have assumed that this script is dedicated to controlling a single keypad device and that the id of the keypad was loaded at runtime into the #D variable. This allows identical scripts to control devices whose only difference is the id of the device. With the addition of other rules to control the value of #1 we may use this single rule to display the temperature for any selected zone.

Kleene Algebra:

To increase the power of the pattern matching technique, Kleene algebra regular expression parsing is also supported (see Lewis, H. R. and Papadimitriou, C. H. "Finite Automata" in *Elements of the Theory of Computation* (pp. 49–94), Prentice-Hall, 1981). Kleene algebra is similar to but slightly different from the wildcard concept used in many computers command line interfaces (e.g. DEL *.*) Kleene algebra is more complex and powerful than simple wildcard matching. The concepts of character sets and the Kleene star are supported. With these concepts, patterns such as "temperature, humidity, or setpoint" update, or "any HVAC update that isn't a temperature update" may be created to trigger on incoming rules.

Character Sets:

A character set is simply a description of what the legal values of the next character should be. In the above examples, the comma represents the simplest form of a character set. The pattern matching engine sees a comma as the next character in the pattern and determines that character set contains a single character—the comma. The next character in the incoming event must match one of the characters in the character set and in this case only one choice is possible. The next simplest form of a character set is represented by the question mark ("?"). When this symbol is encountered a character set of all printable characters is created, thus any character in the incoming event will match. The third and most powerful character set description is described by listing possible choices within square brackets ("[ ]"). Within the brackets, only the ^ and—have special meaning. Both may be overridden by the back slash. Some examples are:

? Match any character

[A–Z] Match any upper case letter

[ABC] Match the letters A, B, or C

[A-Za-z] Match any upper or lower case letter

[^0–9] Match any character that is NOT a digit

Keep in mind that a character set matches only one character not a list. The "?" expression is not the same as a wildcard "*" that one may be used to. To match multiple characters we need the Kleene star.

Kleene Star:

The Kleene star is represented by the "*" character. This still isn't the same as a wildcard "*" it is a bit closer in concept. The star requires a character set as an argument. This argument is the character set prior to the star in the pattern string. When a character set is followed by a star the character set is not executed, instead, the combined expression will match zero or more occurrences of the character set. Examples:

5* Match zero or more occurrences of the number 5

?* Match zero or more occurrences of any character

[A-Za-z]* Match zero or more occurrences of any letter

Combining Magic Variables with Kleene Algebra:

We now have very powerful techniques for extracting information with magic variables and pattern matching with Kleene algebra. We need a way to combine them. This method is easily described by an example:

"$/[A-Za-z]*/1"Match zero or more letters and assign to $1

The algebra expression is placed within the variables name, delimited with forward slashes at both ends. One should understand that the normal rules of when a magic variable should stop extracting data are bypassed when this method is used (the EOS rule is still in effect). It should now seem obvious, based on the rules for simple magic variable extraction, that: "$1,$2" and "$/[^:,]*/1,$/[^:]*/2" are equivalent. Yes and no. These do perform the same outcome, but, one is much more understandable and CPU efficient. The simple form of variable extraction is implemented separately from the regular expression form. The moral: character sets and Kleene stars take CPU to execute and should only be used when needed.

Response Generation:

Once an incoming event has matched the event pattern of a rule, the rule is executed. The rule response is defined by one or more statements resembling traditional languages such as C or BASIC. If more than one statement is to be executed, the statements must be enclosed in curly braces ("{ }").

Logic testing may be performed for conditional responses. An "IF" statement is available along with several comparator and logical operators. Nesting of "IF" statements is supported. The operators include: logical and, or, not; arithmetic equal, not equal, less than, greater than, less than or equal, greater than or equal; string equal.

Numeric and string manipulation operators are also available: arithmetic add, subtract, multiply, divide, and negate (performed in 32 bit signed integer format) string concatenation. Actions may include:

goto Begin using a new secondary state send Send the message/command to the controller assign Assign a variable to another variable or expression sleep Pause execution for a specified number of seconds exit Halt execution of the IHML script.

A complete listing of keywords and operators is provided below.

IHML Compiler (IHMLC):

IHMLC is a command line compiler which transforms IHML source code into IHML executable. An IHML executable is not true hardware dependent assembler language, but rather, a pseudo-assembler which requires the IHML executor to act as a virtual machine to execute it. This pseudo executable code is referred to as p-code.

The source must reside in a single file. This file typically will have the extension .ihm but this is not required. The executable will be created in a second file with the same base name as the source with the extension .ihx, unless overridden by command line options. A second command line option allows for dumping human readable information about the compile into a file named ihml.out. This information includes symbol tables, memory usage, and human readable p-code. The compiler is designed along the lines of a traditional compiler with the exception that the preprocessor is built into the lexical analyzer as shown in FIG. 13.

Preprocessor:

While reading the *Event Detection* paragraph, the reader may have assumed that the requirement for ease of use had been abandoned. The IHMLC preprocessor comes to our rescue. Raw strings are not typically entered into the IHML source code. Instead, simpler commands are entered by the user which resemble macros in the C language. These macro definitions are not formally part of the IHML language but will be a standard addition to the compiler. The format of a macro, however, is part of the language. A macro must begin with a letter followed by any number of letters, numbers, or the symbols "_" and "?"; then followed by an open parenthesis, any number of characters and a close parenthesis. To practice our Kleene algebra, we would describe it as: [A-Za-z][A-Za-z_?]*([^)]*)

The preprocessor is actually built into the lexical analyzer of the compiler. As the lexical analyzer deciphers tokens for the parser it will recognize a string of characters to be a macro. It will then call the preprocessor to translate the macro to a string suitable for the IHMLC.

The preprocessor does a lookup of the macro in a table and transforms it into its predefined string. The string is then returned to the lexical analyzer for normal compilation. A typical table entry might look like:

"LightOn($ 1,$2)", "L:L:0:#1:#2:100",

Ignore the syntax of the second string, it is the message format to turn on a light in the IHC IPC language. As can be seen by the example, the preprocessor cheats and uses some of the code in executor's event pattern matching routines to do its work. There's no magic about this; it's just a good re-use of the code.

So now the user may use the syntax: LightOn(4,3) instead of actually writing "L:L:0:4:3:100".

Lexical Analyzer and Parser:

The lexical analyzer was built using the lex language (see Levine, J. R. et al. lex & yacc, O'Reilly & Associates, Inc. 1992). The actual lex processor used was the Flex Processor by GNU. Use of flex reduced the effort to a minimum.

The parser was generated by Berkeley YACC (byacc). YACC (Yet Another Compiler) is designed to work with Lex as a pair. Again, using YACC allowed for fast development with minimal effort.

P-Code Generation:

P-Code is compiled in a Reverse Polish Notation (RPN) format (see Gries, D. "Polish Notation" in *Compiler Construction for Digital Computers,* pp. 246–253, John Wiley & Sons, 1971). This style, also know as prefix notation, orders the arguments of an operator prior to the operator (i.e. a+b becomes a b+). The most common examples of RPN are the Hewlett Packard calculators of the 1980's and the printing language known as Postscript®. YACC makes it very easy to reorder the code into this format at compile time. As the YACC parser is scanning the source file, a virtual tree is formed by the compiler. Once the tree representation of the source is created, a pre-fix ordered transversal of the tree is performed and the nodes of the tree are added to the p-code heap in order. To visualize the formation of a tree, refer to the representation of X=3+4 in FIG. 14.

The rules for traversing a tree in prefix order can be described with reference to FIG. 14 and are: 1) traverse the left branch of the tree, 2) traverse the right branch, and 3) traverse the parent node. If starting at node "=", we would first traverse the left branch, find no left or right sub-branches and find X as the parent node. Secondly we would traverse the right branch and find a left branch 3 then a right branch 4 and a parent node +. Finally examining the original parent node =. This procedure provides the RPN expression X 3 4 + =. The importance of RPN and how it is used is discussed below.

Constant Symbol Table:

All constants in IHML are stored as character strings. The constant table is a flat character array, the heap. Constant strings are laid back to back with each other in the heap, separated by a NULL character. A table is created to map the growing list of constants to their respective locations within the heap as well as the position for the next free space within the heap. This table is discarded after the compile is completed and is not included in the .ihx file.

Prior to the addition of a new constant, a search is performed of the existing constants; if a duplicate constant is found a reference to the existing constant is returned to the compiler and the new constant is discarded. If no match is found, the constant is added to the heap, the index table is updated, and a reference to the new constant is returned. Constants are referenced by their offset into the heap.

Variable Symbol Table:

The variable symbol table is created in a similar manner as the constant symbol table. The strings held within the heap are variable names, however, instead of constant values. The reference returned to the compiler is the index of variable. The heap of variable names may be deleted after compilation. The IHML compiler chooses to include it in the executable as debugging information. At this time, this feature is not used.

FIG. 93 is a flowchart representation of other particular aspects of the compiling process. The process commences at block 1181, and continues at block 1183, wherein the system receives IHML source code at the IHML compiler. Then, in accordance with block 1185, the system utilizes a preprocessor to look up the "macros" contained in the source code in a macro table. Next, in accordance with block 1187, the system utilizes the preprocessor to transform all macros into corresponding predefined strings as set forth in the macro table. Then, in accordance with block 1189, the system parses the ASCII string with a parsing program. As part of the parsing operation, the system develops a constant symbol heap in accordance with block 1191. The system will also develop a table to map the constants to locations and the constants symbol heap in accordance with block 1193. Also, in accordance with block 1195, the system develops a variable symbol heap, and in accordance with block 1197 develops a table to map the variables to locations in the variable symbol heap. Finally, the system generates an "IHML" executable in accordance with block 1199 which is passed for execution, and the process ends at software block 1201.

IHML Executable Structures:

The IHML executable contains five (5) major sections, as shown in FIG. 18:

1. Header
2. State Table
3. Variable Table
4. Constant Table
5. P-Code Table

Header:

The header is a structure of basic information about the script. Information includes: version number of compiler, date compiled, location and sizes of the separate tables within the executable file. The header format is shown in the table of FIG. 15.

State Table Format:

The state table is a simple, two entry, table relating the state id number with a p-code address within the p-code table as shown in the table of FIG. 16.

Variable Table Format:

The variable table stored within the executable file is not used by the executor. The only information needed is the number of variables existing. This information is available in the header. The variable table is include for future uses such as symbolic debuggers.

Constant Table Format:

The constant table is simply an array of characters. Strings laid back to back, separated by the NULL character, represent each constant. The indices to each constant were placed into the p-code table during the compiling process. Position and length of the table are contained in the file header.

P-Code Table Format:

P-Code is the executable portion of the IHML. It is a linear array of p-code instructions called tokens. The set of tokens for each state are laid back to back with each other. The state table provides the entry point for each state. Each state's code set is delimited by an END token to prevent overrun into the next state.

Token Format:

The basic building block of P-Code is the token. Each token my represent one of four entities.

An executable instruction

An index into the variable table

An index into the constant table

An index into the P-Code table

The token is physically a sixteen (16) bit structure with two fields. A two bit type field specifies which of the for types this token represents. The data field, using the remaining 14 bits, is either the opcode of an instruction of an index into one of the tables as shown in FIG. 17.

Physical File Format:

The IHML executable file is laid out in five sections as shown in FIG. 18. The first section is the header. The remaining sections typically follow in the shown order, but this is not necessary, due to the information contained in the header.

IHML Executor:

The IHML executor is responsible for interpreting the IHML script(s) at run time. The IHML subsystem consists of a parent process, called the daemon; which creates child processes for each script interpreted. The child processes created by the daemon each contain a copy of the IHML interpreter. As discussed briefly above, the IHML executable is a compromise between a hardware executable and a purely interpreted script. In a traditional interpreter, the human readable script would be read and each line parsed as it is executed. This is a very expensive process in both time and memory usage. The compiling of an IHML script into a IHML executable allows for a very simple (and fast) yet powerful interpreter to be built. It also requires the text script to be parsed only once, and that one time is off-line during system installation. The interpreter is referred to as the IHML executor to distinguish it from a traditional interpreted language.

IHML Daemon:

The IHML daemon is an independent task whose job is to start and stop IHML executors based on requests from other IHC software. The daemon waits on a IPC queue for a request message. It then spawns an IHML executor task for that request passing the IHML file name along as an argument used to set the #D variable. Upon shutdown of the system, the IHML daemon will insure shutdown of all children prior to it's own termination.

State Management:

After the IHML executable file has been loaded into memory, the executor searches the state table for the global state. If found, its entry point is noted and a open event is generated and sent to the entry point. Secondly, state 1's entry point is searched for and executed in a like manner. If neither entry point is found the executor terminates.

The executor keeps track of two entry points at all time, one for the global state and one for some secondary state. Each time an event is received the global entry point is executed and then the secondary entry point. Whenever a goto command is executed the secondary entry point is given a close event to process. The executor finds a new entry point from the state table based on goto's argument and sends an open event to the new entry point. The global entry point is never affected by a goto statement.

Upon executing the exit command, both the global and current secondary entry point are sent a close event before the executor terminates.

RPN Design:

P-Code is compiled in a Reverse Polish Notation (RPN) format. In this style, the argument(s) of a command precede the command. For example the code segment for x=5 * (3+4) would be compiled as x5 3 4 + * =. As the executor interprets the code it pushes data tokens (variable, constant and P-Code addresses) onto a stack. Once an opcode is found in the command stream, the appropriate number of arguments are popped from the stack, computed using the opcode, and the result (if any) pushed back onto the stack. An Example:

| Code Stream | Stack Action | |
|---|---|---|
| x 5 3 4 + * = | <empty> | push data token x onto stack |
| 5 3 4 + * = | x | push data token 5 onto stack |
| 3 4 + * = | 5 x | push data token 3 onto stack |
| 4 + * = | 3 5 x | push data token 4 onto stack |
| + * = | 4 3 5 x | pop 2 args; add; push result |
| * = | 7 5 x | pop 2 args; mult; push result |
| = | 35 x | pop 2 args; assign; no push |
| | finished. | |

The executor knows how many arguments to pop, what their order is, and whether a result should be pushed based on the opcode that is being processed.

The above example raises an issue. x, 3, 4 and 5 are assumed to have been in the original source code and therefore have been compiled into the variable and constant tables. What about 7 or 35? An easy solution would be to use the 14 bit field of a token to hold the value. This will not work for signed integers and strings that are concatenated together. Consider the expression: X="A" ++"B" ++"C". This expression will cause temporary strings of "BC" and "ABC" to be stored onto the stack. The executor uses an expanded notion of the token for its stack design.

Using the RPN style for the p-code has several advantage over the normal postfix notation of modern computer assembly languages. Parenthetical ordering of operations is inherent in the notation. In the above example, x=5 * (3+4), parenthesis are not necessary when expressed as x5 3 4 +* =. This allows not only algebraic equations to be handled easily but also nested if statements as well.

The executor never has to look past the current position in the executable to perform its work. This allows for an extremely efficient inner loop.

Normal postfix computers use registers to hold intermediate steps in an operation. This puts a burden on the compiler to make the most efficient use of registers as well as requiring extra code and execution time to move data between the register variables and an accumulation register. In a RPN design the accumulation register is assumed to be the top of the stack which is updated naturally without additional instructions.

Due to the strict separation of data (stack) and opcodes, the prefix notation offers easier runtime error checking than postfix.

Extended Token Stack:

The executor expands tokens as they are read from the code table and placed onto the stack. This expanded token is 5 bytes in size rather than 2 bytes for a normal token. The expanded token still only contains two fields; however, the type field is expanded to 8 bits and the data field to 32 bits. Two new types are added to the original four: long integer and character pointer. The 7 in the above example, was handled as an extended token of type long integer and the value of seven was simply placed in the data field. If string concatenation were being performed, memory for the new string would be allocated from the executors heap and its pointer placed into the data field. The allocated memory will be freed as soon as the extended token is popped from the stack.

It is intentional that two different types of tokens are maintained. Redefining the standard token to be 5 bytes would have eliminated some code, but would have increased the token size by 250%. The p-code portion a typical IHML executable is about 50% of the total. So increasing the size of the token would have increased the executable size by about 175% or almost double.

System Support:

Processes such as sending and receiving events (messages) are carried out by IHC utilities. IHML design is not affected by these subsystems.

Conclusion:

IHML is a fourth generation language for the purpose of defining responses to events created within a system. IHML is built on an assortment of unrelated concepts in computer science from text processing to artificial intelligence. It is tailored for the purpose of home automation and control, specifically, the IHC architecture. Both power and simplicity are combined into a text based language which may be easily extended with a "visual" programming tool for even more user friendliness.

What follows is a formal language description, a formal lexical description, and an example of utilization of the IHML to control a user input device.

IHML Formal Language Description:

The following is a description of the IHML language in the Backus-Normal Form or Backus-Naur Form. In brief:

UPPERCASE A terminal symbol

<lowercase>A non-terminal symbol

[symbol]Zero or one symbols of the specified type

```
<script>        ::= <action_list> <state_list>
<state_list>    ::= <state_list> <state> | <state>
<state>         ::= STATE NUMBER <rule_list> ENDSTATE
<rule_list>     ::= <rule_list> <rule> | <rule>
<rule>          ::= OPEN [ IMPLIES ] <cmplx_action> |
                    CLOSE [ IMPLIES ] <cmplx_action> |
                    [ FEEDBACK ] STRING [IMPLIES]
                    <cmplx_action>
<cmplx_action>  ::= <action> |
                    LBRACE <action_list> RBRACE
<action_list>   ::= <action_list> <action> | <action>
<action>        ::= [ SEND ] STRING        |
                    GOTO NUMBER            |
                    ASSIGN VARIABLE <expr> |
                    VARIABLE EQUAL <expr>  |
                    SLEEP <expr>           |
                    EXIT                   |
                    IF <expr> THEN <cmplx_action>
<expr>          ::= LPAREN <expr> RPAREN |
                    <expr> EQ    <expr> |
                    <expr> NE    <expr> |
                    <expr> LT    <expr> |
                    <expr> LE    <expr> |
                    <expr> GT    <expr> |
                    <expr> GE    <expr> |
                    <expr> PLUS  <expr> |
                    <expr> CAT   <expr> |
                    <expr> MINUS <expr> |
                    <expr> MULT  <expr> |
                    <expr> DIV   <expr> |
                    <expr> OR    <expr> |
                    <expr> AND   <expr> |
                    NOT <expr>          |
                    MINUS <expr>        |
                    NUMBER              |
                    STRING              |
```

VARIABLE

IHML Formal Lexical Description:

Following is a list of terminals supported by the IHML language. These terminals may be mapped to those listed in the BNF syntax description. Keywords are case insensitive even though they are expressed in lower case in this table.

| Regular Expression | Language Terminal |
|---|---|
| screen | STATE |
| state | STATE |
| global | NUMBER (defined to be zero) |
| send | SEND |
| page | GOTO |
| goto | GOTO |
| endscreen | ENDSTATE |
| endstate | ENDSTATE |
| open | OPEN |
| close | CLOSE |
| sleep | SLEEP |
| if | IF |
| then | THEN |
| else | ELSE |
| assign | ASSIGN |
| exit | EXIT |
| and | AND |
| && | AND |
| or | OR |
| \|\| | OR |
| not | NOT |
| ! | NOT |
| <= | LE |
| < | LT |
| >= | GE |
| > | GT |
| == | EQ (comparison) |
| = | EQUAL (assignment) |
| ++ | CAT |
| + | PLUS |
| -> | IMPLIES |
| - | MINUS |
| * | MULT |
| // | (comments deleted to end of line) |
| / | DIV |
| ( | LPAREN |
| ) | RPAREN |
| { | LBRACE |
| } | RBRACE |
| $[0–9] | VARIABLE |
| [0–9]+ | NUMBER |
| \"[^\"]*\" | STRING |
| [A-Za-z_][A-Za-z_\?0–9]*\([^\)]*\) | STRING (preprocessed macro) |
| [A-Za-z_][A-Za-z_0–9]* | VARIABLE |
| press | PRESS (outdated) |
| release | RELEASE (outdated) |
| feedback | FEEDBACK (outdated) |

Example Script:

Below is an example of a script written to control a 20 button user input device which may control the security system and some lights. Button presses are sent to the script and recognized by the AMXpress?(. . .) event pattern. The argument represents a button id. The script will translate these button ids into user defined meanings and act accordingly. For reference, the buttons are numbered 1–20 starting at the upper left; increasing top to bottom, then left to right. The buttons are labeled as follows as is shown in FIG. 20.

There is also a two line LCD display which will be fed security information while the keypad is not in use. When in use, the display will be used to prompt the user for the needed information.

```
//####
//#   Copyright Notice
//#         Copyright, InteliHome, Inc., 1995.
//#         Private, proprietary information, the sole property of
//#         InteliHome, Inc. The contents, ideas, and concepts expressed
//#         herein are not to be disclosed except within the confines of a
//#         confidential relationship and only then on a need to know
//#         basis.
//####
//
// garage AMX mini-LCD device 140
//
// global state
State global
    open ->
        {
        AMXnotify()
        AMXmlcdDisplay( Smith Residence )
        }
    AMXpress?(16) ->    LightToggle(0,42,5)    // Hall light
    AMXpress?(17) ->    LightToggle(0,05,1)    // Master Off
endState
// default state - security text display active
State 1
    // security text feedback to LCD
    open                -> SecurityNotifyText()
    SecurityText?($1) -> AMXmlcdDisplay(#1)
    AMXpress?(1)    -> {
                        secCmd = "D"   // Disarm
                        goto 2
                       }
    AMXpress?(5)    -> {
                        secCmd = "B"   // Bypass
                        goto 2
                       }
    AMXpress?(6)    -> {
                        secCmd = "H"   // arm Home
                        goto 2
                       }
    AMXpress?(11)   -> {
                        secCmd = "W"   // arm aWay
                        goto 2
                       }
    close           SecurityCancel()
endState
// security - home, away, disarm - get password from user
State 2
    open ->         {
                    prompt = "PASSWORD:"
                    passwd = ""
                    pwLen = 0
                    $1 = prompt
                    AMXmlcdDisplay(#1)
                    }
    // below are all 'error' presses
    AMXpress?(1)       goto 1
    AMXpress?(5)       goto 1
    AMXpress?(6)       goto 1
    AMXpress?(11)      goto 1
    AMXpress?(15)      goto 1
    // translate button press id's to password characters
    AMXpress?(2)       secPress = "1"
    AMXpress?(3)       secPress = "4"
    AMXpress?(4)       secPress = "7"
    AMXpress?(7)       secPress = "2"
    AMXpress?(8)       secPress = "5"
    AMXpress?(9)       secPress = "8"
    AMXpress?(10)      secPress = "0"
    AMXpress?(12)      secPress = "3"
    AMXpress?(13)      secPress = "6"
    AMXpress?(14)      secPress = "9"
    AMXpress($1)    {
                    // update display
                    prompt = prompt ++ "*"
                    $1 = prompt
                    AMXmlcdDisplay(#1)
                    // update internal info
                    passwd = passwd ++ secPress
                    pwLen = pwLen + 1
                    // check for completion
                    if (pwLen >= 4) then
                        {
                        if(secCmd = = "B") then // bypass
```

-continued

```
        {
            // more to do
            goto 3
        }
        // we're done
        $1 = secCmd
        $2 = passwd
        SecurityCommand(#1,#2)
        // return to main state
        goto 1
        }
    }
endState
// security - get zone id for bypass command
State 3
    open        {
                // initialize variables
                prompt = "ZONE:"
                zone = ""
                zoneLen = 0
                // initialize display
                $1 = prompt
                AMXmlcdDisplay(#1)
                }
// below are all 'error' presses
AMXpress?(1)        goto 1
AMXpress?(5)        goto 1
AMXpress?(6)        goto 1
AMXpress?(11)       goto 1
AMXpress?(15)       goto 1
// translate button press id's to zone id characters
AMXpress?(2)        secPress = "1"
AMXpress?(3)        secPress = "4"
AMXpress?(4)        secPress = "7"
AMXpress?(7)        secPress = "2"
AMXpress?(8)        secPress = "5"
AMXpress?(9)        secPress = "8"
AMXpress?(10)       secPress = "0"
AMXpress?(12)       secPress = "3"
AMXpress?(13)       secPress = "6"
AMXpress?(14)       secPress = "9"
AMXpress?($1) ->
    {
        // update display
        prompt = prompt ++ secPress
        $1 = prompt
        AMXmlcdDisplay(#1)
        // update internal info
        zone = zone ++ secPress
        zoneLen = zoneLen + 1
        // check for completion
        if (zoneLen >= 2) then
        {
            // we're done
            $1 = passwd
            $2 = zone
            SecurityBypass(#1,#2)
            // return to main state
            goto 1
        }
    }
endState
```

5. Interprocess Control

Overview: The Intelligent Home Controller (IHC) software executes in a multitasking environment. The underlying kernel provides three methods of intertask communication; mailboxes, messages and semaphores. The IHC uses task mailboxes for interprocess communication. Task input and output pairs, which support an external subsystem, use messages and semaphores for intraprocess communication. Generally, the output task owns and maintains the mailbox used for interprocess communications. Each task is responsible for creation and usage of its own mailbox.

Task Startup and Shutdown: Each task is created by Main during system initialization, using the kernel task creation mechanisms. Therefore, there is no startup message. The shutdown procedure will be initiated by Main during system shutdown by sending a Shutdown Request to each task which has a mailbox. Each task is responsible for deallocation of memory during shutdown that it allocated during startup for processing purposes.

Individual tasks can be re-initialized during execution; the task first receives a shutdown message and the is recrated by Main. This technique will be used to facilitate run-time modifications to databases, schedules, or script files.

FIGS. 21 through 86 are tabular presentations of detail relating to the interprocess control commands.

FIG. 21 is a tabular presentation of the external interface message header. External messages between the controller and an external interface, such as a modem, serial work station, or local area network workstation, shall have the same content and structure as all internal process control commands, except that the header shall not contain the fields: source, destination, and user. These fields will be added and deleted from the message traffic as messages cross the external interface.

FIGS. 22 through 25 provide tables with detailed information about interprocess control commands for the AMX protocol. FIG. 22 is a table presentation of the AMX "notify" command. All AMX notify requests are based on device ID. When a "notify" is requested for a device, all channels on that device will be monitored. It is not possible to request a "notify" for only a selected number of channels on a device. Due to the state request capabilities within the AMX rack, not all "notify" requests will return an "update status" message to the requesting process. If the "notify" device is a sensor or relay card, an "update status" response is sent immediately. Other device types (for example, TEMP) will not yield a response until a change occurs.

FIG. 23 is a tabular presentation of the "notify cancel" command for the AMX system.

FIG. 24 is a tabular presentation of information relating to the "change request" command for the AMX system.

FIG. 25 is a tabular presentation of the "change request" command for the AMX system. A message is typically used to set values of or for the AMX touchpanel buttons using the "TEXTn-" prefix to the text field (where "n" is the text button number). A string is used to set text values of AMLCD device. The nomenclature "message" and "string" are AMX dependent concepts.

FIGS. 26 through 31 are tabular presentations of particular interprocess control commands utilized for the control of audio/video equipment. The table of FIG. 26 provide the information pertaining to a "notify request" command.

FIG. 27 is a tabular presentation of the parameters associated with a "cancel notify" command.

FIG. 28 is a tabular presentation of the parameters associated with a "status request" command.

FIG. 29 is a tabular presentation of the parameters associated with a "change request" command.

FIG. 30 is a tabular presentation of the parameters associated with a "pass through" command.

FIG. 31 is a tabular presentation of the parameters associated with an "update status" command.

FIGS. 32 through 40 are tabular presentations of particular interprocess control commands associated with the environmental subassembly (HVAC). FIG. 32 is a tabular presentation of the parameters associated with the "notify request" command. FIG. 33 is a tabular presentation of the parameters associated with the "cancel notify" command.

FIG. 34 is a tabular presentation of the parameters associated with the "change request" command. The following examples of the "change request" command will illustrate the utilization of these parameters. In the first example, the command is "H:R:O:S:+1:+0" which increases all zones Cool by one degree. In the second example, the command reads "H:R:1:S:+0:68," which sets the zone one heat point to sixty-eight degrees. In the third example, the command "H:R:5:S:−1:−1:," serves to decrease the cool and heat in zone five by one degree.

FIG. 35 is a tabular presentation of the parameters associated with the "change request" command, for changes in mode of operation in environmental subassembly. In contrast, FIG. 36 is a tabular presentation of the parameters associated with the "change request" command for operation of the fan.

FIG. 37 is a tabular presentation of the "change request" command for programmed operation of the environmental subassembly.

FIG. 38 is a tabular presentation of the parameters associated with the "update status" command which provides temperature status, humidity status, and mode of operation status.

FIG. 39 is a tabular presentation of the parameters associated with the "update" status for the set point of the environmental subassembly.

FIG. 40 is a tabular presentation of the parameters associated with the "update status" command for program operation of the environmental subassembly.

FIGS. 41 through 47 are tabular presentations of the parameters associated with the lighting/electrical subassemblies.

FIG. 41 is a tabular presentation of the parameters associated with the "notify request" command.

FIG. 42 is a tabular presentation of the parameters associated with the "cancel notify" command.

FIG. 43 is a tabular presentation of the parameters associated with the "change request" command. Note that a dim level of one percent is not supported by the Vantage lighting systems.

FIG. 44 is a tabular presentation of the "all on" command.

FIG. 45 is a tabular presentation of the parameters associated with the "all off" command.

FIG. 46 is a tabular presentation of the parameters associated with the "status request" command.

FIG. 47 is a tabular presentation of the parameters associated with the "update status" command.

FIG. 48 is a tabular presentation of the parameters associated with the "shut down" command.

FIGS. 49 through 53 are tabular presentations of the parameters associated with interprocess control commands utilized for communication through a modem.

FIG. 49 is a tabular presentation of the parameters associated with the "notify request" command.

FIG. 50 is a tabular presentation of the parameters associated with the "status request" command. FIG. 51 is a tabular presentation of the parameters associated with the "cancel notify" command.

FIG. 52 is a tabular presentation of the parameters associated with the "change request" command.

FIG. 53 is a tabular presentation of the parameters associated with the "update status" command.

FIGS. 54 through 57 are tabular presentations of the parameters associated with the particular interprocess control commands utilized for controlling an electrically-actuated motor.

FIG. 54 is a tabular presentation of the commands associated with the "notify request" command. FIG. 55 is a tabular presentation of the parameters associated with the "cancel notify" command.

FIG. 56 is a tabular presentation of the parameters associated with the "change request" command.

FIG. 57 is a tabular presentation of the parameters associated with the "update status" command.

FIGS. 58 through 61 are tabular presentations of the parameters associated with particular interprocess control commands utilizing in controlling a pool/spa.

FIG. 58 is a tabular presentation of the parameters associated with a "notify request" command.

FIG. 59 is a tabular presentation of the parameters associated with a "cancel notify" command.

FIG. 60 is a tabular presentation of the parameters associated with a "change request" command. The following examples illustrate the utilization of the "change request" command. These examples assume that the pool device ID is #1 and the spa device ID is #2. A change request command which includes "p:R:1:S:78" operates to set the pool temperature set point to seventy-eight degrees. The change request command which includes "p:R:1:S:+3" operates to increase the pool temperature set point by three degrees. The change request command which includes "p:R:2:S:−2" operates to decrease the spa set point by two degrees. The command "p:R:2:S:102" operates to set the spa temperature set point to one hundred and two degrees. The change request command "p:R:O:S:70" operates to set both the pool and spa temperature set points to seventy degrees. The change request command "p:R:2:M:1" sets the spa mode to automatic. The change request command "p:R:1:M:0" sets the pool mode to off. The change request command "p:R:2:B:1" turns the spa bubbles on. The change request command "p:R:1:L:0" turns the pool light off.

FIG. 61 is a tabular presentation of the parameters associated with the "update status" command.

FIGS. 62 through 68 are tabular presentations of the parameters associated with particular interprocess control commands for the security system.

FIG. 62 is a tabular presentation of the parameters associated with a "notify request" command. Note that the zone ID is used only with the "Z" attribute. If the "Z" attribute is not present, a zero is utilized (and assumed) to indicate all zones.

FIG. 63 is a tabular presentation of the parameters associated with the "cancel notify" command.

FIG. 64 is a tabular presentation of the parameters associated with the "change request" which is utilized to arm and disarm the alarm system.

FIG. 65 is a tabular presentation of the parameters associated with the "change request" command which is utilized to bypass the security system.

FIG. 66 is a tabular presentation of the parameters associated with the "update status" command which provides an indication of the current state of the security system.

FIG. 67 is a tabular presentation of the parameters associated with the "update status" command which elicits information pertaining to the state of particular zones of the security system.

FIG. 68 is a tabular presentation of the parameters associated with the "update status" command which provides the text status of the security system.

FIGS. 69 through 79 are tabular presentations of the parameters associated with various interprocess control commands utilized for controlling a lawn sprinkler system.

FIG. 69 is a tabular presentation associated with the "notify request" command. Note that the zone ID is only used with "Z" and "z" attributes. If these attributes are not present, zero is assumed, meaning all zones.

FIG. 70 is a tabular presentation of parameters associated with the "cancel notify" command.

FIG. 71 is a tabular presentation of the parameters associated with the "change request" command for particular zones in the sprinkler system.

FIG. 72 is a tabular presentation of the parameters associated with the "change request" command for zone duration.

FIG. 73 is a tabular presentation of the parameters associated with a "change request" command for mode of operation, and circuit mode of operation.

FIG. 74 is a tabular presentation of the parameters associated with the "change request" for the timer for the sprinkler system. This command sets the times for automatic mode without modifying the duration. The time is in thirty-two bit long hexadecimal format without a leading "0x." Each byte is used as follows:

1. MSB is not used;
2. MB corresponds to time three;
3. LB corresponds to time two; and
4. LSB corresponds to time one.

In this scheme, each time byte is expressed in 6.2 format for a twenty-four hour clock. For example, "0x15" corresponds to binary 000101.01 which corresponds to 5:15 a.m. As another example, "0x16" corresponds to binary 000101.10 which corresponds to 5:30 a.m. Continuing the example, "0x00" corresponds to binary 000000.00 which corresponds to midnight.

FIG. 75 is a tabular presentation of the parameters associated with the "change request" command for program information.

FIG. 76 is a tabular presentation of the "update status" command for zone and zone duration information.

FIG. 77 is a tabular presentation of the parameters associated with the "update status" command for mode and circuit mode of operation.

FIG. 78 is a tabular presentation of the parameters associated with the "update status" command for timer information. In this command, time is in thirty-two bit long hexadecimal format (without a leading "0x"). Each byte is used as follows:

1. MSB is not used;
2. MB corresponds to time three;
3. LB corresponds to time two; and
4. LSB corresponds to time one.

In each of these, the time byte is expressed in 6.2 format for a twenty-four hour clock.

FIG. 79 is a tabular presentation of the parameters associated with the "update status" command for program information.

FIGS. 80 through 83 are tabular presentations of parameters associated with the weather system.

FIG. 80 is a tabular presentation of the parameters associated with the "notify request" command.

FIG. 81 is a tabular presentation of the parameters associated with the "cancel notify" command.

FIG. 82 is a tabular presentation of the parameters associated with the "update status."

FIG. 83 is a tabular presentation of the weather value formats utilized in the present invention.

FIGS. 84 and 85 are tabular presentations of commands associated with timer operations.

FIG. 84 is a tabular presentation of the "add event" command, while FIG. 85 is a tabular presentation of the "cancel event" command. These commands are utilized to time the operation of the automation system of the present invention.

FIG. 86 is a tabular presentation of a macro command. In particular, it is the "execute request" command.

6. Exemplary Scenarios

The following example scenarios are provided to enable visualization of the ICH software as a whole, and how everything works in synchronization. These scenarios follow an event thread from receipt of an event, either by user input or device change, through the IHML and subsystem processors, to use feedback. Where possible, the actual IPC and subsystem protocol messages have been provided. Each scenario is accompanied by a figure to show the flow of messages through the IHC. The message numbers correspond to the scenario steps.

Audio Control from a Lighting Keypad

This scenario depicted in FIG. 94 and is fairly simple: a single button on a lighting keypad will be used to turn on an audio zone. For this case, assume that the lighting subsystem is Lite Touch and the audio subsystem is an Audio Access MRX; both support asynchronous updates so polling is not required.

1. On initialization, the IHML process finds that the global state in one of its scripts contains a notify request for a light switch whose Lite Touch address is 22-9. The IHML process sends an IPC message, "L:N:0:22:9", to the lighting output task (LightO) to notify the IHML process whenever a change is made to that switch.
2. LightO sets switch 22-9 in the notify list.
3. Some time later, a user pushes the switch.
4. The Lite Touch equipment sends a message, "01 22-9", to the IHC. The switch LED is turned on under the Lite Touch control.
5. The Lite Touch protocol driver receives the message, parses it into lighting address and state, and returns to the lighting input task (Lighti), indicating that a message was received.
6. LightI checks the notify list and sends an IPC message, "L:U:0:22:9:P", to the IHML process. Since Lite Touch protocol is based on switch pushes and releases, the state is "p", for "pushed."
7. The IHML process receives the IPC message and checks the script's global state. Then IHML finds that if the IPC message "L:U:22:9:P" is received, the message "A:R:P:0:3" must be sent to the audio output task (AudioO), indicating a power command for audio room #3.
8. On receipt, AudioO parses the IPC message and calls the MRX protocol driver to output a power message for the selected audio room.
9. The MRX protocol driver builds an MRX power command and sends it to the MRX.
10. The MRX equipment executes the request and returns a status update message to the IHC. The rooms' audio is now on.
11. The MRX protocol driver receives the status message, parses it into audio room number and state, and returns to the audio input task (Audiol), indicating that a message was received.

12. Audiol checks the notify list and doesn't find the requested room number. No IPC messages are sent.

13. In the mean time, the user has released the switch and events 2 through 4 are repeated, this time indicating a switch release. The IPC message "L:U:0:22:9:R" is sent to the IHML process.

14. The IHML process does not find reference to the release message in either the global or current states; no further processing is done.

Weather Display on a Touchpanel:

This scenario is depicted in FIG. 95 and is a little more complex, highlighting the polling capability of subsystem drivers. An AMX touchpanel will be used to check the weather reported by a Davis Instruments weather station. The Davis weather station does not support asynchronous updates; the protocol driver provides the polling mechanism to emulate real-time updates.

1. On initialization, the IHML process sends an IPC notify message, "X:N:128", to the AMX output task (AmxO) for touchpanel address 128.

2. AmxO adds the touchpanel device ID to the notify list.

3. Also during initialization, the weather output task (WthO) starts up the Davis protocol driver.

4. The Davis protocol driver sends a status request to the weather station, and user a "timed wait" on the serial port. The "timed wait" is used to enable regular polling of the weather station. Whenever the driver times out on the serial port it request weather station status. The protocol driver is the only part of the weather process that knows about the polling; the input and output tasks are not involved.

5. On receipt of each message, the weather station returns complete status to the protocol driver. This update includes all weather attributes available to the Davis equipment.

6. The Davis weather station does not report desired values such as heat index, monthly rainfall or a running rainfall total over the last 7 days. The protocol driver provides a value-added feature and calculates those values from available data. The protocol driver then saves complete data in a weather disk file, and parses the fields into an internal structure.

7. The protocol driver returns status to the weather input task (Wthl), indicating that weather station data was received.

8. Wthl checks the notify list, but at this point there are not notification requests. The initialization sequence is complete for this scenario. Steps 4 through 8 execute every 15 seconds (or whatever timeout value is used) until system shutdown. This provides immediate access to weather information that is at most 15 seconds old, even though the Davis weather station is not capable of providing this level of support.

9. Some time later, a user pushes the touchpanel weather button. The touchpanel flips to the weather page. For this case, assume that only the outside temperature, humidity and barometric pressure are displayed on the touchpanel screen.

10. The AMX equipment sends a message to the IHC indicating that channel 7 (the weather button) on device 128 was pushed. As in the previous scenario another message will follow as the user releases the weather button, but the IHML script does not contain a release event; the release will be thrown away in step 12.

11. The AMX input task (Amxl) checks the notify list and sends an IPC message, "X:U:128:7:6", to the IMHL process; the "6" is AMX's button press.

12. The IHML process receives the IPC message and, finding a match, opens the weather state. An example IHML script weather state is included in the diagram. On open, the weather state sends an IPC notify message to WthO. The message "W:N:DMQ", requests notification on the current outside temperature, barometric pressure and outside humidity, respectively.

13. WthO adds the touchpanel device to its notify list for all three weather attributes.

14. WthO accesses the internal weather structure and returns three IPC messages, one for each attribute, to the IHML process. These messages ("W:w:D:72", "W:w:Q:38", and "W:w:M:24:59") indicate that it's currently 72 degrees at 38 percent relative humidity and a barometric pressure of 24.59 inches.

15. The IHML process processes each message individually. For an example IHML script, refer to the diagram. The attribute value is copied from the original message to a magic variable, then from there to another IPC message. The resulting messages, sent to AmxO, are "X:R:M:128:TEXT1-72", "X:R:M:128:TEXT2-38", and "X:R:M:128:TEXT3-24.59".

16. AmxO parses each message and sends AMX protocol messages to display the new text. The user views the touchpanel as the attributes are updated.

17. Sometime later (within 15 seconds), the protocol driver wakes up and gets an update from the weather station. As in step 7, the protocol driver returns to Wthl with a status update message.

18. This time, Wthl checks the notify list and finds the three notification requests. Steps 14 through 16 are repeated, but this time Wthl starts the thread instead of WthO. This process will continue until the user selects another subsystem to view. At that time, IHML will send a notify cancel request to WthO, which will clear the notify list. However the protocol driver polling will continue until system shutdown.

7. Alternative Embodiment with Distributed Processing

The building automation system of the present invention may be utilized in a manner which distributes the processing throughout the building or structure. In order to allow this distributed processing architecture, one or more communication channels must be selected to serve as "buses" to allow communication between the automation subsystems, which include a processor and which are under the control of the local controller, and one or more central controllers.

FIG. 96 is a block diagram representation of a building automation system with distributed processing, in accordance with the present invention, which utilizes two communications buses. As is shown, central controller 2001 utilizes communication channel/bus 2003 to communicate with, and control HVAC system 2009, security system 2011, HVAC system 2013, and weather system 2014. Controller 2001 communicates with, and controls, HVAC system 2009 through serial adapter 2015. Controller 2001 communicates with, and controls, security system 2011 through serial adapter 2017. Controller 2001 communicates with, and controls, HVAC system 2013 through serial adapter 2019. Controller 2001 communicates with, and controls, weather system 2014 through serial adapter 2021. In the view of FIG.

96, another communication channel/bus 2005 is provided to allow communication between controller 2001 and sprinkler system 2007. Controller 2001 communicates with, and controls, sprinkler system 2007 through serial adapter 2023.

In the view of FIG. 96, communication channel/bus 2003 allows for communication utilizing the Cebus protocol, while communication channel/bus 2005 allows for communication and control utilizing the Ionworks protocol.

In accordance with this particular embodiment of the present invention, the interprocess controls are not utilized over the communications channels/bus, but instead are utilized locally within serial adapters 2015, 2017, 2019, 2023, as well as locally within controller 2001.

FIG. 97 is a block diagram representation of an exemplary serial adapter 2015. As is shown, serial adapter 2015 includes Cebus program 2051, which communicates through output tasks program module 2053, input task program module 2055, and driver module 2057 to communications bus 2003 utilizing the Cebus communications protocol. Serial adapter 2015 will provide status information and commands to other subassemblies and central controller 2001 utilizing Cebus commands over communications bus 2003.

Serial adapter 2015 further includes security program 2061 which communicates through output task program module 2063, input task program module 2065, and driver program 2067. Driver program 2067 is bidirectionally communicatively coupled with serial driver 2071 through a utility subroutine call as is shown in FIG. 99 to provide commands to the HVAC subsystem, and receive status information from the HVAC subsystem. Serial driver 2071 is communicatively coupled to output task program module 2073, input task program module 2075, and driver program 2077 to building subsystem program 2079. Building subsystem program 2079 is directly coupled to the end devices 2081 contained in the HVAC system. Building subsystem program 2079 communicates with end device 2081 utilizing the particular end device protocol which is utilized in that particular HVAC system.

Also as is shown in the view of FIG. 97, interprocess control commands are utilized to allow communication between Cebus program 2051, security program 2061, and serial driver 2071.

As discussed above, the driver program 2067 communicates with serial driver 2071 as is depicted in FIG. 99. As is shown, interprocess command 2022 is received at output mailbox 2032 which is identified with output task 2063. Output task 2063 is bidirectionally communicatively coupled with driver 2067 which includes output functions 2092 and input functions 2094. Additionally, driver program 2067 is bidirectionally communicatively coupled with input task 2065. Driver 2067 is also communicatively coupled with device mailbox 2066. Device mailbox 2066 communicates through utility subroutine call 2074 to serial process 2071. Utility subroutine call 2074 includes a header portion 2070 which comprises a interprocess control command in accordance with the present invention, and some protocol specific message 2072 which is carried therewith.

FIG. 98 is a block diagram representation of the programming modules contained within central controller 2001 (of FIG. 96). As is shown, a plurality of programs (identified as "scripts") 2101, 2103, 2105, 2107 are provided, each for control of particular automation functions within the building automation system. As is shown, the scripts are communicatively coupled through rules engine 2109 which includes the plurality of states defined for operation of the building automation system. A plurality of applications 2111, and a schedule program 2113 are also provided. A plurality of software modules are provided for specific control of predetermined building automation systems, including lighting program 2115, climate program 2117, security program 2119, audio/video program 2121, motor program 2123, weather program 2125, pool/spa program 2127, and sprinkler program 2129. Additionally, a plurality of communication programs are provided for receiving interprocess control commands and for producing command and control instructions in a particular device protocol, including Cebus module 2131, Lon module 2133, X-10 module 2135, serial module 2137, TCP/IP module 2139, and modem module 2141. In the central software, interprocess control commands are utilized to communicate between these various software modules.

What is claimed is:

1. An improved building automation system, comprising:
(a) a plurality of building automation subsystems, including at least:
(1) a first building automation subsystem including at least one end device which is controllable in accordance with a first control protocol;
(2) a second building automation subsystem including at least one end device which is controllable in accordance with a second control protocol;
(b) a set of interprocess control commands together constituting an interprocess control protocol;
(c) a least one programmable controller and associated memory for storing and selectively executing program instructions for a plurality of building automation programs, including at least the following programs:
(1) a plurality of modular subsystem-specific programs, including at least:
(a) a first modular subsystem program responsive to interprocess control commands of said interprocess control protocol for generating command signals in accordance with said first control protocol for control of said at least one end device of said first building automation subsystem;
(b) a second modular subsystem program responsive to interprocess control commands of said interprocess control protocol for generating signals in accordance with said second control protocol for control of said at least one end device of said second building automation subsystem.

2. An improved building automation system, according to claim 1, wherein said plurality of building automation programs further include:
(2) a plurality of modular communication programs, including at least:
(a) a first modular communication program for receiving control instructions in said first control protocol as an input, and for producing as an output control instructions in one of a plurality of control protocols, including said second control protocol; and
(b) a second modular communication program for receiving control instructions in said second control protocol as an input and for producing as an output control instructions in one of a plurality of control protocols, including said first control protocol.

3. An improved building automation system, according to claim 2, wherein said plurality of building automation programs further include:
(3) a plurality of modular communication applications, each for obtaining a particular building automation objective, which utilize particular ones of said plurality of modular communication programs to receive control instructions in one particular control protocol and to produce control instructions in a different particular control protocol.

4. An improved building automation system, according to claim 1, wherein said plurality of building automation programs further include:
 (2) a plurality of modular control applications, each for specific control of at least one of said plurality of building automation subsystems, which utilize particular ones of said set of interprocess control commands to control execution of particular ones of said plurality of modular subsystem-specific programs.

5. An improved building automation system, according to claim 1, wherein said building automation programs further include:
 (2) a plurality of communication programs, including at least:
  (a) a first communication program for receiving control instructions in said first control protocol as an input, and for producing as an output control instructions in one of a plurality of control protocols, including said second control protocol; and
  (b) a second communication program for receiving control instructions in said second control protocol as an input and for producing as an output control instruction in one of a plurality of control protocols, including said first control protocol;
 (3) a plurality of modular control applications, each for specific control of at least one of said building automation subsystems, which utilize particular ones of said set of interprocess control commands to control execution of particular ones of said plurality of subsystem-specific programs.

6. An improved building automation system, according to claim 1, wherein said plurality of building automation programs further include:
 (2) a plurality of modular communication programs, including at least:
  (a) a first modular communication program for receiving control instructions in said first control protocol as an input, and for producing as an output control instructions in one of a plurality of control protocols, including said second control protocol;
  (b) a second modular communication program for receiving control instructions in said second control protocol as an input and for producing as an output control instruction in one of a plurality of control protocols, including said first control protocol;
 (3) a plurality of modular control applications, each for specific control of at least one of said plurality of building automation subsystems, which utilize particular ones of said set of interprocess control commands to control execution of particular ones of said plurality of modular subsystem-specific programs; and
 (4) a plurality of modular communication applications, each for obtaining a particular building automation objective, which utilize particular ones of said plurality of modular communication programs to receive control instructions in a particular control protocol and to produce control instructions in a different particular control protocol.

7. An improved building automation system, comprising:
 (a) a plurality of building automation subsystems, each including at least one end device which is controllable in accordance with a particular control protocol from a plurality of different control protocols;
 (b) a set of interprocess control commands together constituting an interprocess control protocol;
 (c) at least one programmable controller and associated memory for storing and selectively executing program instructions;
 (d) a plurality of modular subsystem programs, each responsive to interprocess control commands of said interprocess control protocol for generating command signals in accordance with a particular control protocol of said plurality of different control protocols for direct control of said at least one end device of a particular building automation subsystem; and
 (e) a plurality of modular control applications, each for specific control of at least one of said plurality of building automation subsystems, which utilize particular ones of said set of interprocess control commands to control execution of particular ones of said plurality of modular subsystem programs.

8. An improved building automation system according to claim 7, further comprising:
 (f) a plurality of modular interprocess communication programs, each for receiving control instructions in a first control protocol as an input, and for producing as an output control instructions in a second control protocol.

9. An improved building automation system according to claim 8:
 wherein said set of interprocess control commands comprise text messages;
 wherein said improved building automation system further comprises:
 (g) at least one text parsing program for processing said interprocess control commands and communicating said interprocess control commands between (1) said plurality of modular subsystem programs, (2) said plurality of modular control applications, and (3) said plurality of modular interprocess communication programs.

10. An improved building automation system according to claim 10:
 wherein said at least one text parsing program includes executable instructions allowing conditional communication of interprocess control commands depending upon at least one of the following:
 (1) status of at least one operating condition of at least one of said plurality of building automation subsystems;
 (2) status of at least one operating condition of at least one of said plurality of modular subsystem programs; and
 (3) status of at least one of said plurality of said plurality of modular control application.

11. An improved building automation system according to claim 8:
 wherein said plurality of modular control applications include executable instructions which utilize said plurality of modular interprocess communication programs to convert control instructions in said first control protocol to control instructions in said second control protocol.

12. An improved building automation system according to claim 7, further comprising:
 (f) a plurality of user interface devices, for receiving user input and displaying system status, each communicatively coupled through particular ones of said plurality of modular control applications to particular ones of said plurality of building automation subsystems.

13. An improved building automation system according to claim 7:

wherein said plurality of building automation subsystems include at least one subsystem type, each with particular end devices which are responsive to different control protocols;

wherein said plurality of modular control applications include executable instructions which utilize said interprocess control protocol to control said at least one subsystem type without direct utilization of said different control protocols.

14. An improved building automation system, comprising:

(a) a plurality of building automation subsystems, each including at least one end device which is controllable in accordance with a particular control protocol from a plurality of different control protocols;

(b) a set of interprocess control commands together constituting an interprocess control protocol;

(c) at least one programmable controller and associated memory for storing and selectively executing program instructions;

(d) a plurality of modular subsystem programs, each responsive to interprocess control commands of said interprocess control protocol for generating command signals in accordance with a particular control protocol of said plurality of different control protocols for control of said at least one end device of a particular building automation subsystem, with each of said plurality of modular subsystem programs including:

(1) an output task program module including executable instructions for receiving interprocess control commands for controlling operation of said at least one end device;

(2) an input task program module including executable instructions for providing status information relating to a particular building automation subsystem; and (3) a driver task program module for generating a particular type of control protocol for control of said at least one end device.

15. An improved building automation system, according to claim 14, wherein said output task program module and said input task program module are communicatively coupled through at least one interprocess control mailbox and semaphores.

16. An improved building automation system, according to claim 15, wherein said interprocess control mailbox performs communication functions in a multitasking data processing environment.

17. A method of controlling a building automation system, comprising:

(a) providing a first building automation subsystem including at least one end device which is controllable in accordance with a first control protocol;

(b) providing a second building automation subsystem including at least one end device which is controllable in accordance with a second control protocol;

(c) providing a set of interprocess control commands together constituting an interprocess control protocol;

(d) providing at least one programmable controller and associated memory for storing and selectively executing program instructions for a plurality of building automation programs;

(e) providing a first modular subsystem program responsive to interprocess control commands of said interprocess control protocol for generating command signals in accordance with said first control protocol for control of said at least one end device of said first building automation subsystem, (f) providing a second modular subsystem program responsive to interprocess control commands of said interprocess control protocol for generating signals in accordance with said second control protocol for control of said at least one end device of said second building automation subsystem, and (g) utilizing said set of interprocess control commands to program applications which control said first building automation subsystem and said second building automation subsystem without regard to said first control protocol and said second control protocol, and without requiring any knowledge of said first control protocol and said second control protocol.

18. A method of controlling a building automation system, according to claim 17, further including:

(h) providing a first modular communication program for receiving control instructions in said first control protocol as an input, and for producing as an output control instructions in one of a plurality of control protocols, including said second control protocol; and (i) providing a second modular communication program for receiving control instructions in said second control protocol as an input and for producing as an output control instructions in one of a plurality of control protocols, including said first control protocol;

(j) utilizing said set of interprocess control commands to program applications which utilize said first modular communication program and said second modular communication program to selectively generate control instructions in at least one of said first control protocol and said second control protocol.

19. A method of controlling a building automation system, according to claim 18, further including:

(k) providing a plurality of modular communication applications, each for obtaining a particular building automation objective, which utilize particular ones first and second modular communication programs to receive control instructions in a particular control protocol and to produce control instructions in a different particular control protocol.

20. A method of controlling a building automation system, according to claim 17, further including:

(h) utilizing said applications to control of at least one of said plurality of building automation subsystems, by utilizing particular ones of said set of interprocess control commands to control execution of particular ones of a plurality of modular subsystem-specific programs including said first subsystem program and said second modular subsystem program.

21. An improved building automation system, comprising:

(a) a plurality of building automation subsystems, including at least the following:

(1) a first building automation subsystem including at least one end device which is controllable, in accordance with a first control protocol;

(2) a second building automation subsystem including at least one end device which is controllable in accordance with a second control protocol;

(b) a set of interprocess control commands together constituting an interprocess control protocol;

(c) at least one programmable controller and associated memory for storing and selectively executing program instructions for a plurality of building automation programs, including at least the following programs:
  (1) a plurality of subsystem-specific programs, including at least:
    (a) a first subsystem program responsive to interprocess control commands of said interprocess control protocol for generating command signals in accordance with said first control protocol for control of said at least one end device of said first building automation subsystem;
    (b) a second subsystem program responsive to interprocess control commands of said interprocess control protocol for generating signals in accordance with said second control protocol for control of said at least one end device of said second building automation subsystem;
(d) wherein said set of interprocess commands include a plurality of interprocess communication commands which are generally applicable to said plurality of subsystem specific programs, including at least the following specific interprocess communication commands:
  (1) a notify command for eliciting a substantially continuous state indication from any particular one of said plurality of subsystem-specific programs; and
  (2) a cancel command for discontinuing any substantially continuously-provided state indications, including said substantially continuously provided state indication in response to said notify command.

22. An improved building automation system, according to claim 21, wherein said plurality of interprocess commands further include:
  (3) a status command for eliciting a non-continuous state indication from any particular one of said plurality of subsystem-specific programs.

23. An improved building automation system, according to claim 21, wherein said plurality of interprocess commands further include:
  (3) a change request command for altering the state of a particular end device of a particular one of said building automation subsystems.

24. An improved building automation system, according to claim 21, further comprising:
  (e) at least one notify list which is communicatively associated to particular ones of said plurality of subsystem-specific programs through said interprocess communication commands which provides said status indications to said notify list.

25. An improved building automation system, comprising:
  (a) a plurality of building automation subsystems, each including at least one end device which is controllable in accordance with a particular control protocol from a plurality of different control protocols;
  (b) a set of interprocess control commands together constituting an interprocess control protocol;
  (c) at least one programmable controller and associated memory for storing and selectively executing program instructions;
  (d) a plurality of modular subsystem programs, each responsive to interprocess control commands of said interprocess control protocol for generating command signals in accordance with a particular control protocol of said plurality of different control protocols for direct control of said at least one end device of a particular building automation subsystem;
  (e) a plurality of modular control applications, each for specific control of at least one of said plurality of building automation subsystems, which utilize particular ones of said set of interprocess control commands to control execution of particular ones of said plurality of modular subsystem programs; and
  (f) wherein said set of interprocess commands include a plurality of interprocess communication commands which are generally applicable to said plurality of modular subsystem programs.

26. An improved building automation system according to claim 25, wherein said plurality of interprocess communication commands include:
  (1) a notify command for eliciting a substantially continuous state indication from any particular one of said plurality of modular subsystem programs; and
  (2) a cancel command for discontinuing any substantially continuously-provided state indications, including said substantially continuously provided state indication in response to said notify command.

27. An improved building automation system, according to claim 25, wherein said plurality of interprocess communication commands further include:
  (3) a status command for eliciting a non-continuous state indication from any particular one of said plurality of modular subsystem programs.

28. An improved building automation system, according to claim 25, wherein said plurality of interprocess communication commands further include:
  (3) a change request command for altering the state of a particular end device of a particular one of said building automation subsystems.

29. An improved building automation system, according to claim 25, further comprising:
  (g) at least notify list which is communicatively associated to particular ones of said plurality of modular subsystem programs through said interprocess communication commands which provide said status indications to said notify list.

30. An improved building automation system, comprising:
  (a) a plurality of building automation subsystems, each including at least one end device which is controllable in accordance with a particular control protocol from a plurality of different control protocols;
  (b) a set of interprocess control commands together constituting an interprocess control protocol;
  (c) at least one programmable controller and associated memory for storing and selectively executing program instructions;
  (d) a plurality of modular subsystem programs, each responsive to interprocess control commands of said interprocess control protocol for generating command signals in accordance with a particular control protocol of said plurality of different control protocols for control of said at least one end device of a particular building automation subsystem, with each of said plurality of modular subsystem programs including:
    (1) an output task program module including executable instructions for receiving interprocess control commands for controlling operation of said at least one end device;
    (2) an input task program module including executable instructions for providing status information relating to a particular building automation subsystem; and (3) a driver task program module for generating a particular type of control protocol for control of said at least one end device;

(e) a plurality of modular control applications, each for specific control of at least one of said plurality of building automation subsystems, which utilize particular ones of said set of interprocess control commands to control execution of particular ones of said plurality of modular subsystem-specific programs; and (f) wherein said set of interprocess commands include a plurality of interprocess communication commands which are generally applicable to said plurality of modular subsystem programs and to said plurality of modular control applications; and (g) wherein said interprocess communication commands are passed between particular ones of said plurality of modular subsystem programs and said plurality of modular control applications utilizing at least one of said output task program module and said input task program module.

31. An improved building automation system according to claim 30, wherein said interprocess communication commands include:

(1) a notify command for eliciting a substantially continuous state indication from any particular one of said plurality of modular subsystem programs; and (2) a cancel command for discontinuing any substantially continuously-provided state indications, including said substantially continuously provided state indication in response to said notify command.

32. An improved building automation system, according to claim 31, wherein said plurality of interprocess communication commands further include:

(3) a change request command for altering the state of a particular end device of a particular one of said building automation subsystems.

33. An improved building automation system, according to claim 31, further comprising:

(3) a change request command for altering the state of a particular end device of a particular one of said building automation subsystems.

34. An improved building automation system, according to claim 31, wherein said plurality of interprocess communication commands further include:

(3) a status command for eliciting a non-continuous state indication from any particular one of said plurality of modular subsystem programs.

35. A method of controlling a building automation system, comprising:

(a) providing a plurality of building automation subsystems, each including at least one end device which is controllable in accordance with a particular control protocol from a plurality of different control protocols;

(b) providing a set of interprocess control commands together constituting an interprocess control protocol;

(c) providing at least one programmable controller and associated memory for storing and selectively executing program instructions;

(d) providing a plurality of modular subsystem programs, each responsive to interprocess control commands of said interprocess control protocol for generating command signals in accordance with a particular control protocol of said plurality of different control protocols for control of said at least one end device of a particular building automation subsystem, with each of said plurality of modular subsystem programs including:

(1) an output task program module including executable instructions for receiving interprocess control commands for controlling operation of said at least one end device;

(2) an input task program module including executable instructions for providing status information relating to a particular building automation subsystem; and (3) a driver task program module for generating a particular type of control protocol for control of said at least one end device;

(e) a plurality of modular control applications, each for specific control of at least one of said plurality of building automation subsystems, which utilize particular ones of said set of interprocess control commands to control execution of particular ones of said plurality of modular subsystem programs;

(f) a plurality of modular interprocess communication programs, each for receiving control instructions in a first control protocol as an input, and for producing as an output control instructions in a second control protocol;

(g) a plurality of user interface devices, for receiving user input and displaying system status, each communicatively coupled through particular ones of said plurality of modular control applications to particular ones of said plurality of building automation subsystems;

(h) at least one text parsing program for processing said interprocess control commands and communicating said interprocess control commands between (1) said plurality of modular subsystem programs, (2) said plurality of modular control applications, and (3) said plurality of modular interprocess communication programs;

(i) utilizing said interprocess communication commands to control operation of a particular one of said plurality of building automation subsystems by passing between particular ones of said plurality of modular subsystem programs said interprocess communication commands utilizing said output task program module and said input task program module of particular ones of said plurality of modular subsystem programs.

36. A building automation system according to claim 35, wherein said interprocess communication commands include:

(1) a notify command for eliciting a substantially continuous state indication; and (2) a cancel command for discontinuing any substantially continuously-provided state indications.

37. A building automation system, according to claim 35, wherein said plurality of interprocess communication commands further include:

(3) a status command for eliciting a non-continuous state indication.

38. A building automation system, according to claim 35, wherein said plurality of interprocess communication commands further include:

(3) a change request command for altering the state of a particular end device of a particular one of said building automation subsystems.

39. A building automation system, according to claim 35, further comprising:

(j) at least one notify list which is communicatively associated to particular ones of said plurality of subsystem-specific programs through said interprocess communication commands which provides said status indications to said notify list.

40. A method of controlling a building automation system, comprising:
(a) providing a first building automation subsystem including at least one end device which is controllable in accordance with a first control protocol;
(b) providing a second building automation subsystem including at least one end device which is controllable in accordance with a second control protocol;
(c) providing a set of interprocess control commands together constituting an interprocess control protocol;
(d) providing at least one programmable controller and associated memory for storing and selectively executing program instructions for a plurality of building automation programs;
(e) providing a first subsystem program responsive to interprocess control commands of said interprocess control protocol for generating command signals in accordance with said first control protocol for control of said at least one end device of said first building automation subsystem;
(f) providing a second subsystem program responsive to interprocess control commands of said interprocess control protocol for generating signals in accordance with said second control protocol for control of said at least one end device of said second building automation subsystem;
(g) utilizing said set of interprocess control commands to program applications which control said first building automation subsystem and said second building automation subsystem without regard to said first control protocol and said second control protocol;
(h) providing in said set of interprocess commands a plurality of interprocess communication commands which are generally applicable to said plurality of subsystem specific programs, including at least the following specific interprocess communication commands:
  (1) a notify command for eliciting a substantially continuous state indication from any particular one of said plurality of subsystem-specific programs; and
  (2) a cancel command for discontinuing any substantially continuously-provided state indications, including said substantially continuously provided state indication in response to a notify command; and
(i) utilizing in said applications said notify command and said cancel command to provide selectively status indications to said applications.

41. A method of controlling a building automation system, according to claim 40:
wherein said plurality of interprocess communication commands further include:
  (3) a status command for eliciting a non-continuous state indication from any particular one of said plurality of subsystem-specific programs; and
wherein said method further includes:
(j) utilizing in said application said status command to provide selectively status indications to said applications.

42. A method of controlling a building automation system, according to claim 40, wherein said plurality of interprocess commands further include:
  (3) a change request command for altering the state of a particular end device of a particular one of said building automation subsystems.

43. A method of controlling a building automation system, according to claim 40, further comprising:
(j) at least one notify list which is communicatively associated to particular ones of said plurality of subsystem-specific programs through said interprocess communication commands which provides said status indications to said notify list.

44. An improved building automation system, comprising:
(a) a plurality of building automation subsystems;
(b) at least one programmable controller and associated memory for storing and selectively executing program instructions for a plurality of building automation programs, including at least the following programs:
  (1) a plurality of modular subsystem-specific process programs with particular ones dedicated for control of particular ones of said plurality of building automation subsystems;
  (2) a plurality of modular subsystem gateway programs which facilitate communication between at least said plurality of modular subsystem programs;
  (3) a plurality of modular external gateway programs which allow communication between said plurality of modular subsystem specific processes programs and systems outside of control of said plurality of building automation subsystems;
  (4) a plurality of utility process programs;
  (5) a multi-tasking kernel program communicatively coupling (a) said plurality of modular subsystem process programs, (b) said plurality of modular subsystem gateway programs, (c) said plurality of modular external gateway programs, and (d) said plurality of utility process programs, to allow asynchronous communication therebetween.

45. A method of controlling a building automation system, comprising:
(a) providing a plurality of building automation subsystems;
(b) providing at least one programmable controller and associated memory for storing and selectively executing program instructions for a plurality of building automation programs, including at least the following programs:
  (1) a plurality of modular subsystem-specific process programs with particular ones dedicated for control of particular ones of said plurality of building automation subsystems;
  (2) a plurality of modular subsystem gateway programs which facilitate communication between at least said plurality of modular subsystem programs;
  (3) a plurality of modular external gateway programs which allow communication between said plurality of modular subsystem specific processes programs and systems outside of control of said plurality of building automation subsystems;
  (4) a plurality of utility process programs;
  (5) a multi-tasking kernel program communicatively coupling (a) said plurality of modular subsystem process programs, (b) said plurality of modular subsystem gateway programs, (c) said plurality of modular external gateway programs, and (d) said plurality of utility process programs, to allow asynchronous communication therebetween;
(c) utilizing said modular subsystem-specific process programs to control said building automation subsystems;
(d) utilizing said plurality of modular subsystem gateway programs to communicate at least one of (1) commands and (2) data between said plurality of modular subsystem specific process programs asynchronously through said multi-tasking kernel program.

46. An improved building automation system, comprising:
(a) a plurality of building automation subsystems, including at least:
  (1) a first building automation subsystem including at least one end device which is controllable in accordance with a first control protocol;
  (2) a second building automation subsystem including at least one end device which is controllable in accordance with a second control protocol;
(b) at least one programmable controller and associated memory for storing and selectively executing program instructions for a plurality of building automation programs, including at least the following programs:
  (1) a plurality of modular subsystem-specific programs, including at least:
    (a) a first modular subsystem program responsive to control commands for generating command signals in accordance with said first control protocol for control of said at least one end device of said first building automation subsystem;
    (b) a second modular subsystem program responsive to control commands for generating signals for control of said at least one end device of said second building automation subsystem;
  (2) a plurality of modular communication programs, including at least:
    (a) a first modular communication program for receiving control instructions in said first control protocol as an input, and for producing as an output control instructions in one of a plurality of control protocols, including said second control protocol;
    (b) a second modular communication program for receiving control instructions in said second control protocol as an input and for producing as an output control instruction in one of a plurality of control protocols, including said first control protocol;
  (3) a plurality of modular control applications, each for specific control of at least one of said plurality of building automation subsystems, which utilize control commands to control execution of particular ones of said plurality of modular subsystem-specific programs;
  (4) a plurality of modular communication applications, each for obtaining a particular building automation objective, which utilize particular ones of said plurality of modular communication programs to receive control instructions in a particular control protocol and to produce control instructions in a different particular control protocol; and
  (5) a plurality of global utility programs operatively connected to at least one of (a) said plurality of modular subsystem-specific programs, (b) said plurality of modular communication programs, (c) said plurality of modular control applications, and (d) said plurality of modular communication applications, for performing at least one of the following utility functions:
    (1) building automation system startup;
    (2) building automation system shutdown;
    (3) creating an audit trail log;
    (4) time operations.

47. A method of controlling a building automation system, comprising:
(a) providing a first building automation subsystem including at least one end device which is controllable in accordance with a first control protocol;
(b) providing a second building automation subsystem including at least one end device which is controllable in accordance with a second control protocol;
(c) providing at least one programmable controller and associated memory for storing and selectively executing program instructions for a plurality of building automation programs;
(d) providing a first modular subsystem program responsive to control commands for generating command signals in accordance with said first control protocol for control of said at least one end device of said first building automation subsystem;
(e) providing a second modular subsystem program responsive to control commands for generating signals in accordance with said second control protocol for control of said at least one end device of said second building automation subsystem;
(f) providing a first modular communication program for receiving control instructions in said first control protocol as an input, and for producing as an output control instructions in one of a plurality of control protocols, including said second control protocol; and
(g) providing a second modular communication program for receiving control instructions in said second control protocol as an input and for producing as an output control instructions in one of a plurality of control protocols, including said first control protocol;
(h) utilizing control commands to program applications which utilize said first modular communication program and said second modular communication program to selectively generate control instructions in at least one of said first control protocol and said second control protocol; and
(i) providing a plurality of global utility programs operatively connected to at least one of (a) said plurality of modular subsystem-specific programs, (b) said plurality of modular communication programs, (c) said plurality of modular control applications, and (d) said plurality of modular communication applications, for performing at least one of the following utility functions:
  (1) building automation system startup;
  (2) building automation system shutdown;
  (3) creating an audit trail log;
  (4) timer operations.

48. An improved building automation system, comprising:
(a) a plurality of building automation subsystems including at least one end device which is controllable in accordance with a particular control protocol of a plurality of different control protocols;
(b) a set of interprocess control commands together constituting an interprocess control protocol;
(c) each interprocess control command including:
  (1) a message header portion which contains routing information including at least the following:
    (a) a source process;
    (b) a target process;
  (2) a command portion including at least one of said set of interprocess control commands;

(d) at least one programmable controller and associated memory for storing and selectively executing program instructions for a plurality of building automation programs, including a plurality of modular subsystem-specific programs each responsive to interprocess control commands of said interprocess control protocol for generating command signals in accordance with a particular control protocol for control of said at least one end device of a particular building automation subsystem.

49. An improved building automation system, according to claim 48, wherein said plurality of building automation programs further include:

a plurality of modular communication programs, each for receiving control instructions in a particular control protocol as an input, and for producing as an output control instructions in one of a plurality of different control protocols.

50. An improved building automation system, according to claim 49, wherein said plurality of building automation programs further include:

a plurality of modular applications, each for obtaining a particular building automation objective, which utilize particular ones of said plurality of modular communication programs to receive control instructions in one particular control protocol and to produce control instructions in a different particular control protocol.

51. An improved building automation system, according to claim 48, wherein said plurality of building automation programs further include:

a plurality of modular applications, each for specific control of at least one of said plurality of building automation subsystems, which utilize particular ones of said set of interprocess control commands to control execution of particular ones of said plurality of modular subsystem-specific programs.

52. An improved building automation system according to claim 48:

wherein said set of interprocess control commands comprise text messages;

wherein said improved building automation system further comprises:

(g) at least one text parsing program for processing said interprocess control commands and communicating said interprocess control commands between (1) said plurality of modular subsystem programs, (2) said plurality of modular control applications, and (3) said plurality of modular interprocess communication programs;

wherein said at least one text parsing program includes executable instructions allowing conditional communication of interprocess control commands depending upon at least one of the following:

(1) status of at least one operating condition of at least one of said plurality of building automation subsystems;

(2) status of at least one operating condition of at least one of said plurality of modular subsystem programs; and (3) status of at least one of said plurality of said plurality of modular control application.

53. An improved building automation system, comprising:

(a) a plurality of building automation subsystems, each including at least one end device which is controllable in accordance with a particular control protocol from a plurality of different control protocols;

(b) a set of interprocess control commands formed from text strings and together constituting an interprocess control protocol;

(c) at least one programmable controller and associated memory for storing and selectively executing program instructions;

(d) a plurality of modular subsystem programs, each responsive to interprocess control commands of said interprocess control protocol for generating command signals in accordance with a particular control protocol of said plurality of different control protocols for direct control of said at least one end device of a particular building automation subsystem;

(e) a plurality of modular control applications, each for specific control of at least one of said plurality of building automation subsystems, which utilize particular ones of said set of interprocess control commands to control execution of particular ones of said plurality of modular subsystem programs;

(f) a plurality of modular interprocess communication programs, each for receiving control instructions in a first control protocol as an input, and for producing as an output control instructions in a second control protocol; and (g) a plurality of user interface devices, with particular ones of said plurality of user interface devices being subject to different protocols, for receiving user input and displaying system status, each communicatively coupled through particular ones of said plurality of modular control applications to particular ones of said plurality of building automation subsystems.

54. An improved building automation system, according to claim 53, wherein said plurality of user interface devices which are determined for at least temporary use in at least one function of (1) receiving user input, and (2) providing status information, through use of said interprocess control protocol, thus allowing flexibility in duty assignment of said plurality of user interface devices.

55. An improved building automation system, according to claim 54, further comprising:

(h) wherein said interprocess control protocol utilizes particular interprocess control commands to perform the following functions:

(1) identify a source of a particular interprocess control command;

(2) identify a target process for a particular interprocess control command;

(3) identify a recipient process for status information; and (4) identify a user interface for at least one of (a) receipt of user input, and (b) display of status information.

56. An improved building automation system, according to claim 53, further comprising:

(h) at least one text parsing program for processing said interprocess control commands and communicating said interprocess control commands between (1) said plurality of modular subsystem programs, (2) said plurality of modular control applications, and (3) said plurality of modular interprocess communication programs.

57. An improved building automation system, comprising:

(a) a plurality of building automation subsystems, each including at least one end device which is controllable in accordance with a particular control protocol from a plurality of different control protocols;

(b) a set of interprocess control commands together constituting an interprocess control protocol;

(c) at least one programmable controller and associated memory for storing and selectively executing program instructions;

(d) a plurality of modular control applications, each for specific control of at least one of said plurality of building automation subsystems, which utilize particular ones of said set of interprocess control commands;

(e) wherein said interprocess control protocol is utilized within said plurality of modular control applications to define a plurality of conditional commands each associated with at least one of a plurality of predetermined building automation system events; and (f) a command processing program for examining building automation system events, detecting at least one of said plurality of predetermined building automation system events, and communicating a particular conditional command associated therewith for execution by said at least one programmable controller.

58. An improved building automation system according to claim 57, wherein said command processing program performs said examination of building automation system events by parsing and comparing building automation system message traffic in order to attempt to match an automation system event with a predetermined rule from a plurality of available rules recorded in memory.

59. An improved building automation system according to claim 57, wherein said plurality of condition commands are organized into conditional rules sets, each associated with a particular predetermined building automation system operating condition.

60. An improved building automation system, comprising:

(a) a plurality of building automation subsystems, each including at least one end device which is controllable in accordance with a particular control protocol from a plurality of different control protocols;

(b) a set of interprocess control commands together constituting an interprocess control protocol;

(c) at least one programmable controller and associated memory for storing and selectively executing program instructions;

(d) a plurality of modular control applications, each for specific control of at least one of said plurality of building automation subsystems, which utilize particular ones of said set of interprocess control commands;

(e) said program instructions defining a plurality of rules sets, each mapping a plurality of specific automation system events to a plurality of specific interprocess control commands; and (f) wherein said plurality of modular control applications determine which of said plurality of rules sets is active, identify specific automation system events as they occur, and respond by communicating associated specific interprocess control commands for execution.

61. An improved building automation system according to claim 60, wherein said plurality of rules sets include a global rules set which is activated upon initialization.

62. An improved building automation system according to claim 61, wherein said plurality of rules sets include a plurality of available secondary rules sets which may be activated by specific automation system events.

63. A method of controlling a building automation system, comprising:

(a) providing a plurality of building automation subsystems, each including at least one end device which is controllable in accordance with a particular control protocol from a plurality of different control protocols;

(b) providing a set of interprocess control commands together constituting an interprocess control protocol;

(c) providing at least one programmable controller and associated memory for storing and selectively executing program instructions;

(d) providing a plurality of automation rules sets, each including a plurality of particular interprocess control commands, and each associated with a particular operating state of said building automation system;

(e) utilizing said at least one programmable controller to execute program instructions and to monitor said operating state of said building automation system; and (f) upon identification of particular predetermined operating states, switching between particular ones of said plurality of automation rules sets.

64. A method of controlling a building automation system according to claim 63, further comprising:

(g) continuously switching between particular automation rules sets as said building automation system switches between predetermined operating states.

65. A method of controlling a building automation system according to claim 63, further comprising:

(g) providing at least one text parsing program for examining message traffic within said building automation system to identify particular operating states of said building automation system from a listing of particular operating systems contained in at least one of said plurality of automation rules sets which is currently active.

66. An improved building automation system, comprising:

(a) a plurality of building automation subsystems, each including at least one end device which is controllable in accordance with a particular control protocol from a plurality of different control protocols;

(b) a set of interprocess control commands together constituting an interprocess control protocol;

(c) a plurality of programmable controllers and associated memory for storing and selectively executing program instructions;

(d) at least one communication channel communicatively coupling said plurality of building automation subsystems and said plurality of programmable controllers;

(e) a plurality of modular subsystem programs, each responsive to interprocess control commands of said interprocess control protocol for generating command signals in accordance with a particular control protocol of said plurality of different control protocols for direct control of said at least one end device of a particular building automation subsystem;

(f) a plurality of modular control applications, each for specific control of at least one of said plurality of building automation subsystems, which utilize particular ones of said set of interprocess control commands to control execution of particular ones of said plurality of modular subsystem programs; and (g) wherein said plurality of programmable controllers are distributed throughout said building automation system, and communicate control commands and status information between one another utilizing said at least one communication channel.

67. An improved building automation system according to claim 66, further comprising:
(h) a plurality of modular interprocess communication programs, each for receiving control instructions in a first control protocol as an input, and for producing as an output control instructions in a second control protocol.

68. An improved building automation system according to claim 67:
wherein said set of interprocess control commands comprise text messages;
wherein said improved building automation system further comprises:
(i) at least one text parsing program for processing said interprocess control commands and communicating said interprocess control commands between (1) said plurality of modular subsystem programs, (2) said plurality of modular control applications, and (3) said plurality of modular interprocess communication programs.

69. An improved building automation system according to claim 69:
(j) wherein said at least one text parsing program includes executable instructions allowing conditional communication of interprocess control commands depending upon at least one of the following:
(1) status of at least one operating condition of at least one of said plurality of building automation subsystems;
(2) status of at least one operating condition of at least one of said plurality of modular subsystem programs; and
(3) status of at least one of said plurality of said plurality of modular control applications.

70. An improved building automation system according to claim 67:
(i) wherein said plurality of modular control applications include executable instructions which utilize said plurality of modular interprocess communication programs to convert control instructions in said first control protocol to control instructions in said second control protocol.

71. An improved building automation system according to claim 66, further comprising:
(h) a plurality of user interface devices, for receiving user input and displaying system status, each communicatively coupled through particular ones of said plurality of modular control applications to particular ones of said plurality of building automation subsystems.

72. An improved building automation system according to claim 66:
(h) wherein said plurality of building automation subsystems include at least one subsystem type, each with particular end devices which are responsive to different control protocols;
(i) wherein said plurality of modular control applications include executable instructions which utilize said interprocess control protocol to control said at least one subsystem type without direct utilization of said different control protocols.

73. An improved building automation system according to claim 66, wherein said plurality of programmable controllers communicate control communication and status information utilizing a common communication protocol utilizing said at least one communication channel.

74. An improved building automation system, comprising:
(a) a plurality of building automation subsystems, each including at least one end device which is controllable in accordance with a particular control protocol from a plurality of different control protocols;
(b) a set of interprocess control commands together constituting an interprocess control protocol;
(c) a plurality of programmable controllers and associated memory for storing and selectively executing program instructions;
(d) at least one communication channel communicatively coupling said plurality of building automation subsystems and said plurality of programmable controllers;
(e) a plurality of modular subsystem programs, each responsive to interprocess control commands of said interprocess control protocol for generating command signals in accordance with a particular control protocol of said plurality of different control protocols for control of said at least one end device of a particular building automation subsystem, with each of said plurality of modular subsystem programs including:
(1) an output task program module including executable instructions for receiving interprocess control commands for controlling operation of said at least one end device;
(2) an input task program module including executable instructions for providing status information relating to a particular building automation subsystem; and
(3) a driver task program module for generating a particular type of control protocol for control of said at least one end device;
(f) a plurality of modular control applications, each for specific control of at least one of said plurality of building automation subsystems, which utilize particular ones of said set of interprocess control commands to control execution of particular ones of said plurality of modular subsystem programs; and
(g) wherein said plurality of programmable controllers are distributed throughout said building automation system, and communicate interprocess control command and status information between one another utilizing said at least one communication channel.

75. An improved building automation system, comprising:
(a) a plurality of building automation subsystems, each including at least one end device which is controllable in accordance with a particular control protocol from a plurality of different control protocols;
(b) a set of interprocess control commands together constituting an interprocess control protocol;
(c) at least one programmable controller and associated memory for storing and selectively executing program instructions;
(d) a plurality of modular subsystem programs, each responsive to interprocess control commands of said interprocess control protocol for generating command signals in accordance with a particular control protocol of said plurality of different control protocols for direct control of said at least one end device of a particular building automation subsystem;

(e) a plurality of modular control applications, each for specific control of at least one of said plurality of building automation subsystems, which utilize particular ones of said set of interprocess control commands to control execution of particular ones of said plurality of modular subsystem programs;

(f) a plurality of modular communication applications which are response to interprocess control commands and which operate to perform at least one of the following operations:
 (1) allow remote access to executable programs;
 (2) allow review of an audit trail;
 (3) allow execution of diagnostics; and
 (4) allow direct control of particular end devices.

* * * * *